United States Patent
Ubukata et al.

(10) Patent No.: US 7,533,251 B2
(45) Date of Patent: May 12, 2009

(54) SEMICONDUCTOR INTEGRATED CIRCUIT, DEVELOPMENT SUPPORT SYSTEM AND EXECUTION HISTORY TRACING METHOD

(75) Inventors: Atsushi Ubukata, Yawata (JP); Akira Ueda, Katano (JP); Shigeyoshi Oda, Sakai (JP)

(73) Assignee: Panasonic Corporation, Osaka (JP)

( * ) Notice: Subject to any disclaimer, the term of this patent is extended or adjusted under 35 U.S.C. 154(b) by 951 days.

(21) Appl. No.: 11/018,965

(22) Filed: Dec. 22, 2004

(65) Prior Publication Data

US 2005/0183062 A1 Aug. 18, 2005

(30) Foreign Application Priority Data

Dec. 24, 2003 (JP) ............................. 2003-426865

(51) Int. Cl.
*G06F 9/00* (2006.01)
(52) U.S. Cl. ..................................... 712/227
(58) Field of Classification Search .................. 712/227
See application file for complete search history.

(56) References Cited

U.S. PATENT DOCUMENTS 5,978,902 A * 11/1999 Mann ......................... 712/227
6,898,698 B1 * 5/2005 Sunayama et al. .......... 712/233

2001/0054175 A1 12/2001 Watanabe

FOREIGN PATENT DOCUMENTS

JP 8-185336 7/1996

OTHER PUBLICATIONS

Tatsuo Yano, et al., "Realization of Real Time Trace by Mass Production 50-MHz MPU", Nikkei Electronics No. 641, pp. 136-139, Jul. 31, 1995 and its partial English Translation.

* cited by examiner

*Primary Examiner*—Eddie P Chan
*Assistant Examiner*—John Lindlof
(74) *Attorney, Agent, or Firm*—McDermott Will & Emery LLP

(57) ABSTRACT

When a call instruction or interrupt branch is executed by a CPU, its return address is pushed to a stack memory. When a return instruction is executed, the pushed return address is popped from the stack memory. When a return instruction is executed by the CPU, a comparator compares the branch address output from the CPU and the address output from the stack memory. As a result of the comparison, if the addresses match, the branch address is not output as trace information. If the addresses do not match, the address register receives the branch address from the CPU and outputs the received branch address as the trace information.

15 Claims, 50 Drawing Sheets

FIG. 2

| Input | | | | | | | | Output | | Note |
|---|---|---|---|---|---|---|---|---|---|---|
| JMP DIR | JMP IND | CALL | RET | JMP TKN | EXP | EOI | Return address match | TPC LDEN | PCST output code | TPC output |
| 1 | 0 | 0 | 0 | 1 | 0 | 1 | X | 0 | NPC | No |
| 1 | 0 | 1 | 0 | 1 | 0 | 1 | X | 0 | NPC | No |
| 0 | 1 | 0 | 1 | 1 | 0 | 1 | 1 | 0 | NPC | No |
| 0 | 1 | 0 | 1 | 1 | 0 | 1 | 0 | 1 | JMP | Yes |
| 0 | 1 | 1 | 0 | 1 | 0 | 1 | X | 1 | JMP | Yes |
| 0 | 1 | 0 | 0 | 1 | 0 | 1 | X | 1 | JMP | Yes |
| X | X | X | X | 0 | 0 | 1 | X | 0 | SEQ | No |
| 0 | 0 | 0 | 0 | X | 0 | 1 | X | 0 | SEQ | No |
| X | X | X | X | X | 1 | X | X | 1 | EXP | Yes |
| X | X | X | X | X | 0 | 0 | X | 0 | STL | No |

FIG. 4

| Trace memory address | Code | Branch address |
|---|---|---|
| 0 | SEQ | — |
| 1 | SEQ | — |
| 2 | NPC | — |
| 3 | SEQ | — |
| 4 | SEQ | — |
| 5 | NPC | — |
| 6 | SEQ | — |
| 7 | SEQ | — |
| 8 | SEQ | — |
| 9 | JMP | 0x50000300 |
| 10 | SEQ | — |
| 11 | SEQ | — |
| 12 | NPC | — |
| 13 | NPC | — |
| 14 | EXP | 0x40000100 |
| 15 | SEQ | — |
| 16 | SEQ | — |
| 17 | SEQ | — |
| 18 | SEQ | — |
| 19 | JMP | 0x50000610 |
| 20 | JMP | 0x5000050c |
| 21 | JMP | 0x5000040c |
| 22 | SEQ | — |
| 23 | SEQ | — |

FIG. 7

| Trace memory address | Code | Address | Traced execution history | | |
|---|---|---|---|---|---|
| 0 | SEQ | | 0x50000000 | taskA : | INST 1 |
| 1 | SEQ | | 0x50000004 | | INST 2 |
| 2 | NPC | | 0x50000008 | | call Sub_A |
| 3 | SEQ | | 0x50000100 | Sub_A : | INST 3 |
| 4 | SEQ | | 0x50000104 | | INST 4 |
| 5 | NPC | | 0x50000108 | | call Sub_B |
| 6 | SEQ | | 0x50000200 | Sub_B : | INST 5 |
| 7 | SEQ | | 0x50000204 | | INST 6 |
| 8 | SEQ | | 0x50000208 | | mov Sub_C ,a0 |
| 9 | JMP | 0x50000300 | 0x5000020c | | call (a0) |
| 10 | SEQ | | 0x50000300 | Sub_C : | INST 7 |
| 11 | SEQ | | 0x50000304 | | INST 8 |
| 12 | NPC | | 0x50000308 | | ret |
| 13 | NPC | | 0x50000210 | | ret |
| 14 | EXP | 0x40000100 | | | |
| 15 | SEQ | | 0x40000100 | int0h: | mov sp,d0 |
| 16 | SEQ | | 0x40000104 | | mov d0,( taskA_stack ) |
| 17 | SEQ | | 0x40000108 | | mov ( taskB_stack ),d0 |
| 18 | SEQ | | 0x4000010c | | mov d0,sp |
| 19 | JMP | 0x50000610 | 0x40000110 | | rti |
| 20 | JMP | 0x5000050c | 0x50000610 | | ret |
| 21 | JMP | 0x5000040c | 0x5000050c | | ret |
| 22 | SEQ | | 0x5000040c | | INST 19 |
| 23 | SEQ | | 0x50000410 | | INST 20 |

FIG. 9

| Input | | | | | | | | | Output | | | Note | |
|---|---|---|---|---|---|---|---|---|---|---|---|---|---|
| JMP DIR | JMP IND | CALL | RET | JMP TKN | EXP | EOI | Return address match | Synchronization request | TPC LDEN | TPC SEL | PCST output code | TPC output |
| 1 | 0 | 0 | 0 | 1 | 0 | 1 | X | 0 | 0 | X | NPC | No |
| 1 | 0 | 1 | 0 | 1 | 0 | 1 | X | 0 | 0 | X | NPC | No |
| 0 | 1 | 0 | 1 | 1 | 0 | 1 | 1 | 0 | 0 | X | NPC | No |
| 0 | 1 | 0 | 1 | 1 | 0 | 1 | 0 | 0 | 1 | 1 | JMP | Yes |
| 0 | 1 | 1 | 0 | 1 | 0 | 1 | X | 0 | 1 | 1 | JMP | Yes |
| 0 | 1 | 0 | 0 | 1 | 0 | 1 | X | 0 | 1 | 1 | JMP | Yes |
| X | X | X | X | 0 | 0 | 1 | X | 0 | 0 | X | SEQ | No |
| X | X | X | X | 0 | 0 | 1 | X | 1 | 1 | 0 | SYN | Yes |
| 1 | 0 | 0 | 0 | 1 | 0 | 1 | X | 1 | 1 | 1 | JMPS | Yes |
| 1 | 0 | 1 | 0 | 1 | 0 | 1 | X | 1 | 1 | 1 | JMPS | Yes |
| 0 | 1 | 0 | 1 | 1 | 0 | 1 | 1 | 1 | 1 | 1 | JMPS | Yes |
| 0 | 1 | 0 | 1 | 1 | 0 | 1 | 0 | 1 | 1 | 1 | JMPS | Yes |
| 0 | 1 | 1 | 0 | 1 | 0 | 1 | X | 1 | 1 | 1 | JMPS | Yes |
| 0 | 1 | 0 | 0 | 1 | 0 | 1 | X | 1 | 1 | 1 | JMPS | Yes |
| 0 | 0 | 0 | 0 | X | 0 | 1 | X | 0 | 0 | X | SEQ | No |
| 0 | 0 | 0 | 0 | X | 0 | 1 | X | 1 | 1 | 0 | SYN | Yes |
| X | X | X | X | X | 1 | X | X | 0 | 1 | 1 | EXP | Yes |
| X | X | X | X | X | 1 | X | X | 1 | 1 | 1 | JMPS | Yes |
| X | X | X | X | X | 0 | 0 | X | X | 0 | X | STL | No |

FIG. 11

| Trace memory address | Code | Branch/execution address |
|---|---|---|
| 0 | SYN | 0x50000104 |
| 1 | NPC | — |
| 2 | SEQ | — |
| 3 | SEQ | — |
| 4 | SEQ | — |
| 5 | JMP | 0x50000300 |
| 6 | SEQ | — |
| 7 | SEQ | — |
| 8 | NPC | — |
| 9 | NPC | — |
| 10 | JMP | 0x5000000c |
| 11 | SEQ | — |
| 12 | SEQ | — |

FIG. 14

| Trace memory address | Code | Address | Traced execution history | | |
|---|---|---|---|---|---|
| 0 | SYN | 0x50000104 | 0x50000104 | | INST 4 |
| 1 | NPC | | 0x50000108 | | call Sub_B |
| 2 | SEQ | | 0x50000200 | Sub_B: | INST 5 |
| 3 | SEQ | | 0x50000204 | | INST 6 |
| 4 | SEQ | | 0x50000208 | | mov Sub_C, a0 |
| 5 | JMP | 0x50000300 | 0x5000020c | | call (a0) |
| 6 | SEQ | | 0x50000300 | Sub_C: | INST 7 |
| 7 | SEQ | | 0x50000304 | | INST 8 |
| 8 | NPC | | 0x50000308 | | ret |
| 9 | NPC | | 0x50000210 | | ret |
| 10 | JMP | 0x5000000c | 0x5000010c | | ret |
| 11 | SEQ | | 0x5000000c | | INST 9 |
| 12 | SEQ | | 0x50000010 | | INST 10 |

FIG. 16

| Trace memory address | Code | Branch/execution address |
|---|---|---|
| 0 | JMPS | 0x50000200 |
| 1 | SEQ | — |
| 2 | SEQ | — |
| 3 | SEQ | — |
| 4 | JMP | 0x50000300 |
| 5 | SEQ | — |
| 6 | SEQ | — |
| 7 | NPC | — |
| 8 | JMP | 0x5000010c |
| 9 | JMP | 0x5000000c |
| 10 | SEQ | — |
| 11 | SEQ | — |

FIG. 17

| Trace memory address | Code | Address | Traced execution history | | |
|---|---|---|---|---|---|
| 0 | JMPS | 0x50000200 | — | | |
| 1 | SEQ | | 0x50000200 | Sub_B: | INST 5 |
| 2 | SEQ | | 0x50000204 | | INST 6 |
| 3 | SEQ | | 0x50000208 | | mov Sub_C,a0 |
| 4 | JMP | 0x50000300 | 0x5000020c | | call (a0) |
| 5 | SEQ | | 0x50000300 | Sub_C: | INST 7 |
| 6 | SEQ | | 0x50000304 | | INST 8 |
| 7 | NPC | | 0x50000308 | | ret |
| 8 | JMP | 0x5000010c | 0x50000210 | | ret |
| 9 | JMP | 0x5000000c | 0x5000010c | | ret |
| 10 | SEQ | | 0x5000000c | | INST 9 |
| 11 | SEQ | | 0x50000010 | | INST 10 |

FIG. 20

| Input | | | | | | | | Output | | Note |
|---|---|---|---|---|---|---|---|---|---|---|
| JMP DIR | JMP IND | RET | LCC | JMP TKN | EXP | EOI | LAR update flag | TPC LDEN | PCST output code | TPC output |
| 1 | 0 | 0 | 0 | 1 | 0 | 1 | X | 0 | NPC | No |
| 0 | 1 | 0 | 0 | 1 | 0 | 1 | X | 1 | JMP | Yes |
| 0 | 1 | 1 | 0 | 1 | 0 | 1 | X | 0 | NPC | No |
| 0 | 1 | 0 | 1 | 1 | 0 | 1 | 1 | 1 | JMP | Yes |
| 0 | 1 | 0 | 1 | 1 | 0 | 1 | 0 | 0 | NPC | No |
| X | X | X | X | 0 | 0 | 1 | X | 0 | SEQ | No |
| 0 | 0 | 0 | 0 | X | 0 | 1 | X | 0 | SEQ | No |
| X | X | X | X | X | 1 | X | X | 1 | EXP | Yes |
| X | X | X | X | X | 0 | 0 | X | 0 | STL | No |

FIG. 22

| Trace memory address | Code | Branch address |
|---|---|---|
| 0 | SEQ | — |
| 1 | SEQ | — |
| 2 | SEQ | — |
| 3 | SEQ | — |
| 4 | JMP | 0x50000008 |
| 5 | SEQ | — |
| 6 | SEQ | — |
| 7 | NPC | — |
| 8 | SEQ | — |
| 9 | EXP | 0x40000100 |
| 10 | SEQ | — |
| 11 | SEQ | — |
| 12 | SEQ | — |
| 13 | SEQ | — |
| 14 | JMP | 0x40000108 |
| 15 | SEQ | — |
| 16 | SEQ | — |
| 17 | SEQ | — |
| 18 | SEQ | — |
| 19 | NPC | — |
| 20 | SEQ | — |
| 21 | JMP | 0x50000008 |
| 22 | SEQ | — |
| 23 | SEQ | — |
| 24 | SEQ | — |
| 25 | SEQ | — |

FIG. 25

| Trace memory address | Code | Address | Traced execution history | | |
|---|---|---|---|---|---|
| 0 | SEQ | | 0x50000000 | | INST 1 |
| 1 | SEQ | | 0x50000004 | | setlb |
| 2 | SEQ | | 0x50000008 | loop0: | INST 2 |
| 3 | SEQ | | 0x5000000c | | INST 3 |
| 4 | JMP | 0x50000008 | 0x50000010 | | leq |
| 5 | SEQ | | 0x50000008 | loop0: | INST 2 |
| 6 | SEQ | | 0x5000000c | | INST 3 |
| 7 | NPC | | 0x50000010 | | leq |
| 8 | SEQ | | 0x50000008 | loop0: | INST 2 |
| 9 | EXP | 0x40000100 | - | | |
| 10 | SEQ | | 0x40000100 | int0h: | movm regs,(sp) |
| 11 | SEQ | | 0x40000104 | | setlb |
| 12 | SEQ | | 0x40000108 | loop1: | INST 6 |
| 13 | SEQ | | 0x4000010c | | INST 7 |
| 14 | JMP | 0x40000108 | 0x40000110 | | lne |
| 15 | SEQ | | 0x40000108 | loop1: | INST 6 |
| 16 | SEQ | | 0x4000010c | | INST 7 |
| 17 | SEQ | | 0x40000110 | | lne |
| 18 | SEQ | | 0x40000114 | | movm (sp),regs |
| 19 | NPC | | 0x40000118 | | rti |
| 20 | SEQ | | 0x5000000c | | INST 3 |
| 21 | JMP | 0x50000008 | 0x50000010 | | leq |
| 22 | SEQ | | 0x50000008 | loop0: | INST 2 |
| 23 | SEQ | | 0x5000000c | | INST 3 |
| 24 | SEQ | | 0x50000010 | | leq |
| 25 | SEQ | | 0x50000014 | | INST 4 |

FIG. 27

| Input | | | | | | | | | | | Output | | | | Note |
|---|---|---|---|---|---|---|---|---|---|---|---|---|---|---|---|
| JMP DIR | JMP IND | RET | LCC | JMP TKN | EXP | EOI | LAR update flag | Synchro- nization request | TPC LDEN | TPC SEL | PCST output code | TPC output |
| 1 | 0 | 0 | 0 | 1 | 0 | 1 | X | 0 | 0 | X | NPC | No |
| 0 | 1 | 0 | 0 | 1 | 0 | 1 | X | 0 | 1 | 1 | JMP | Yes |
| 0 | 1 | 1 | 0 | 1 | 0 | 1 | X | 0 | 0 | X | NPC | No |
| 0 | 1 | 0 | 1 | 1 | 0 | 1 | 1 | 0 | 1 | 1 | JMP | Yes |
| 0 | 1 | 0 | 1 | 1 | 0 | 1 | 0 | 0 | 0 | X | NPC | No |
| X | X | X | X | 0 | 0 | 1 | X | 0 | 0 | X | SEQ | No |
| X | X | X | X | 0 | 0 | 1 | X | 1 | 1 | 0 | SYN | Yes |
| 1 | 0 | 0 | 0 | 1 | 0 | 1 | X | 1 | 1 | 1 | JMPS | Yes |
| 0 | 1 | 0 | 0 | 1 | 0 | 1 | X | 1 | 1 | 1 | JMPS | Yes |
| 0 | 1 | 0 | 1 | 1 | 0 | 1 | 1 | 1 | 1 | 1 | JMPS | Yes |
| 0 | 1 | 0 | 1 | 1 | 0 | 1 | 0 | 1 | 1 | 1 | JMPS | Yes |
| 0 | 0 | 0 | 0 | X | 0 | 1 | X | 0 | 0 | X | SEQ | No |
| 0 | 0 | 0 | 0 | X | 0 | 1 | X | 1 | 1 | 0 | SYN | Yes |
| X | X | X | X | X | 1 | X | X | 0 | 1 | 1 | EXP | Yes |
| X | X | X | X | X | 1 | X | X | 1 | 1 | 1 | JMPS | Yes |
| X | X | X | X | X | 0 | 0 | X | X | 0 | X | STL | No |

FIG. 29

| Trace memory address | Code | Branch/execution address |
|---|---|---|
| 0 | SYN | 0x40000008 |
| 1 | SEQ | — |
| 2 | JMP | 0x40000008 |
| 3 | SEQ | — |
| 4 | SEQ | — |
| 5 | NPC | — |
| 6 | SEQ | — |
| 7 | SEQ | — |
| 8 | SEQ | — |
| 9 | SEQ | — |

FIG. 32

| Trace memory address | Code | Address | Traced execution history | | |
|---|---|---|---|---|---|
| 0 | SYN | 0x40000008 | 0x40000008 | loop0: | INST 2 |
| 1 | SEQ | | 0x4000000c | | INST 3 |
| 2 | JMP | 0x40000008 | 0x40000010 | | leq |
| 3 | SEQ | | 0x40000008 | loop0: | INST 2 |
| 4 | SEQ | | 0x4000000c | | INST 3 |
| 5 | NPC | | 0x40000010 | | leq |
| 6 | SEQ | | 0x40000008 | loop0: | INST 2 |
| 7 | SEQ | | 0x4000000c | | INST 3 |
| 8 | SEQ | | 0x40000010 | | leq |
| 9 | SEQ | | 0x40000014 | | INST 4 |

FIG. 34

| Trace memory address | Code | Branch/execution address |
|---|---|---|
| 0 | JMPS | 0x40000008 |
| 1 | SEQ | — |
| 2 | SEQ | — |
| 3 | JMP | 0x40000008 |
| 4 | SEQ | — |
| 5 | SEQ | — |
| 6 | NPC | — |
| 7 | SEQ | — |
| 8 | SEQ | — |
| 9 | SEQ | — |
| 10 | SEQ | — |

FIG. 35

| Trace memory address | Code | Address | Traced execution history | | |
|---|---|---|---|---|---|
| 0 | JMPS | 0x40000008 | - | | |
| 1 | SEQ | | 0x40000008 | loop0: | INST 2 |
| 2 | SEQ | | 0x4000000c | | INST 3 |
| 3 | JMP | 0x40000008 | 0x40000010 | | leq |
| 4 | SEQ | | 0x40000008 | loop0: | INST 2 |
| 5 | SEQ | | 0x4000000c | | INST 3 |
| 6 | NPC | | 0x40000010 | | leq |
| 7 | SEQ | | 0x40000008 | loop0: | INST 2 |
| 8 | SEQ | | 0x4000000c | | INST 3 |
| 9 | SEQ | | 0x40000010 | | leq |
| 10 | SEQ | | 0x40000014 | | INST 4 |

FIG. 37

| Input | | | | | | | Output | | | Note |
|---|---|---|---|---|---|---|---|---|---|---|
| JMP DIR | JMP IND | JMP TKN | EXP | EOI | Indirect branch address match | Synchro-nization request | TPC LDEN | TPC SEL | PCST output code | TPC output |
| 1 | 0 | 1 | 0 | 1 | X | 0 | 0 | X | NPC | No |
| 0 | 1 | 1 | 0 | 1 | 0 | 0 | 1 | 1 | JMP | Yes |
| 0 | 1 | 1 | 0 | 1 | 1 | 0 | 0 | X | NPC | No |
| X | X | 0 | 0 | 1 | X | 0 | 0 | X | SEQ | No |
| X | X | 0 | 0 | 1 | X | 1 | 1 | 0 | SYN | Yes |
| 1 | 0 | 1 | 0 | 1 | X | 1 | 1 | 1 | JMPS | Yes |
| 0 | 1 | 1 | 0 | 1 | 0 | 1 | 1 | 1 | JMPS | Yes |
| 0 | 1 | 1 | 0 | 1 | 1 | 1 | 1 | 1 | JMPS | Yes |
| 0 | 0 | X | 0 | 1 | X | 0 | 0 | X | SEQ | No |
| 0 | 0 | X | 0 | 1 | X | 1 | 1 | 0 | SYN | Yes |
| X | X | X | 1 | X | X | 0 | 1 | 1 | EXP | Yes |
| X | X | X | 1 | X | X | 1 | 1 | 1 | JMPS | Yes |
| X | X | X | 0 | 0 | X | X | 0 | X | STL | No |

FIG. 39

| Trace memory address | Code | Branch/execution address |
|---|---|---|
| 0 | SYN | 0x40000008 |
| 1 | SEQ | — |
| 2 | JMP | 0x40000008 |
| 3 | SEQ | — |
| 4 | SEQ | — |
| 5 | NPC | — |
| 6 | SEQ | — |
| 7 | SEQ | — |
| 8 | SEQ | — |
| 9 | SEQ | — |

FIG. 42

| Trace memory address | Code | Address | Traced execution history | | |
|---|---|---|---|---|---|
| 0 | SYN | 0x40000008 | 0x40000008 | loop0: | INST 2 |
| 1 | SEQ | | 0x4000000c | | INST 3 |
| 2 | JMP | 0x40000008 | 0x40000010 | | beq (a0) |
| 3 | SEQ | | 0x40000008 | loop0: | INST 2 |
| 4 | SEQ | | 0x4000000c | | INST 3 |
| 5 | NPC | | 0x40000010 | | beq (a0) |
| 6 | SEQ | | 0x40000008 | loop0: | INST 2 |
| 7 | SEQ | | 0x4000000c | | INST 3 |
| 8 | SEQ | | 0x40000010 | | beq (a0) |
| 9 | SEQ | | 0x40000014 | | INST 4 |

FIG. 44

| Trace memory address | Code | Branch/execution address |
|---|---|---|
| 0 | JMPS | 0x40000008 |
| 1 | SEQ | — |
| 2 | SEQ | — |
| 3 | JMP | 0x40000008 |
| 4 | SEQ | — |
| 5 | SEQ | — |
| 6 | NPC | — |
| 7 | SEQ | — |
| 8 | SEQ | — |
| 9 | SEQ | — |
| 10 | SEQ | — |

FIG. 45

| Trace memory address | Code | Address | Traced execution history | | |
|---|---|---|---|---|---|
| 0 | JMPS | 0x40000008 | - | | |
| 1 | SEQ |  | 0x40000008 | loop0: | INST 2 |
| 2 | SEQ |  | 0x4000000c |  | INST 3 |
| 3 | JMP | 0x40000008 | 0x40000010 |  | beq (a0) |
| 4 | SEQ |  | 0x40000008 | loop0: | INST 2 |
| 5 | SEQ |  | 0x4000000c |  | INST 3 |
| 6 | NPC |  | 0x40000010 |  | beq (a0) |
| 7 | SEQ |  | 0x40000008 | loop0: | INST 2 |
| 8 | SEQ |  | 0x4000000c |  | INST 3 |
| 9 | SEQ |  | 0x40000010 |  | beq (a0) |
| 10 | SEQ |  | 0x40000014 |  | INST 4 |

Prior Art

FIG. 47

| Input | | | | | | Output | | Note |
|---|---|---|---|---|---|---|---|---|
| JMP DIR | JMP IND | RET | JMP TKN | EXP | EOI | TPC LDEN | PCST output code | TPC output |
| 1 | 0 | 0 | 1 | 0 | 1 | 0 | NPC | No |
| 1 | 0 | 0 | 0 | 0 | 1 | 0 | SEQ | No |
| 0 | 1 | 0 | 1 | 0 | 1 | 1 | JMP | Yes |
| 0 | 1 | 0 | 0 | 0 | 1 | 0 | SEQ | No |
| 0 | 1 | 1 | X | 0 | 1 | 0 | NPC | No |
| 0 | 0 | 0 | 0 | 0 | 1 | 0 | SEQ | No |
| X | X | X | X | 1 | X | 1 | EXP | Yes |
| 0 | 0 | 0 | 0 | 0 | 0 | 0 | STL | No |

Prior Art

FIG. 50

| Trace memory address | Code | Branch address |
|---|---|---|
| 0 | SEQ | — |
| 1 | SEQ | — |
| 2 | NPC | — |
| 3 | SEQ | — |
| 4 | SEQ | — |
| 5 | NPC | — |
| 6 | SEQ | — |
| 7 | SEQ | — |
| 8 | SEQ | — |
| 9 | JMP | 0x40000300 |
| 10 | SEQ | — |
| 11 | SEQ | — |
| 12 | NPC | — |
| 13 | NPC | — |
| 14 | NPC | — |
| 15 | SEQ | — |
| 16 | SEQ | — |

Prior Art

Prior Art

FIG. 52

| Trace memory address | Code | Address | Traced execution history | |
|---|---|---|---|---|
| 0 | SEQ | | 0x40000000 | INST 1 |
| 1 | SEQ | | 0x40000004 | INST 2 |
| 2 | NPC | | 0x40000008 | call Sub_A |
| 3 | SEQ | | 0x40000100 | Sub_A: INST 3 |
| 4 | SEQ | | 0x40000104 | INST 4 |
| 5 | NPC | | 0x40000108 | call Sub_B |
| 6 | SEQ | | 0x40000200 | Sub_B: INST 5 |
| 7 | SEQ | | 0x40000204 | INST 6 |
| 8 | SEQ | | 0x40000208 | mov Sub_C,a0 |
| 9 | JMP | 0x40000300 | 0x4000020c | call (a0) |
| 10 | SEQ | | 0x40000300 | Sub_C: INST 7 |
| 11 | SEQ | | 0x40000304 | INST 8 |
| 12 | NPC | | 0x40000308 | ret |
| 13 | NPC | | 0x40000210 | ret |
| 14 | NPC | | 0x4000010c | ret |
| 15 | SEQ | | 0x4000000c | INST 9 |
| 16 | SEQ | | 0x40000010 | INST 10 |

Prior Art

SEMICONDUCTOR INTEGRATED CIRCUIT, DEVELOPMENT SUPPORT SYSTEM AND EXECUTION HISTORY TRACING METHOD

CROSS REFERENCE TO RELATED APPLICATION

This Non-provisional application claims priority under 35 U.S.C. §119(a) on Patent Application No. 2003-426865 filed in Japan on Dec. 24, 2003, the entire contents of which are hereby incorporated by reference.

BACKGROUND OF THE INVENTION

The present invention relates to a semiconductor integrated circuit, a development support system and an execution history tracing method, and specifically to a processor which has a "trace information output function" for outputting trace information relating to program execution, and a development support system and method for tracing a program execution history of a processor based on trace information output from the processor.

The "trace information output function" is a function of outputting a program execution status of a processor to a debugger operating on an external host computer. With this function, when a system detects some abnormal operation, a system developer can check the execution history retrospectively from the time of detection using accumulated trace information to identify the cause of the abnormal operation.

However, for such development support, the processor needs to have pins for outputting the trace information, and therefore, the number of pins and the operation frequency (band width of the trace information output) are limited. Further, the memory capacity for accumulating the trace information is also limited. Therefore, in order to achieve the effects as much as possible with the limited band width and memory capacity, the trace information needs to be compressed.

Conventionally, as an example of the trace information compression method, a trace information acquisition method, so-called "branch trace", has been known (for example, Japanese Unexamined Patent Publication No. 8-185336 and Yano et al., "Realization of Real Time Trace by Mass Production 50-MHz MPU", *Nikkei Electronics* 1995. 7. 31 (no. 641), pp. 133-140). According to this method, a mechanism for outputting a branch address to the outside of a chip at every occurrence of a branch is provided, and the execution history is traced based on the output branch address. Further, it is suggested that the execution history can be traced even without all the branch addresses by analyzing a source program based on the output trace information. For example, in the case of a direct branch where a branch address is explicitly described in the source program, the execution history can be traced based on the source program even if a branch address is not output. Alternatively, in the case of an indirect branch where a branch address is not explicitly described in the source program but is determined based on the source program at the time of execution, it is necessary to output the branch address. Among indirect branches, at the time of execution of a return instruction in response to a function call instruction, a branch address does not need to be output so long as the relationship of "call" and "return" can be followed based on the trace information.

Hereinafter, as a conventional example, hardware and execution history tracing software which realize the above suggestion are described with reference to drawings. FIG. 46 shows a structure of a conventional semiconductor integrated circuit which has a trace information output function. A trace packet control section 200 receives from a CPU 100 an instruction completion signal (EOI) 101, a direct branch instruction execution signal (JMPDIR) 102, an indirect branch instruction execution signal (JMPIND) 103, a return instruction execution signal (RET) 106, and a condition-met signal (JMPTKN) 104 in the execution of a condition branch instruction. Based on these signals, the trace packet control section 200 performs decoding according to the status decode table shown in FIG. 47 to generate a trace status code 204 and a branch address load enable signal (TPCLD) 201 which is then sent to a shift register 700 of the branch address. The code 204 output to a trace status port (PCST) 901 has the following binary code and meaning:

Code/Binary code/Meaning
SEQ/"000"/sequential execution of instructions
STL/"010"/status where CPU is in a stall
NPC/"101"/branch instruction execution not accompanied by branch address output
JMP/"100"/branch instruction execution accompanied by branch address output
EXP/"110"/interrupt branch execution (accompanied by branch address output)

As shown in the status decode table of FIG. 47, only when an indirect branch instruction other than a return instruction is executed, the branch address 110 output from the CPU 100 is loaded in the shift register 700 to start the shift output. When a branch instruction other than this is executed, "NPC" is output as the code 204 while no significant data is output from a branch address output port (TPC) 902.

FIG. 48 shows a structure of a development support system. The development support system includes a trace information accumulation device 2 and a host computer 3. The trace information accumulation device 2 receives a trace status signal 911 and a branch address signal 912 from a semiconductor integrated circuit (processor) 1 and accumulates the received signals as trace information in a trace memory 1030. The host computer 3 sends a trace memory read request 1041 to the trace information accumulation device 2 to acquire a trace memory output 1031.

Next, a method for tracing a program execution history of the semiconductor integrated circuit 1 based on the trace information output from the semiconductor integrated circuit 1 is described while referring to the program shown in FIG. 49 as an example. It is assumed herein that the semiconductor integrated circuit 1 executes the program of FIG. 49 to output the trace information of FIG. 50. It is further assumed herein that the trace is started from execution order "1" (address "0x40000000") which is the same as that of the program execution start.

FIG. 51 is a flowchart of a conventional execution history tracing method. The host computer 3 traces the execution history according to the flow of FIG. 51. First, at step 5001, instruction execution pointer IP and trace pointer TP are respectively set to 0x40000000 and 0. Then, at step 5006, an instruction of IP=0x40000000, "INST 1", is output. When TP=0, the code is "SEQ" (steps 5007, 5008, 5015, 5019 and 5021), IP is incremented at step 5022 (IP=0x40000004), and TP is incremented at step 5023 (TP=1), and the process returns to step 5006. As for code "SEQ" corresponding to TP=1, 3, 4, 6, 7, 8, 10, 11, 15 and 16, the process is performed in the same way.

When TP=2, IP=0x40000008. At step 5006, the instruction of IP=0x40000008, "call Sub A", is output. When TP=2, the code is "NPC" (steps 5007 and 5008), and the instruction of IP=0x40000008 is a call instruction (CALL) (steps 5009 and 5012). Therefore, at step 5013, next instruction address "0x4000000c" is pushed to a simulation stack (hereinafter, referred to as "soft stack") which is realized by software. Then, at step 5014, IP is set to "0x40000100" (Sub A) which is acquired from the source program. At step 5023, TP is incremented (TP=3), and the process returns to step 5006. As for code "NPC" corresponding to TP=5, the process is performed in the same way.

When TP=9, IP=0x4000020c. At step 5006, the instruction of IP=0x4000020c, "call (a0)", is output. When TP=9, the code is "JMP" (steps 5007, 5008 and 5015), and the instruction of IP=0x4000020c is a call instruction (CALL) (step 5016). Therefore, at step 5017, next instruction address "0x40000210" is pushed to the soft stack. At step 5018, IP is set to "0x40000300" (Sub A) which is the branch address corresponding to TP=9. At step 5023, TP is incremented (TP=10), and the process returns to step 5006.

When TP=12, IP=0x40000308. At step 5006, the instruction of IP=0x40000308, "ret", is output. When TP=12, the code is "NPC" (steps 5007 and 5008), and the instruction of IP=0x40000308 is a return instruction (RET) (step 5009). Therefore, at step 5010, a return address is popped from the soft stack. At step 5011, IP is set to the popped address "0x40000210". At step 5023, TP is incremented (TP=13), and the process returns to step 5006. As for code "NPC" corresponding to TP=13 and 14, the process is performed in the same way.

FIG. 52 shows a trace result obtained by executing the above execution history tracing method. As shown in FIG. 52, the execution history of the processor 1 has been correctly traced based on the source program shown in FIG. 49 and the trace information shown in FIG. 50.

However, the above-described conventional technique has some problems as follows:

(1) As for the return instruction, such as a function return instruction, an interrupt return instruction, or the like, output of the branch address of the return instruction is always omitted. Therefore, in the case where a stack is switched by task switching (context switch), the branch address information is not necessarily obtained from the source program. Also, in the case where the stack used by the CPU is destroyed due to some factor so that the return address is incorrect, the return address cannot be correctly traced.

(2) In the case where the trace is not started from the leading part but from the midst of the program, execution of a function call instruction corresponding to the return instruction or an interrupt branch is not left as trace information. Thus, the branch address cannot be obtained, and therefore, the return address of the return instruction cannot be traced.

In the case where the trace is performed in a delayed trigger mode, a trace memory is used in a cyclic manner. Thus, if trace data of the past is overwritten and the trace information as to the execution of a branch instruction corresponding to a return instruction is not remaining, the execution history cannot be correctly traced.

(3) In the case where indirect branches occur in succession, there is a possibility that information indispensable for history tracing is lost. This problem itself can be solved by providing an operation mode (full trace mode) where execution of the next instruction is suspended till all of branch addresses are output. However, in the case where the processor operates in the full trace mode, the execution time of a program is influenced. Especially in the case of realtime control, there is a possibility of an inoperative system.

Further, especially, there has been an architecture which incorporates the "fast branch instruction" wherein a branch address is stored in a branch address register, and an instruction of the branch destination is stored in a branch destination instruction register, such that a penalty in the execution of branching is removed to achieve fast branching. Since such a fast branch instruction is an indirect branch instruction, it is necessary to output a branch address as trace information. The fast branch instruction is effective when it is used as a branch of a repetition loop. However, the interval for execution of a branch instruction by the CPU is shorter than the cycle of outputting the branch address to the port 902. Thus, when the trace output is performed in an operation mode where the CPU is not stopped (non full trace mode), the trace information are lacking, so that a complete history cannot be traced. On the other hand, in the case where the trace output is performed in the full trace mode, the operation time of the CPU is influenced and, especially in the case of realtime applications, there is a high possibility of an inoperative system.

(4) As for the fast branch instruction, problem (3) described above can be removed by associating a setting instruction of a branch address register with the fast branch instruction to suppress the output of the branch address of the fast branch instruction as in the conventional techniques. However, if the trace information of the setting instruction of the branch address register precedent to the fast branch instruction is not remaining in a trace memory, the branch address cannot be traced. This is the same kind of problem as problem (2).

SUMMARY OF THE INVENTION

In view of the above, an objective of the present invention is to optimize a trace information output in a semiconductor integrated circuit capable of executing a program. Another objective of the present invention is to correctly trace a program execution history based on the trace information output from such a semiconductor integrated circuit.

A measure taken by the present invention for achieving the above objective is a semiconductor integrated circuit comprising: a CPU which operates such that when executing a call instruction, the CPU asserts a first signal and outputs a branch address and a return address relating to the call instruction, when executing an interrupt branch, the CPU asserts a second signal and outputs a branch address and a return address relating to the interrupt branch, and when executing a return instruction, the CPU asserts a third signal and outputs a branch address relating to the return instruction; a stack memory to which the return address output from the CPU is pushed when any one of the first and second signals is asserted and from which the pushed return address is popped when the third signal is asserted; a comparator for comparing the return address popped from the stack memory and the branch address output from the CPU; a trace packet control section for receiving a plurality of signals from the CPU to output a trace status code based on the plurality of signals, the plurality of signals including the first through third signals; and an address register for receiving the branch address output from the CPU and outputting the address under control of the trace packet control section. When the third signal is asserted and the trace packet control section receives from the comparator a comparison result which indicates no match, the trace packet control section orders the address register to output the address.

According to this invention, when a call instruction or an interrupt branch is executed by the CPU, its return address is pushed to the stack memory. When a return instruction is executed by the CPU, the return address pushed to the stack memory is popped. The comparator compares the popped address with an actual branch destination output from the CPU. If they do not match, the address register is ordered by the trace packet control section to output as the trace information the branch address output from the CPU. That is, only when a return instruction is executed but its branch destination is different from an expected branch destination, the branch address is output as the trace information, and the trace information output is optimized.

There is provided a development support system, in which a program execution history is traced based on trace information output from the above-described semiconductor integrated circuit, the system comprising: a trace memory for storing a trace status code and an address output from the above-described semiconductor integrated circuit as trace information; and an execution history tracing section for tracing an execution history of a source program executed by the CPU of the semiconductor integrated circuit by sequentially collating the source program and the trace information stored in the trace memory. The execution history tracing section operates such that: in any one of a case where a call instruction is detected in the source program and a case where a code which indicates execution of an interrupt branch is detected in the trace information, the execution history tracing section acquires a return address from the source program to push the acquired return address and acquires a branch address from the trace information to trace the acquired branch address; and when a return instruction is detected in the source program, the execution history tracing section pops the pushed return address to trace the popped return address.

According to this invention, when the execution history tracing section detects a call instruction in a source program or detects a code which indicates execution of an interrupt branch in the trace information stored in the trace memory, the return address acquire from the source program is pushed, and the branch address acquired from the trace information is traced. When a return instruction is detected in the source program, the pushed return address is popped and traced. Therefore, a branch address in the execution of a task switch or an interrupt which cannot be followed only with the source program is acquired from the trace information, so that the program execution history is correctly traced.

There is provided a method for tracing an execution history of a source program executed by the CPU of the above-described semiconductor integrated circuit by acquiring from the above-described semiconductor integrated circuit a trace status code and an address as trace information and sequentially collating the source program and the trace information, the method comprising the steps of: detecting a call instruction in the source program; detecting a code which indicates execution of an interrupt branch in the trace information; detecting a return instruction in the source program; when any one of the call instruction and the code is detected, acquiring a return address from the source program to push the acquired return address; when any one of the call instruction and the code is detected, acquiring a branch address from the trace information to trace the branch address; and when the return instruction is detected, popping the pushed return address to trace the return address.

According to this invention, when a call instruction is detected in a source program or a code which indicates execution of an interrupt branch is detected in the stored trace information, the return address acquire from the source program is pushed, and the branch address acquired from the trace information is traced. When a return instruction is detected in the source program, the pushed return address is popped and traced. Therefore, a branch address in the execution of a task switch or an interrupt which cannot be followed only with the source program is acquired from the trace information, so that the program execution history is correctly traced.

Preferably, in the above-described semiconductor integrated circuit, when the third signal is asserted and an underflow occurs in the stack memory, the trace packet control section orders the address register to output the address.

According to this invention, when a return instruction is executed though the stack memory is vacant, an unexpected branch address is output as the trace information.

Preferably, the above-described semiconductor integrated circuit further comprises a synchronization request generation circuit for asserting a fourth signal when a trace is started. When the fourth signal is asserted, the memory content of the stack memory is initialized.

According to this invention, when a trace is started in the midst of program execution, the content of the stack memory is initialized. When a return instruction is executed in response to a call instruction, or the like, which has been executed before the start of the trace, the stack memory is vacant. Therefore, it is inconsistent with the branch address of the return instruction, and a branch address relating to a subsequent return instruction(s) is output as the trace information. As a result, the execution history before the start of the trace is correctly traced by the development support system.

More preferably, when executing an instruction, the CPU outputs an execution address of the executed instruction. The above-described semiconductor integrated circuit includes a selector for selectively outputting any one of the branch address and the execution address output from the CPU. The address register receives the address output from the selector instead of the branch address output from the CPU and outputs the address under control of the trace packet control section. The trace packet control section operates such that: when the fourth signal is asserted, the trace packet control section outputs a code which indicates start of a trace as a trace status code, and in such a case, if the first and second signals are negated, the trace packet control section orders the selector to select the execution address, and if otherwise, the trace packet control section orders the selector to select the branch address.

According to this invention, when a trace is started, if an instruction to be executed is a normal sequential execution instruction, its execution address is output as the trace information. If it is a branch instruction, its branch address is output. As a result, the address information of a trace start point is output.

There is provided a development support system, in which a program execution history is traced based on trace information output from the above-described semiconductor integrated circuit, the system comprising: a trace memory for storing a trace status code and an address output from the above-described semiconductor integrated circuit as trace information; and an execution history tracing section for tracing an execution history of a source program executed by the CPU of the semiconductor integrated circuit by sequentially collating the source program and the trace information stored in the trace memory. The execution history tracing section operates such that: in any one of a case where a call instruction is detected in the source program and a case where a code which indicates execution of an interrupt branch is detected in the trace information, the execution history tracing section acquires a return address from the source program to push the acquired return address and acquires a branch address from the trace information to trace the acquired branch address; when a return instruction is detected in the source program, the execution history tracing section pops the pushed return address to trace the popped return address; and when a code which indicates start of a trace is detected in the trace information, the execution history tracing section initializes the pushed return address and acquires any one of an execution address and a branch address corresponding to the code from the trace information to trace the acquired address.

According to this invention, when the execution history tracing section detects a code which indicates start of a trace in the trace information stored in the trace memory, pushed return addresses are initialized, and any one of an execution address and a branch address which corresponds to the code acquired from the trace information is traced. Thus, the execution history is correctly traced even immediately after the start of the trace.

There is provided a method for tracing an execution history of a source program executed by the CPU of the above-described semiconductor integrated circuit by acquiring from the above-described semiconductor integrated circuit a trace status code and an address as trace information and sequentially collating the source program and the trace information, the method comprising the steps of: detecting a call instruction in the source program; detecting a return instruction in the source program; detecting a first code which indicates execution of an interrupt branch in the trace information; detecting a second code which indicates start of a trace in the trace information; when any one of the call instruction and the first code is detected, acquiring a return address from the source program to push the acquired return address; when any one of the call instruction and the first code is detected, acquiring a branch address from the trace information to trace the branch address; when the return instruction is detected, popping the pushed return address to trace the return address; when the second code is detected, initializing the pushed return address; and when the second code is detected, acquiring from the trace information any one of an execution address and a branch address which correspond to the second code to trace the acquired address.

According to this invention, when a code which indicates start of a trace is detected in the trace information, pushed return addresses are initialized, and any one of an execution address and a branch address which corresponds to the code acquired from the trace information is traced. Thus, the execution history is correctly traced even immediately after the start of the trace.

A measure taken by the present invention for achieving the above objective is a semiconductor integrated circuit comprising: a CPU which incorporates an indirect branch instruction of branching to a branch address stored in a register, the CPU operating such that when updating the register, the CPU asserts a first signal, and when executing the indirect branch instruction, the CPU asserts a second signal and outputs a branch address relating to the indirect branch instruction; a loop detection circuit for asserting a third signal during an interval from the assertion of the first signal to the assertion of the second signal; a trace packet control section for receiving a plurality of signals from the CPU to output a trace status code based on the plurality of signals, the plurality of signals including the second signal; and an address register for receiving the branch address output from the CPU and outputting the address under control of the trace packet control section. When the second and third signals are asserted, the trace packet control section orders the address register to output the address.

According to this invention, start of a fast loop process accompanied by a fast branch instruction is detected by the loop detection circuit. When the CPU executes an indirect branch instruction for the first time in the loop process, the branch address of the indirect branch instruction is output as trace information. As for the second or subsequent execution of the indirect branch instruction, no branch address is output. Thus, the trace information output of a semiconductor integrated circuit which incorporates an indirect branch instruction is optimized.

There is provided a development support system, in which a program execution history is traced based on trace information output from the above-described semiconductor integrated circuit, the system comprising: a trace memory for storing a trace status code and an address output from the above-described semiconductor integrated circuit as trace information; and an execution history tracing section for tracing an execution history of a source program executed by the CPU of the semiconductor integrated circuit by sequentially collating the source program and the trace information stored in the trace memory. The execution history tracing section operates such that: when an indirect branch instruction is detected in the source program and a code which indicates execution of an indirect branch instruction accompanied by a branch address is detected in the trace information, the execution history tracing section stores the branch address and traces the branch address; and when an indirect branch instruction is detected in the source program and a code which indicates execution of an indirect branch instruction not accompanied by a branch address is detected in the trace information, the execution history tracing section traces the stored branch address.

According to this invention, when the execution history tracing section detects an indirect branch instruction in a source program and a code which indicates execution of an indirect branch instruction accompanied by a branch address in the trace information stored in the trace memory, the branch address is stored, and the branch address is traced. When the execution history tracing section detects an indirect branch instruction in the source program and a code which indicates execution of an indirect branch instruction not accompanied by a branch address in the trace information, the stored branch address is traced. Thus, as for a fast loop process including an indirect branch instruction, even when the trace information does not include a branch address of an indirect branch instruction associated with the second or subsequent execution, the program execution history is correctly traced.

There is provided a method for tracing an execution history of a source program executed by the CPU of the above-described semiconductor integrated circuit by acquiring from the above-described semiconductor integrated circuit a trace status code and an address as trace information and sequentially collating the source program and the trace information, the method comprising the steps of: detecting an indirect branch instruction in the source program; detecting a first code which indicates execution of an indirect branch instruction accompanied by a branch address in the trace information; detecting a second code which indicates execution of an indirect branch instruction not accompanied by a branch address in the trace information; when the indirect branch instruction and the first code are detected, storing the branch address which accompanies the first code; when the indirect branch instruction and the first code are detected, tracing the branch address which accompanies the first code; and when the indirect branch instruction and the second code are detected, tracing the stored branch address.

According to this invention, when an indirect branch instruction is detected in a source program and a first code which indicates execution of an indirect branch instruction accompanied by a branch address is detected in the trace information, the branch address is stored, and the branch address is traced. When an indirect branch instruction is detected in the source program and a second code which indicates execution of an indirect branch instruction not accompanied by a branch address is detected in the trace information, the stored branch address is traced. Thus, as for a fast loop process including an indirect branch instruction, even when the trace information does not include a branch address of an indirect branch instruction associated with the second or subsequent execution, the program execution history is correctly traced.

Specifically, in the above-described semiconductor integrated circuit, the loop detection circuit includes: a holding circuit for holding the third signal asserted when the first signal is asserted; and a reset circuit for resetting the status held by the holding circuit when the second signal is asserted.

Preferably, the above-described semiconductor integrated circuit further comprises a synchronization request generation circuit for asserting a fourth signal when a trace is started. The loop detection circuit asserts the third signal during an interval from the assertion of the fourth signal to the assertion of the second signal.

According to this invention, in the case where a trace is started in the midst of the program execution, a loop process is again detected by the loop detection circuit and, in the fast loop process started before the start of the trace, a branch address of an indirect branch instruction associated with the execution which is the second or subsequent execution but is the first execution after the start of the trace is output as the trace information. With this arrangement, the execution history prior to the start of the trace is correctly traced by the development support system.

More preferably, when executing an instruction, the CPU outputs an execution address of the executed instruction. The semiconductor integrated circuit includes a selector for selectively outputting any one of the branch address and the execution address output from the CPU. The address register receives the address output from the selector instead of the branch address output from the CPU and outputs the address under control of the trace packet control section. The trace packet control section operates such that: when the fourth signal is asserted, the trace packet control section outputs a code which indicates start of a trace as a trace status code, and in such a case, if the second signal is negated, the trace packet control section orders the selector to select the execution address, and if otherwise, the trace packet control section orders the selector to select the branch address.

According to this invention, when a trace is started, if an instruction to be executed is a normal sequential execution instruction, its execution address is output as the trace information. If it is an indirect branch instruction, its branch address is output. As a result, the address information of a trace start point is output.

There is provided a development support system, in which a program execution history is traced based on trace information output from the above-described semiconductor integrated circuit, the system comprising: a trace memory for storing a trace status code and an address output from the above-described semiconductor integrated circuit as trace information; and an execution history tracing section for tracing an execution history of a source program executed by the CPU of the semiconductor integrated circuit by sequentially collating the source program and the trace information stored in the trace memory. The execution history tracing section operates such that: when an indirect branch instruction is detected in the source program and a code which indicates execution of an indirect branch instruction accompanied by a branch address is detected in the trace information, the execution history tracing section stores the branch address and traces the branch address; when an indirect branch instruction is detected in the source program and a code which indicates execution of an indirect branch instruction not accompanied by a branch address is detected in the trace information, the execution history tracing section traces the stored branch address; and when a code which indicates start of a trace is detected in the trace information, the execution history tracing section acquires any one of an execution address and a branch address corresponding to the code from the trace information to trace the acquired address.

According to this invention, when the execution history tracing section detects a code which indicates start of a trace in the trace information stored in the trace memory, any one of an execution address and a branch address which corresponds to the code acquired from the trace information is traced. Thus, the execution history is correctly traced even immediately after the start of the trace.

There is provided a method for tracing an execution history of a source program executed by the CPU of the above-described semiconductor integrated circuit by acquiring from the above-described semiconductor integrated circuit a trace status code and an address as trace information and sequentially collating the source program and the trace information, the method comprising the steps of: detecting an indirect branch instruction in the source program; detecting a first code which indicates execution of an indirect branch instruction accompanied by a branch address in the trace information; detecting a second code which indicates execution of an indirect branch instruction not accompanied by a branch address in the trace information; detecting a third code which indicates start of a trace in the trace information; when the indirect branch instruction and the first code are detected, storing the branch address which accompanies the first code; when the indirect branch instruction and the first code are detected, tracing the branch address which accompanies the first code; when the indirect branch instruction and the second code are detected, tracing the stored branch address; and when the third code is detected, acquiring any one of an execution address and a branch address which correspond to the third code from the trace information to trace the acquired address.

According to this invention, when a code which indicates start of a trace is detected in the trace information, any one of an execution address and a branch address which corresponds to the code acquired from the trace information is traced. Thus, the execution history is correctly traced even immediately after the start of the trace.

A measure taken by the present invention for achieving the above objective is a semiconductor integrated circuit comprising: a CPU which incorporates an indirect branch instruction of branching to a branch address stored in a register, the CPU operating such that when executing the indirect branch instruction, the CPU asserts a first signal and outputs a branch address relating to the indirect branch instruction; a first address register for outputting a stored address when the first signal is asserted to store the branch address output from the CPU, a comparator for comparing the branch address output from the first address register and the branch address output from the CPU; a trace packet control section for receiving a plurality of signals from the CPU to output a trace status code based on the plurality of signals, the plurality of signals including the first signal; and a second address register for receiving the branch address output from the CPU and outputting the address under control of the trace packet control section. When the first signal is asserted and the trace packet control section receives from the comparator a comparison result which indicates no match, the trace packet control section orders the second address register to output the address.

According to this invention, when an indirect branch instruction is executed by the CPU, a branch address stored in the first address register is output, and the content of the first address register is updated. The comparator compares the branch address of the executed indirect branch instruction and the branch address output from the first address register. If the addresses do not match, the branch address output from the CPU is output as the trace information. If they match, the branch address is not output. That is, in a fast loop process including an indirect branch instruction, as for the first execution of the indirect branch instruction, its branch address is output as the trace information. As for the second or subsequent execution of the indirect branch instruction, no branch address is output. With such an arrangement, the trace information output of a semiconductor integrated circuit which incorporates an indirect branch instruction is optimized.

There is provided a development support system, in which a program execution history is traced based on trace information output from the above-described semiconductor integrated circuit, the system comprising: a trace memory for storing a trace status code and an address output from the above-described semiconductor integrated circuit as trace information; and an execution history tracing section for tracing an execution history of a source program executed by the CPU of the semiconductor integrated circuit by sequentially collating the source program and the trace information stored in the trace memory. The execution history tracing section operates such that: when an indirect branch instruction is detected in the source program and a code which indicates execution of an indirect branch instruction accompanied by a branch address is detected in the trace information, the execution history tracing section stores the branch address and traces the branch address; and when an indirect branch instruction is detected in the source program and a code which indicates execution of an indirect branch instruction not accompanied by a branch address is detected in the trace information, the execution history tracing section traces the stored branch address.

According to this invention, when the execution history tracing section detects an indirect branch instruction in a source program and a code which indicates execution of an indirect branch instruction accompanied by a branch address in the trace information stored in the trace memory, the branch address is stored, and the branch address is traced. When the execution history tracing section detects an indirect branch instruction in the source program and a code which indicates execution of an indirect branch instruction not accompanied by a branch address in the trace information, the stored branch address is traced. Thus, as for a fast loop process including an indirect branch instruction, even when the trace information does not include a branch address of an indirect branch instruction associated with the second or subsequent execution, the program execution history is correctly traced.

There is provided a method for tracing an execution history of a source program executed by the CPU of the above-described semiconductor integrated circuit by acquiring from the above-described semiconductor integrated circuit a trace status code and an address as trace information and sequentially collating the source program and the trace information, the method comprising the steps of: detecting an indirect branch instruction in the source program; detecting a first code which indicates execution of an indirect branch instruction accompanied by a branch address in the trace information; detecting a second code which indicates execution of an indirect branch instruction not accompanied by a branch address in the trace information; when the indirect branch instruction and the first code are detected, storing the branch address which accompanies the first code; when the indirect branch instruction and the first code are detected, tracing the branch address which accompanies the first code; and when the indirect branch instruction and the second code are detected, tracing the stored branch address.

According to this invention, when an indirect branch instruction is detected in a source program and a first code which indicates execution of an indirect branch instruction accompanied by a branch address is detected in the trace information, the branch address is stored, and the branch address is traced. When an indirect branch instruction is detected in the source program and a second code which indicates execution of an indirect branch instruction not accompanied by a branch address is detected in the trace information, the stored branch address is traced. Thus, as for a fast loop process including an indirect branch instruction, even when the trace information does not include a branch address of an indirect branch instruction associated with the second or subsequent execution, the program execution history is correctly traced.

The above-described semiconductor integrated circuit further comprises a synchronization request generation circuit for asserting a second signal when a trace is started. When the second signal is asserted, the memory content of the first address register is initialized.

According to this invention, when a trace is started in the midst of program execution, the content of the first address register is initialized and, in a fast loop process started before the start of the trace, a branch address of an indirect branch instruction associated with the execution which is the second or subsequent execution but is the first execution after the start of the trace is output as the trace information. With this arrangement, the execution history prior to the start of the trace is correctly traced by the development support system.

More preferably, when executing an instruction, the CPU outputs an execution address of the executed instruction. The semiconductor integrated circuit includes a selector for selectively outputting any one of the branch address and the execution address output from the CPU. The second address register receives the address output from the selector instead of the branch address output from the CPU and outputs the address under control of the trace packet control section. The trace packet control section operates such that: when the second signal is asserted, the trace packet control section outputs a code which indicates start of a trace as a trace status code, and in such a case, if the first signal is negated, the trace packet control section orders the selector to select the execution address, and if otherwise, the trace packet control section orders the selector to select the branch address.

According to this invention, when a trace is started, if an instruction to be executed is a normal sequential execution instruction, its execution address is output as the trace information. If it is an indirect branch instruction, its branch address is output. As a result, the address information of a trace start point is output.

There is provided a development support system, in which a program execution history is traced based on trace information output from the above-described semiconductor integrated circuit, the system comprising: a trace memory for storing a trace status code and an address output from the above-described semiconductor integrated circuit as trace information; and an execution history tracing section for tracing an execution history of a source program executed by the CPU of the semiconductor integrated circuit by sequentially collating the source program and the trace information stored in the trace memory. The execution history tracing section operates such that: when an indirect branch instruction is detected in the source program and a code which indicates execution of an indirect branch instruction accompanied by a branch address is detected in the trace information, the execution history tracing section stores the branch address and traces the branch address; when an indirect branch instruction is detected in the source program and a code which indicates execution of an indirect branch instruction not accompanied by a branch address is detected in the trace information, the execution history tracing section traces the stored branch address; and when a code which indicates start of a trace is detected in the trace information, the execution history tracing section acquires any one of an execution address and a branch address corresponding to the code from the trace information to trace the acquired address.

According to this invention, when the execution history tracing section detects a code which indicates start of a trace in the trace information stored in the trace memory, any one of an execution address and a branch address which corresponds to the code acquired from the trace information is traced. Thus, the execution history is correctly traced even immediately after the start of the trace.

There is provided a method for tracing an execution history of a source program executed by the CPU of the above-described semiconductor integrated circuit by acquiring from the above-described semiconductor integrated circuit a trace status code and an address as trace information and sequentially collating the source program and the trace information, the method comprising the steps of: detecting an indirect branch instruction in the source program; detecting a first code which indicates execution of an indirect branch instruction accompanied by a branch address in the trace information; detecting a second code which indicates execution of an indirect branch instruction not accompanied by a branch address in the trace information; detecting a third code which indicates start of a trace in the trace information; when the indirect branch instruction and the first code are detected, storing the branch address which accompanies the first code; when the indirect branch instruction and the first code are detected, tracing the branch address which accompanies the first code; when the indirect branch instruction and the second code are detected, tracing the stored branch address; and when the third code is detected, acquiring any one of an execution address and a branch address which correspond to the third code from the trace information to trace the acquired address.

According to this invention, when a code which indicates start of a trace is detected in the trace information, any one of an execution address and a branch address which corresponds to the code acquired from the trace information is traced. Thus, the execution history is correctly traced even immediately after the start of the trace.

As described above, according to the present invention, in the trace of a program execution history, a branch address which is traceable by referring to a source program is not output as the trace information. Instead, a branch address which cannot be traceable only by referring to the source program, e.g., a branch address associated with a return instruction which is issued in the case where a task switch, an interrupt process, or the like, occurs, or in the case where start of the trace is delayed from the start of program execution, is output as the trace information. With such an arrangement, the trace information output of the semiconductor integrated circuit is optimized. Further, a correct program execution history is traced based on the trace information output from such a semiconductor integrated circuit.

BRIEF DESCRIPTION OF THE DRAWINGS

FIG. 2 shows a status decode table of a trace packet control section in the semiconductor integrated circuit according to embodiment 1 of the present invention.

FIG. 4 shows trace information which is output when the program of FIG. 3 is executed by the semiconductor integrated circuit of embodiment 1 of the present invention.

FIG. 7 shows a program execution history traced by the development support system of embodiment 1 of the present invention.

FIG. 9 shows a status decode table of a trace packet control section in the semiconductor integrated circuit according to embodiment 2 of the present invention.

FIG. 11 shows trace information which is output when the program of FIG. 10 is executed by the semiconductor integrated circuit of embodiment 2 of the present invention.

FIG. 14 shows a program execution history traced by the development support system of embodiment 2 of the present invention.

FIG. 16 shows trace information which is output when the program of FIG. 15 is executed by the semiconductor integrated circuit of embodiment 2 of the present invention.

FIG. 17 shows a program execution history traced by the development support system of embodiment 2 of the present invention.

FIG. 20 shows a status decode table of a trace packet control section in the semiconductor integrated circuit according to embodiment 3 of the present invention.

FIG. 22 shows trace information which is output when the program of FIG. 21 is executed by the semiconductor integrated circuit of embodiment 3 of the present invention.

FIG. 25 shows a program execution history traced by the development support system of embodiment 3 of the present invention.

FIG. 27 shows a status decode table of a trace packet control section in the semiconductor integrated circuit according to embodiment 4 of the present invention.

FIG. 29 shows trace information which is output when the program of FIG. 28 is executed by the semiconductor integrated circuit of embodiment 4 of the present invention.

FIG. 32 shows a program execution history traced by the development support system of embodiment 4 of the present invention.

FIG. 34 shows trace information which is output when the program of FIG. 33 is executed by the semiconductor integrated circuit of embodiment 4 of the present invention.

FIG. 35 shows a program execution history traced by the development support system of embodiment 4 of the present invention.

FIG. 37 shows a status decode table of a trace packet control section in the semiconductor integrated circuit according to embodiment 5 of the present invention.

FIG. 39 shows trace information which is output when the program of FIG. 38 is executed by the semiconductor integrated circuit of embodiment 5 of the present invention.

FIG. 42 shows a program execution history traced by the development support system of embodiment 5 of the present invention.

FIG. 44 shows trace information which is output when the program of FIG. 43 is executed by the semiconductor integrated circuit of embodiment 5 of the present invention.

FIG. 45 shows a program execution history traced by the development support system of embodiment 5 of the present invention.

FIG. 47 shows a status decode table of a trace packet control section in the semiconductor integrated circuit of FIG. 46.

FIG. 50 shows trace information which is output when the program of FIG. 49 is executed.

FIG. 52 shows a program execution history traced based on the trace information of FIG. 50.

DESCRIPTION OF THE PREFERRED EMBODIMENTS

Hereinafter, the best modes for carrying out the present invention will be described with reference to the drawings.

Embodiment 1

Figure 1:
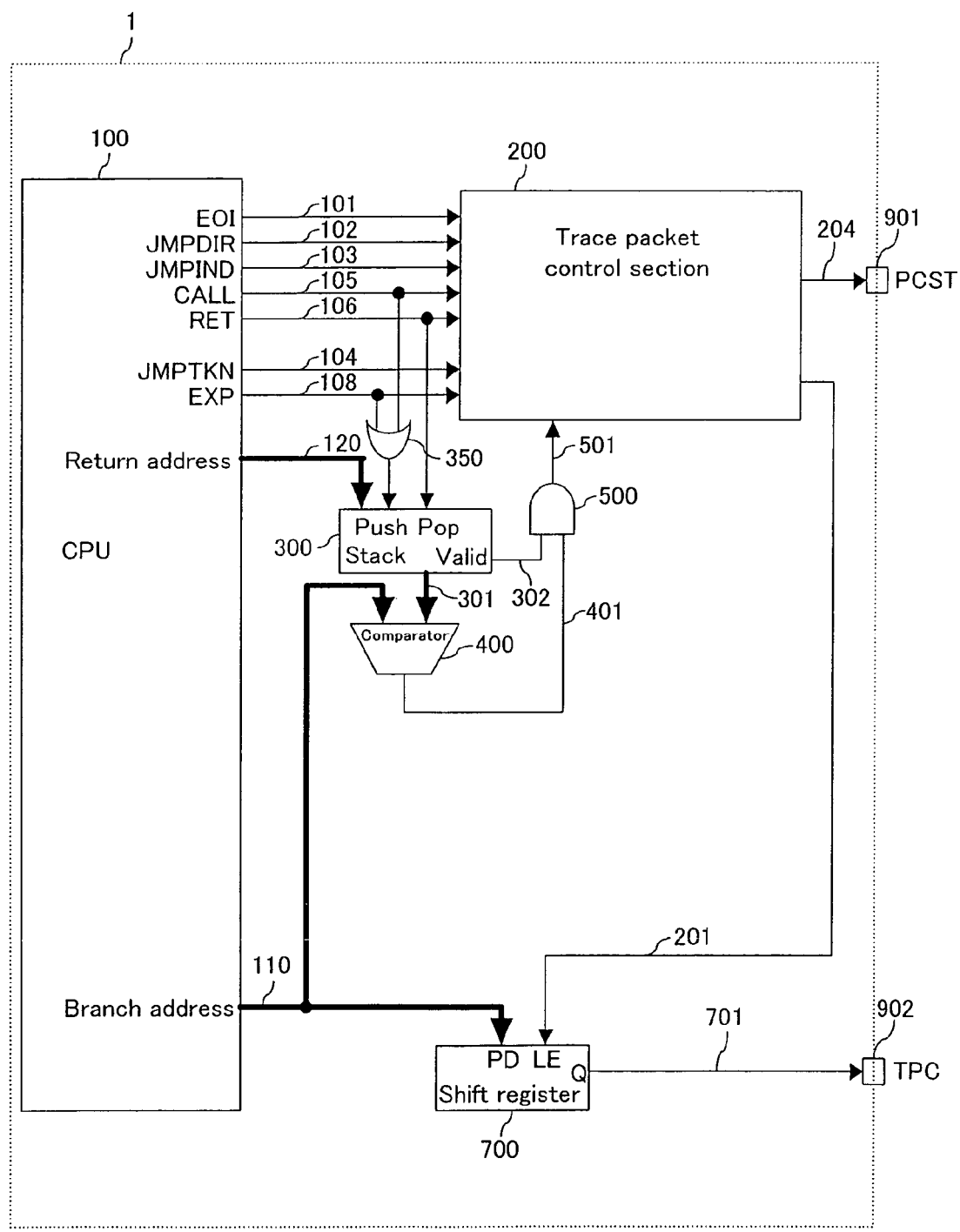
FIG. 1 shows a structure of a semiconductor integrated circuit according to embodiment 1 of the present invention.

FIG. 1 shows a structure of a semiconductor integrated circuit according to embodiment 1 of the present invention. The semiconductor integrated circuit 1 of the present embodiment includes a CPU 100, a trace packet control section 200, a stack memory 300, a comparator 400 and a shift register 700.

When an instruction execution is completed, the CPU 100 asserts an instruction execution completion signal (EOI) 101. When executing a direct branch instruction, the CPU 100 asserts a direct branch instruction execution signal (JMPDIR) 102. When executing an indirect branch instruction, the CPU 100 asserts an indirect branch instruction execution signal (JMPIND) 103. When executing a conditional branch instruction, the CPU 100 asserts a condition fulfillment signal (JMPTKN) 104. When executing a function call instruction, the CPU 100 asserts a function call instruction execution signal (CALL) 105. When executing a function return instruction or an interrupt return instruction, the CPU 100 asserts a return instruction execution signal (RET) 106. When receiving an interrupt to execute a branch, the CPU 100 asserts an interrupt execution signal (EXP) 108. When executing a function call instruction, an interrupt branch, a function return instruction or an interrupt return instruction, the CPU 100 outputs its branch address 110. When executing a function call instruction or an interrupt branch, the CPU 100 outputs its return address 120.

The stack memory 300 receives the logical sum of signals CALL and EXP, which is calculated by an OR circuit 350, as a push signal. The stack memory 300 further receives signal RET as a pop signal and the return address 120 as data. Specifically, when a function call instruction or an interrupt branch is executed by the CPU 100, the return address 120 output from the CPU 100 is pushed to the stack memory 300. When a function return instruction or an interrupt return instruction is executed, the return address which is being pushed is popped from the stack memory 300 and output as stack top data 301. The output data 301 represents the expectation value of the return address. When a stack content is valid, the stack memory 300 asserts a stack valid signal 302.

The comparator 400 compares the data 301 output from the stack memory 300 and the branch address 110 output from the CPU 100 to output a comparison result signal 401 which indicates whether the data 301 and the branch address 110 match or not. If they match, the comparison result signal 401 is asserted. If they do not match, the comparison result signal 401 is negated. An AND circuit 500 generates the logical product of the comparison result signal 401 and the stack valid signal 302. The logical product is sent to the trace packet control section 200 as a return address match signal 501.

FIG. 2 shows a status decode table of the trace packet control section 200. The trace packet control section 200 receives signals EOI, JMPDIR, JMPIND, CALL, RET, JMPTKN and EXP and the return address match signal 501. A branch address load enable signal (TPCLDEN) 201 and a code 204 which is to be output to a trace status port (PCST) 901 are determined according to the status decode table of FIG. 2.

When signal TPCLDEN is asserted, the shift register 700 loads the branch address 110 and converts the loaded address 110 into serial data (data 701). The shift register 700 sends the data 701 to a branch address output port (TPC) 902.

Figure 48:
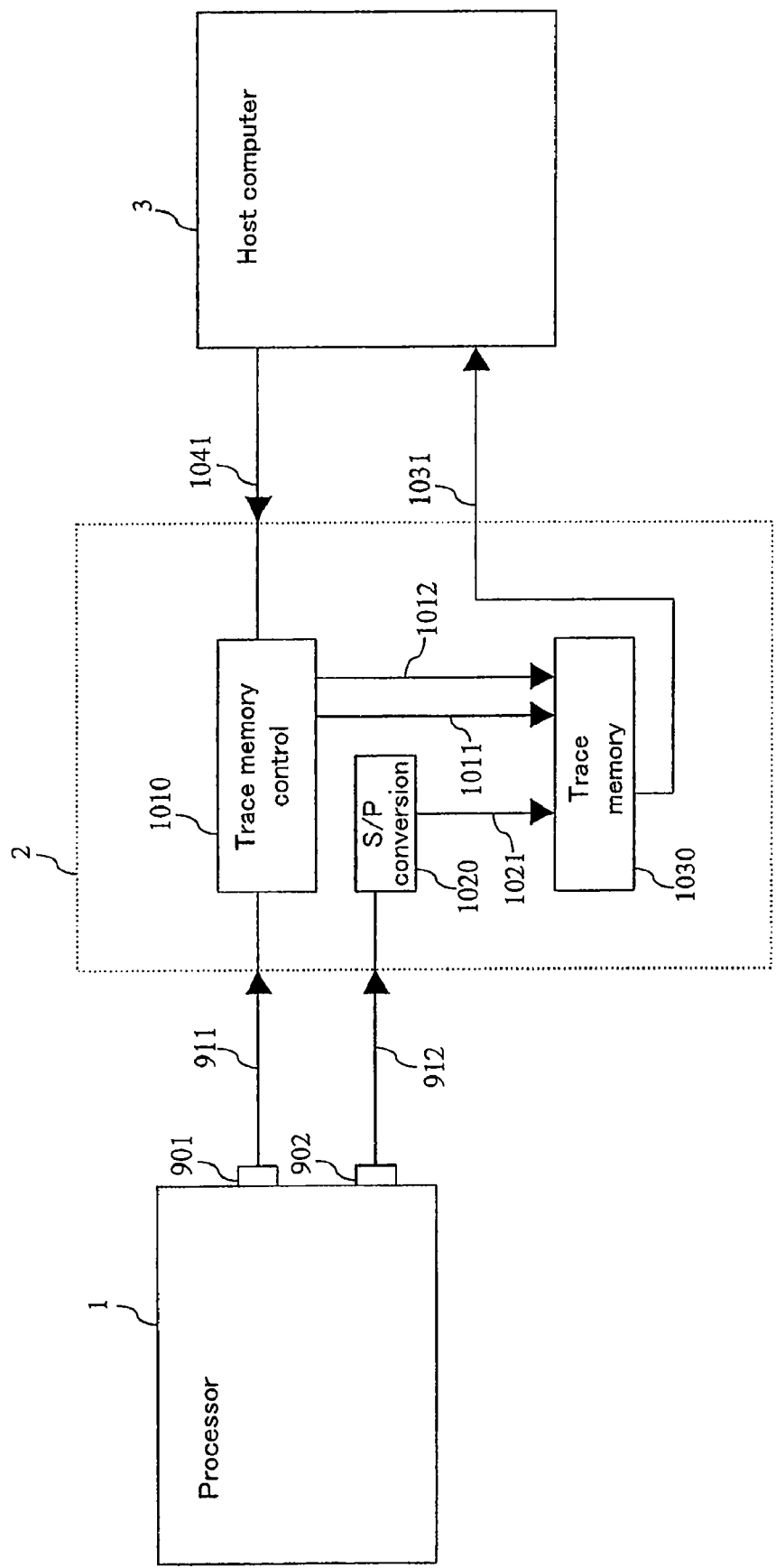
FIG. 48 shows a structure of a development support system.
Figure 49:
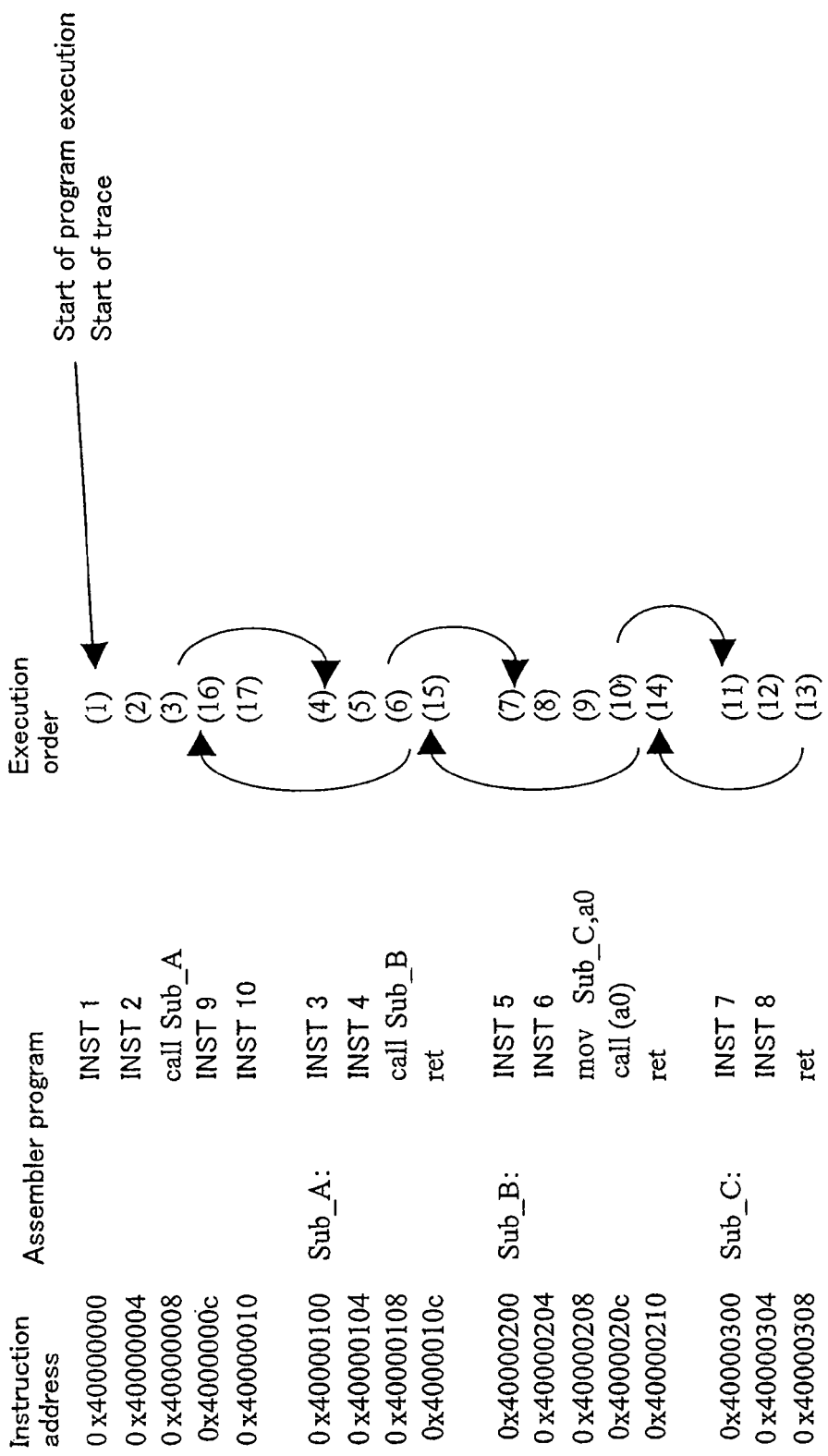
FIG. 49 illustrates an example of an execution program and an execution order.
Figure 51:
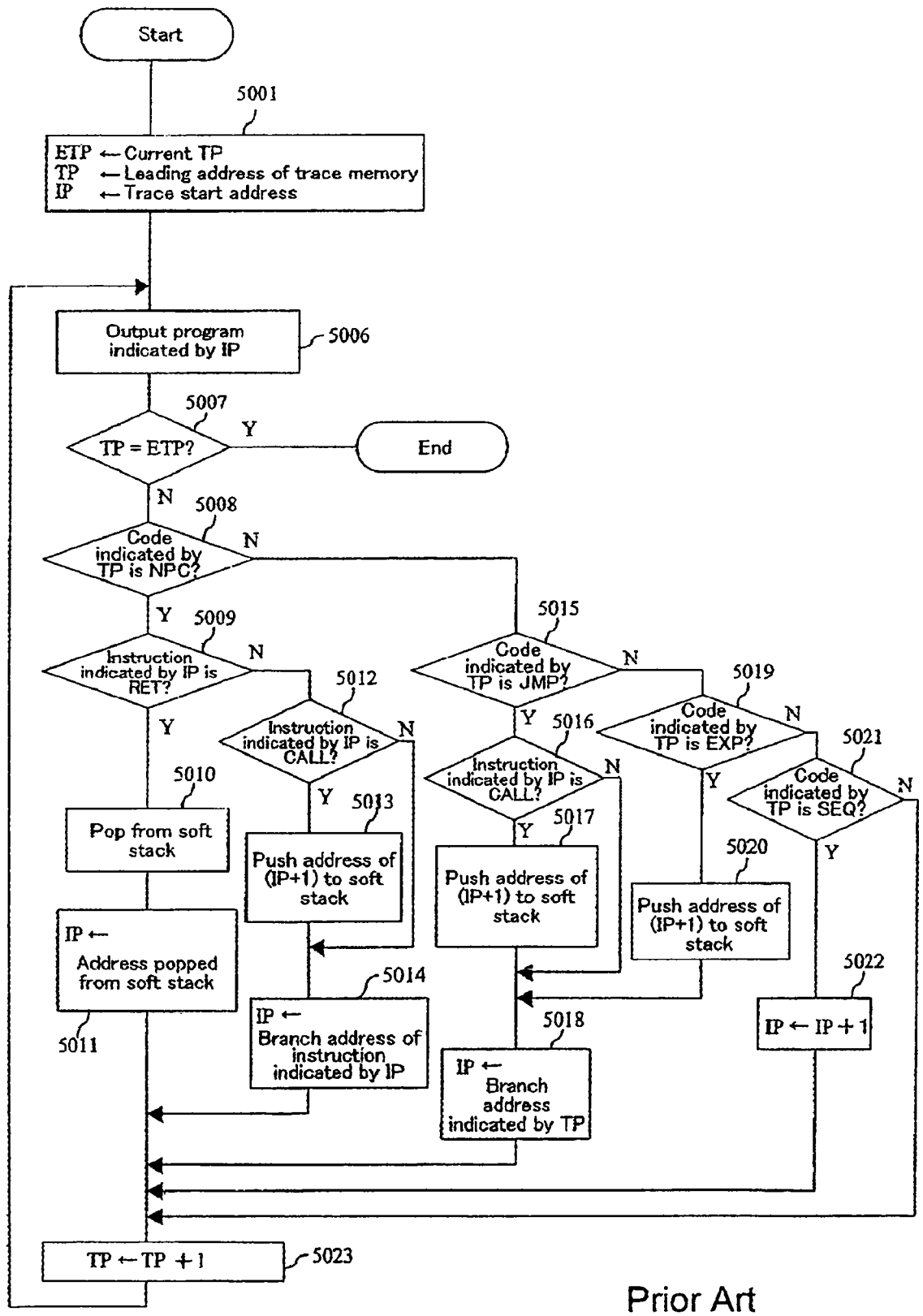
FIG. 51 is a flowchart of a conventional execution history tracing method.

A development support system of the present embodiment has the same structure as that of the development support system shown in FIG. 48. In the trace information accumulation device 2, a trace memory controller 1010 and a serial to parallel converter 1020 respectively reform the trace status signal 911 and the branch address signal 912 output from a semiconductor integrated circuit 1, and the reformed signals are accumulated in the trace memory 1030 as trace information. The host computer 3 sends a trace memory read request 1041 to the trace information accumulation device 2 to acquire a trace memory output 1031. The host computer 3 sequentially collates the acquired information with a source program, thereby tracing a program execution history of the semiconductor integrated circuit 1. The operation of the host computer (execution history tracing section) 3 is different from that of the conventional one, which will be described later.

Figure 3:
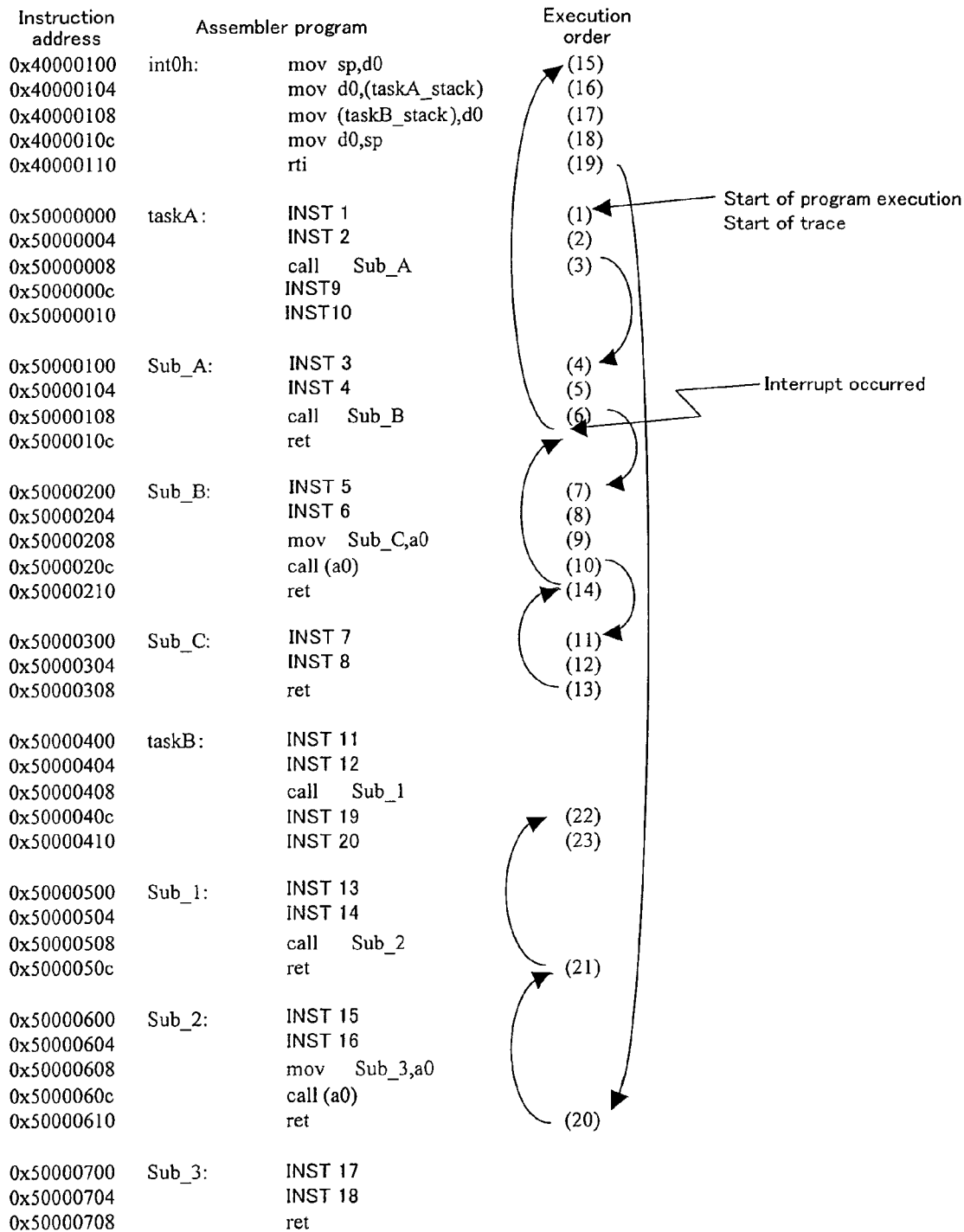
FIG. 3 illustrates an example of a program and an execution order.

Next, trace information output and execution history tracing by the semiconductor integrated circuit 1 and the development support system of the present embodiment are described with an example of executing a program shown in FIG. 3. In this example, the semiconductor integrated circuit 1 starts the program execution and trace from the instruction of address "0x50000000" (execution order "1"), i.e., "INST 1". Then, the semiconductor integrated circuit 1 executes the instruction "ret" of address "0x50000210" (execution order "14") and thereafter receives an interrupt to execute a branch. The semiconductor integrated circuit 1 switches the task from "task A" to "task B" in an interrupt handler "int0h" and returns to address "0x50000610" according to instruction "rti" of address "0x40000110" (execution order "19"). It should be noted that storage and return processes of a register, or the like, are omitted.

FIG. 4 illustrates trace information which is output when the semiconductor integrated circuit 1 executes the program shown in FIG. 3. The trace information of FIG. 4 is a result of the operation of the semiconductor integrated circuit 1 which will be described below. In the descriptions below, in the case where the addresses are pushed to the stack memory 300 in the order of A, B, C and D, the stack content of the stack memory 300 is represented as (D, C, B, A). When popped from the stack memory 300, the stack top data 301 is output in the order of D, C, B and A.

When the CPU 100 sequentially executes instructions in the normal execution order of "1, 2, 4, 5, 7, 8, 9, 11, 12, 15, 16, 17, 18, 22, 23", only signal EOI is asserted (output "1"). At this point in time, signal TPCLDEN is not asserted (output "0") while only code "SEQ" is output as the trace information.

When the CPU 100 executes the call instruction "call Sub A" of address "0x50000008" (execution order "3"), signals JMPDIR, CALL, JMPTKN and EOI are asserted. At this point in time, the push signal output from the OR circuit 350 is asserted, whereby the return address 120 output from the CPU 100 ("0x5000000c") is pushed, and the content of the stack memory 300 results in:

(0x5000000c).

At this point in time, signal TPCLDEN is not asserted while only code "NPC" is output as the trace information.

When the CPU 100 executes the call instruction "call Sub B" of address "0x50000108" (execution order "6"), the return address 120 ("0x5000010c") is pushed, and the content of the stack memory 300 results in:

(0x5000010c, 0x5000000c).

At this point in time, only code "NPC" is output as the trace information.

When the CPU 100 executes the call instruction "call (a0)" of address "0x5000020c" (execution order "10"), the return address 120 ("0x50000210") is pushed, and the content of the stack memory 300 results in:

(0x50000210, 0x5000010c, 0x5000000c).

At this point in time, the branch condition is met, and therefore, signal JMAPIND is asserted, and signal TPCLDEN is asserted (output "1"). As a result, only code "JMP" is output as the trace information. As a result of the assertion of signal TPCLDEN, the shift register 700 receives the branch address 110 ("0x50000300") output from the CPU 100 and output branch address "0x50000300" as the trace information.

When the CPU 100 executes the return instruction "ret" of address "0x50000308" (execution order "13"), signal RET is asserted. Then, the expectation value of the return address, "0x50000210", is popped, and the content of the stack memory 300 results in:

(0x5000010c, 0x5000000c).

At this point in time, the popped expectation value ("0x50000210") matches the actual branch address 110 output from the CPU 100 ("0x500002110"), and therefore, the comparison result signal 401 is asserted (output "1"). In the meanwhile, since the content of the stack memory 300 is valid, the stack valid signal 302 is asserted, and as a result, the return address match signal 501 is asserted (output "1"). When signal RET and the return address match signal 501 are asserted, signal TPCLDEN is not asserted while only code "NPC" is output as the trace information.

When the CPU 100 executes the return instruction "ret" of address "0x50000210" (execution order "14"), the expectation value of the return address, "0x5000010c", is popped, and the content of the stack memory 300 results in:

(0x5000000c).

At this point in time, the popped expectation value ("0x5000010c") matches the branch address 110 output from the CPU 100 ("0x5000010c"), and therefore, only code "NPC" is output as the trace information.

After the execution of the return instruction "ret" of execution order "14" (address "0x50000210"), an interrupt occurs before the execution of the return instruction "ret" of the return address "0x5000010c". The CPU 100 receives this interrupt, and signal EXP is asserted. At this point in time, the push signal output from the OR circuit 350 is asserted, whereby the return address 120 output from the CPU 100 ("0x5000010c") is pushed, and the content of the stack memory 300 results in:

(0x5000010c, 0x5000000c).

At this point in time, signal TPCLDEN is asserted, and code "EXP" and branch address "0x40000100" are output as the trace information.

In the interrupt hander "int0h", the stack is switched. When the CPU executes the interrupt return instruction "rti" of execution order "19" (address "0x40000110"), signal RET is asserted. Then, the expectation value of the return address, "0x5000010c", is popped, and the content of the stack memory 300 results in:

(0x5000000c).

At this point in time, the branch address 110 output from the CPU 100 is "0x50000610" and therefore does not match the popped expectation value "0x5000010c". Thus, the comparison result signal 401 is not asserted (output "0"), and the return address match signal 501 is also not asserted. When signal RET is asserted and the return address match signal 501 is not asserted, signal TPCLDEN is asserted, and code "JMP" and the branch address "0x50000610" are output as the trace information.

When the CPU 100 executes the return instruction "ret" of execution order "20" (address "0x50000610"), the expectation value of the return address, "0x5000000c", is popped, and the content of the stack memory 300 results in:

( ).

At this point in time, the branch address 110 output from the CPU 100 is "0x5000050c" which does not match the popped expectation value "0x5000000c". Thus, code "JMP" and the branch address "0x5000050c" are output as the trace information.

When the CPU 100 executes the return instruction "ret" of execution order "21" (address "0x5000050c"), signal RET is asserted. However, the stack memory 300 is vacant, and accordingly, an underflow occurs. As a result, the stack valid signal 302 is negated (output "0"), and the return address match signal 501 is also negated (output "0"). When signal RET is asserted and the return address match signal 501 is not asserted, signal TPCLDEN is asserted, and code "JMP" and the branch address "0x5000040c" are output as the trace information.

Through the above operation, the trace information shown in FIG. 4 is output from the semiconductor integrated circuit 1 of the present embodiment.

Figure 5:
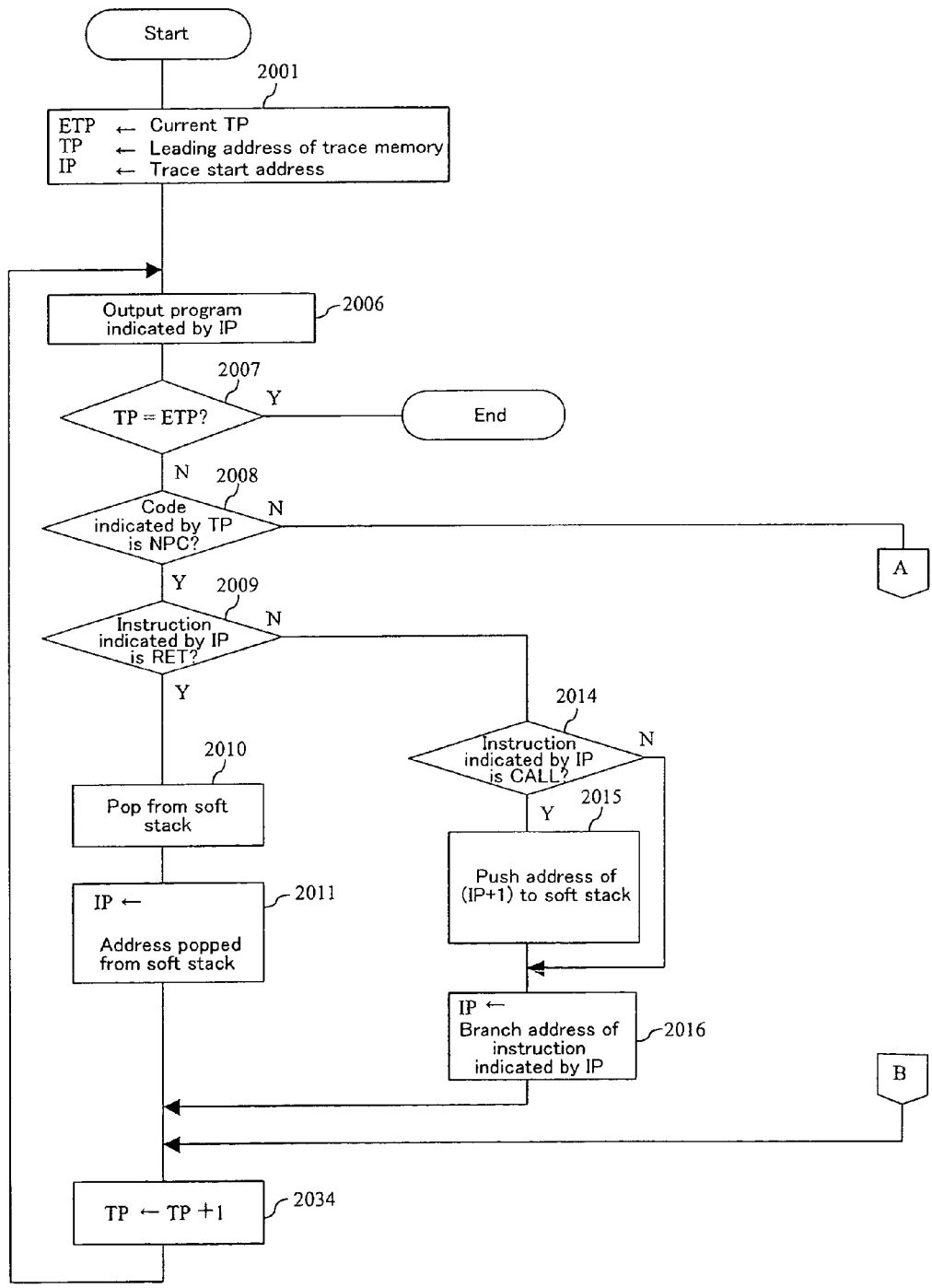
FIG. 5 is a flowchart of an execution history tracing method which is performed by a development support system of embodiment 1 of the present invention.
Figure 6:
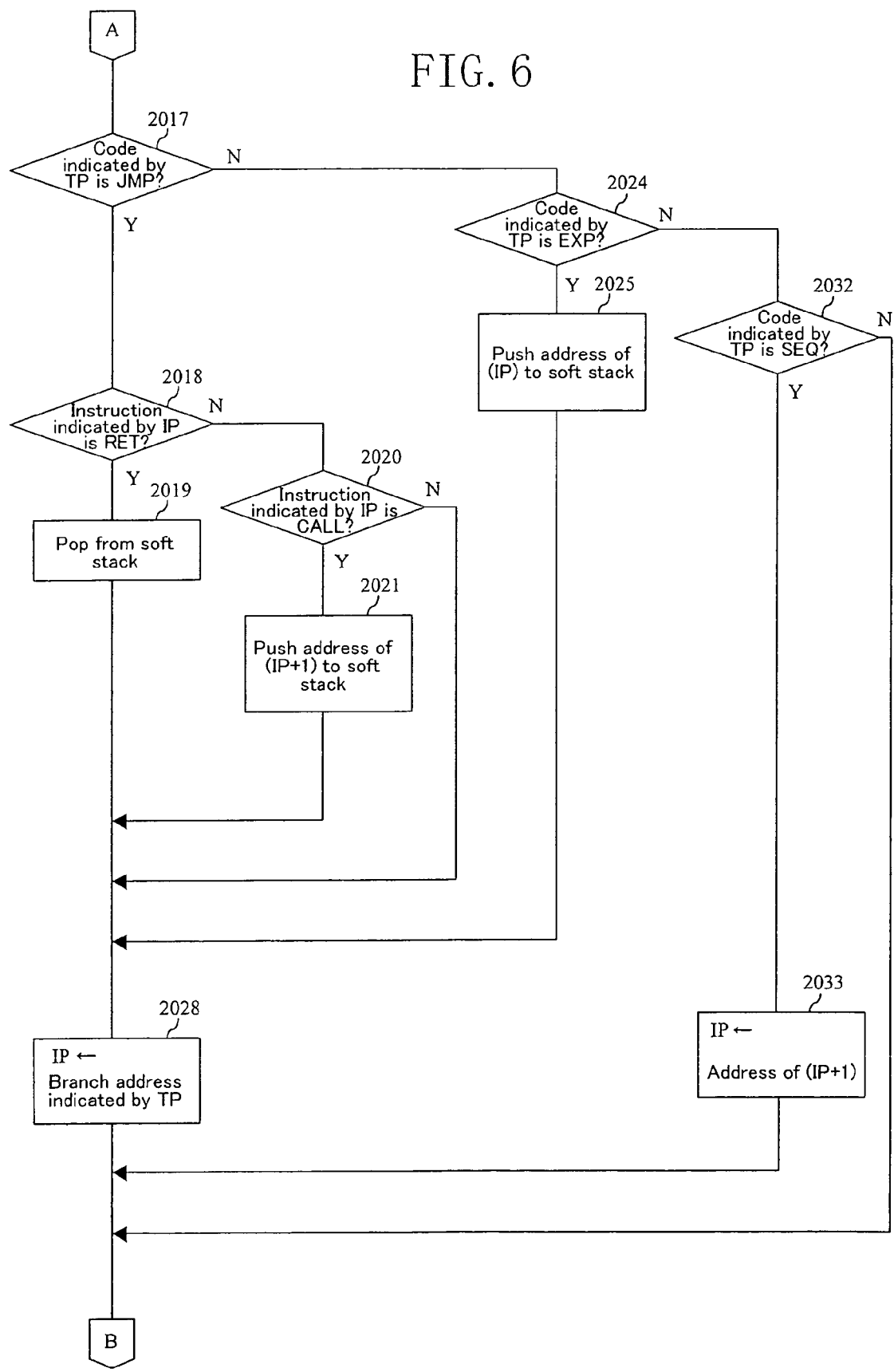
FIG. 6 is a flowchart of the execution history tracing method which is performed by the development support system of embodiment 1 of the present invention.

FIGS. 5 and 6 show a flowchart of an execution history tracing method which is executed by the development support system of the present embodiment. FIG. 7 shows a program execution history traced by the development support system of the present embodiment. The program execution history shown in FIG. 7 is a result of the execution of the execution history tracing method which will be described below.

At the start of the process, the trace pointer (TP) is "24" (IP=24). First, at step 2001, an end trace pointer (ETP) is set to the current trace pointer (ETP=24), the trace pointer (TP) is set to the leading address of the trace memory (TP=0), and an instruction execution pointer (IP) is set to the trace start address (IP=0x50000000).

When TP=0, IP=0x50000000. At step 2006, a program portion obtained from a source program, "0x50000000 task A: INST 1", is traced and output. At this point in time, the code described in the trace information is "SEQ" (steps 2007, 2008, 2017, 2024 and 2032). Therefore, IP is incremented at step 2033 (IP=0x50000004), and TP is incremented at step 2034 (TP=1). Thereafter, the process returns to step 2006. The same process is performed when TP=1, 3, 4, 6, 7, 8, 10, 11, 15, 16, 17, 18, 22 and 23.

When TP=2, IP=0x50000008. The code described in the trace information is "NPC" (steps 2007 and 2008). The instruction described in the source program is "call Sub_A", i.e., the call instruction (CALL) (steps 2009 and 2014). Thus, at step 2015, the address next to the current IP, "0x5000000c", is pushed as the return address to a soft stack. The content of the soft stack results in:

(0x5000000c).

At step 2016, IP is set to the branch address of the instruction "call Sub_A" described in the source program (IP=0x50000100). At step 2034, TP is incremented (TP=3). Thereafter, the process returns to step 2006. The same process is also performed when TP=5, and the content of the soft stack results in:

(0x5000010c, 0x5000000c).

When TP=9, IP=0x5000020c. The code described in the trace information is "JMP" (steps 2007, 2008 and 2017). The instruction described in the source program is "call (a0)", i.e., the call instruction (CALL) (steps 2018 and 2020). Thus, at step 2021, the address next to the current IP, "0x50000210", is pushed as the return address to a soft stack. The content of the soft stack results in:

(0x50000210, 0x5000010c, 0x5000000c).

At step 2028, IP is set to the branch address corresponding to TP=9, which is described in the trace information, i.e., "0x50000300" (IP=0x50000300). At step 2034, TP is incremented (TP=10). Thereafter, the process returns to step 2006.

When TP=12, IP=0x50000308. The code described in the trace information is "NPC" (steps 2007 and 2008). The instruction described in the source program is "ret"i.e., the return instruction (RET) (step 2009). Thus, at step 2010, the return address "0x50000210" is popped. The content of the soft stack results in:

(0x5000010c, 0x5000000c)

At step 2011, IP is set to the popped address (IP=0x50001210). At step 2034, TP is incremented (TP=13). Thereafter, the process returns to step 2006.

When TP=13, the same process is performed as in the case of TP=12, so that IP is set to the popped address (IP=0x5000010c). The content of the soft stack at the end of the process for the case of TP=13 is:

(0x5000000c).

When TP=14, IP=0x5000010c. The code described in the trace information is "EXP" (steps 2007, 2008, 2017 and 2024). Thus, at step 2025, the address indicated by the current IP, "0x5000010c", is pushed to the soft stack. The content of the soft stack results in:

(0x5000010c, 0x5000000c)

At step 2028, IP is set to the branch address corresponding to TP=14, which is described in the trace information, i.e., "0x40000100" (IP=0x40000100). At step 2034, TP is incremented (TP=15). Thereafter, the process returns to step 2006.

When TP=19, IP=0x40000110. The code described in the trace information is "JMP" (steps 2007, 2008 and 2017). The instruction described in the source program is "rti", i.e., the return instruction (RET) (step 2018). Thus, at step 2019, the return address "0x5000010c" is popped from the soft stack. The content of the soft stack results in:

(0x5000000c).

However, since the trace information includes the branch address corresponding to TP=19, "0x50000610", the popped return address "0x5000010c" is abandoned. At step 2028, IP is set to the branch address corresponding to TP=19, which is described in the trace information, i.e., "0x50000610" (IP=0x50000610). At step 2034, TP is incremented (TP=20). Thereafter, the process returns to step 2006. In the case where TP=20 and 21, the same process is performed.

Through the above process, the program execution history shown in FIG. 7 is traced by the development support system of the present embodiment.

As described above, according to the present embodiment, normally, a branch address relating to a return instruction is not output as the trace information of program execution by a CPU. The branch address is output only when the return destination is different from an expected destination due to stack switching, an interrupt process, or the like. That is, the least necessary branch address relating to the return instruction is output to optimize the trace information output such that a correct program execution history can be traced even when stack switching, an interrupt process, or the like, occurs. Further, the program execution history can be correctly traced based on the thus-optimized trace information.

Embodiment 2

Figure 8:
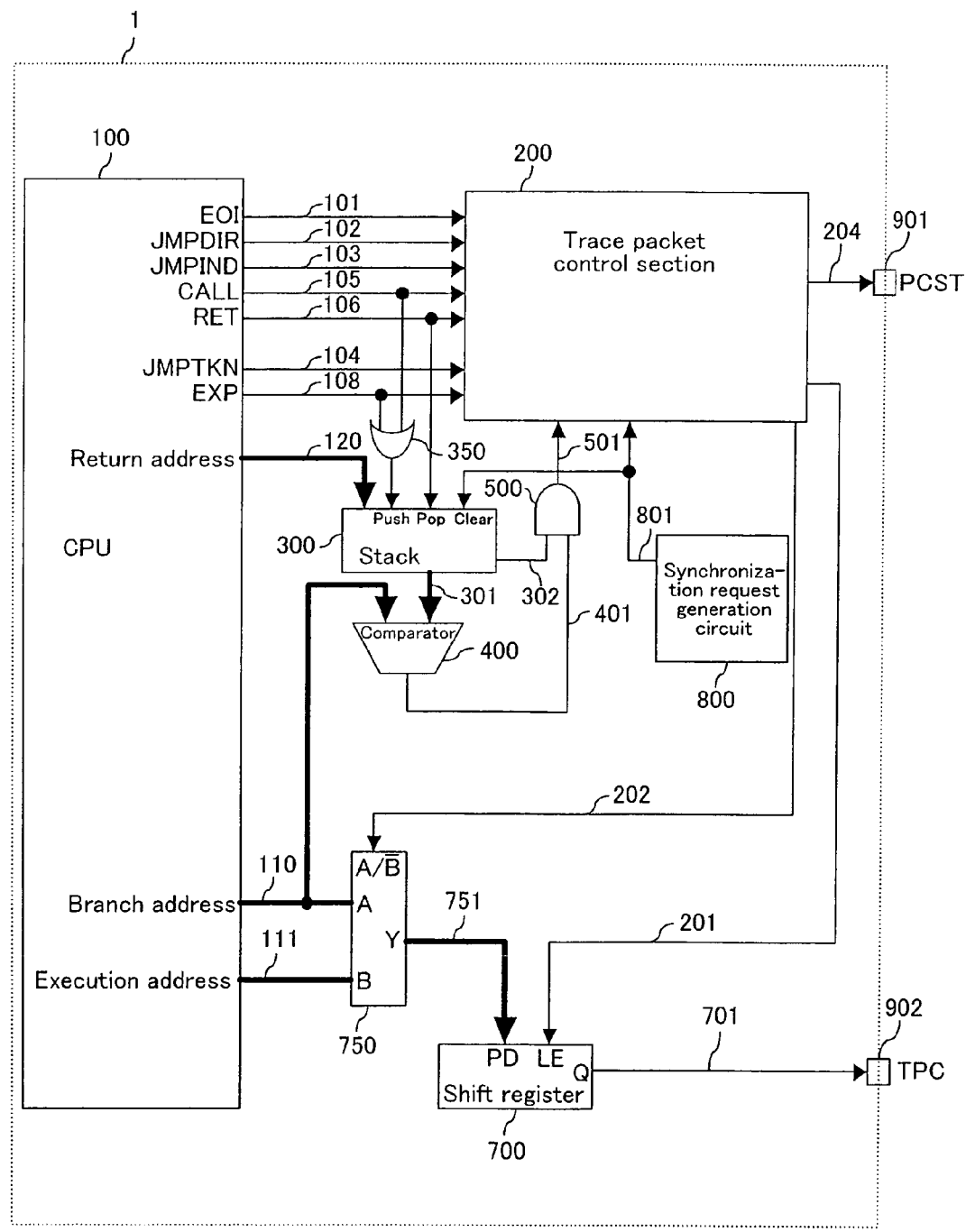
FIG. 8 shows a structure of a semiconductor integrated circuit according to embodiment 2 of the present invention.

FIG. 8 shows a structure of a semiconductor integrated circuit according to embodiment 2 of the present invention. The semiconductor integrated circuit 1 of the present embodiment includes a synchronization request generation circuit 800 and a selector 750 in addition to the components of the semiconductor integrated circuit of the present embodiment. Hereinafter, the differences from the semiconductor integrated circuit of the present embodiment are described.

When an instruction is executed, the CPU 100 outputs an execution address 111 of the instruction. The selector 750 receives a branch address 110 and the execution address 111 from the CPU 100 and outputs any one of these received addresses according to a selection signal 202 output from a trace packet control section 200. The shift register 700 receives the address 751 output from the selector 750.

The synchronization request generation circuit 800 asserts a synchronization request signal 801 at a system reset, e.g., a boot of the semiconductor integrated circuit 1, at a task switch, e.g., a task switch by the CPU 100, at a trace start where the output of the trace information is started, at a request from a development support system, or at every predetermined cycle. With this arrangement, for example, when the trace memory 1030 of the development support system shown in FIG. 48 is almost causing an overflow, the synchronization request signal 801 is asserted by a request from the development support system. Alternatively, for example, the synchronization request signal 801 is asserted at a predetermined cycle, whereby the trace information output is initialized at a predetermined cycle. When the synchronization request signal 801 is asserted, the stack memory 300 initializes the stack pointer to invalidate a stack content which is presently being pushed.

FIG. 9 shows a status decode table of the trace packet control section 200. The trace packet control section 200 of the present embodiment receives the synchronization request signal 801 and outputs a selection signal (TPCSEL) 202 in addition to the signals input to/output from the trace packet control section 200 of the present embodiment. The trace packet control section 200 of the present embodiment further outputs codes "SYN" and "JMPS".

The development support system of the present embodiment has the same structure as that of the development support system shown in FIG. 48. However, the operation of the host computer (execution history tracing section) 3 is different from that of the conventional one, and the differences will be described later.

Figure 10:
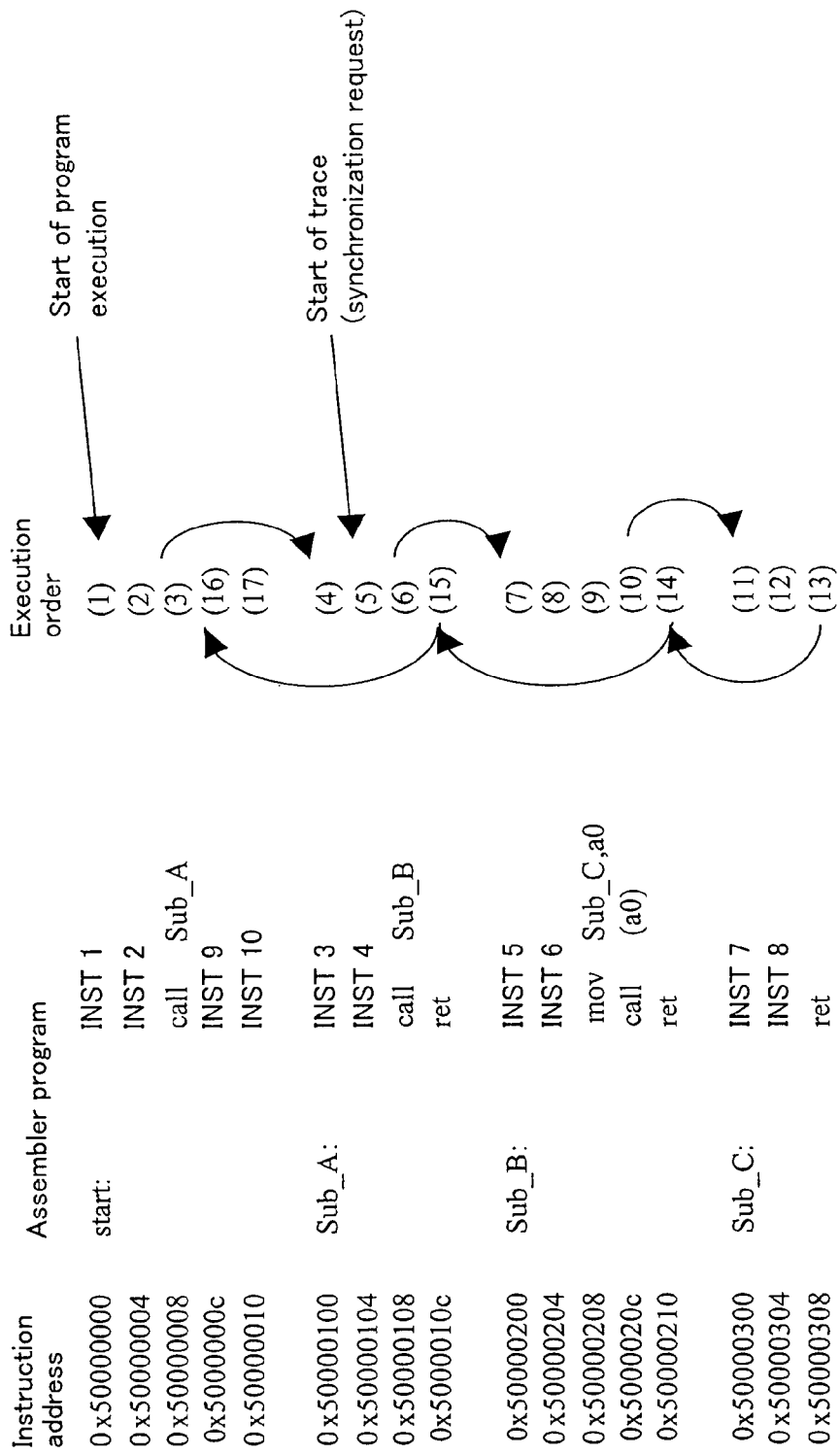
FIG. 10 illustrates an example of a program and an execution order.

Next, trace information output and execution history tracing by the semiconductor integrated circuit 1 and the development support system of the present embodiment are described with an example of executing a program shown in FIG. 10. In this example, the semiconductor integrated circuit 1 starts the program execution from address "0x50000000" (execution order "1"). At address "0x50000008" (execution order "3"), subroutine "Sub A" is called so that the process jumps to address "0x50000100". When the instruction of address "0x50000104" (execution order "5"), i.e., "INST 4", is executed, the trace is started. Thereafter, at address "0x50000108" (execution order "6"), the semiconductor integrated circuit 1 jumps to subroutine "Sub B" of address "0x50000200". At address "0x5000020c" (execution order "10"), the semiconductor integrated circuit 1 jumps to subroutine "Sub C" of address "0x50000300". Thereafter, the semiconductor integrated circuit 1 returns from address "0x50000308" through "0x50000210", "0x5000010c" and "0x5000010" in this order, to the origin of the call.

FIG. 11 illustrates trace information which is output when the semiconductor integrated circuit 1 executes the program shown in FIG. 10. The trace information of FIG. 11 is a result of the operation of the semiconductor integrated circuit 1 which will be described below. In the descriptions below, the characteristic features of the present embodiment are described.

Before the start of the trace, as a result of the execution of call instruction "call Sub_A" of address "0x50000008" (execution order "3"), the content of the stack memory 300 is:

(0x5000000c)

However, the trace is started at execution order "5", and the synchronization request signal 801 is asserted. As a result, the stack memory 300 is initialized, and the content thereof results in:

( ).

When the CPU 100 executes an instruction of address "0x50000104" (execution order "5"), i.e., "INST 4", signal EOI is asserted while the execution address 111 ("0x50000104") is output. At this point in time, signal JMPTKN is not asserted. According to the status decode table shown in FIG. 9, the trace packet control section 200 asserts signal TPCLDEN, sets the value of signal TPCSEL to "0", and outputs "SYN" as the code 204. When the value of signal TPCSEL is "0", the selector 750 selects the execution address 111 ("0x50000104") and inputs the selected address to the shift register 700. As a result of the assertion of signal TPCLDEN, the shift register 700 sequentially outputs the address 751 received from the selector 750 ("0x50000104") as data 701 to the port 902. When the CPU 100 executes a normal sequential execution instruction other than an branch instruction and the synchronization request signal 801 is asserted, the trace packet control section 200 does not output "SEQ" but "SYN" as the code 204 and sets the values of signals TPCLDEN and TPCSEL such that the branch address 110 is not output but the execution address 111 is output as the data 701.

Thereafter, until execution order "14", the trace information is output in the same way as that described in the present embodiment. Especially when the call instruction "call (a0)" of address "0x5000020c" (execution order "10") is executed, the trace packet control section 200 asserts signal TPCLDEN, sets the value of signal TPCSEL to "1", and outputs "JMP" as the code 204. As a result, the selector 750 selects the branch address 110 ("0x50000300"), which is output from the shift register 700. The stack memory 300 is pushed at execution order "6" and "10", popped at execution order "13" and "14", and is vacant at the time when the instruction of address "0x50000210" (execution order "14") is executed.

Then, when the CPU 100 performs the return instruction "ret" of address "0x5000010c" (execution order "15"), an underflow occurs in the stack memory 300, so that the return address match signal 501 is not asserted. According to the status decode table shown in FIG. 9, the trace packet control section 200 asserts signal TPCLDEN, sets the value of signal TPCSEL to "1", and outputs "JMP" as the code 204. As a result, the shift register 700 sequentially outputs the branch address 110 ("0x5000000c") as data 701 to the port 902.

Through the above operation, the trace information shown in FIG. 11 is output from the semiconductor integrated circuit 1 of the present embodiment.

Figure 12:
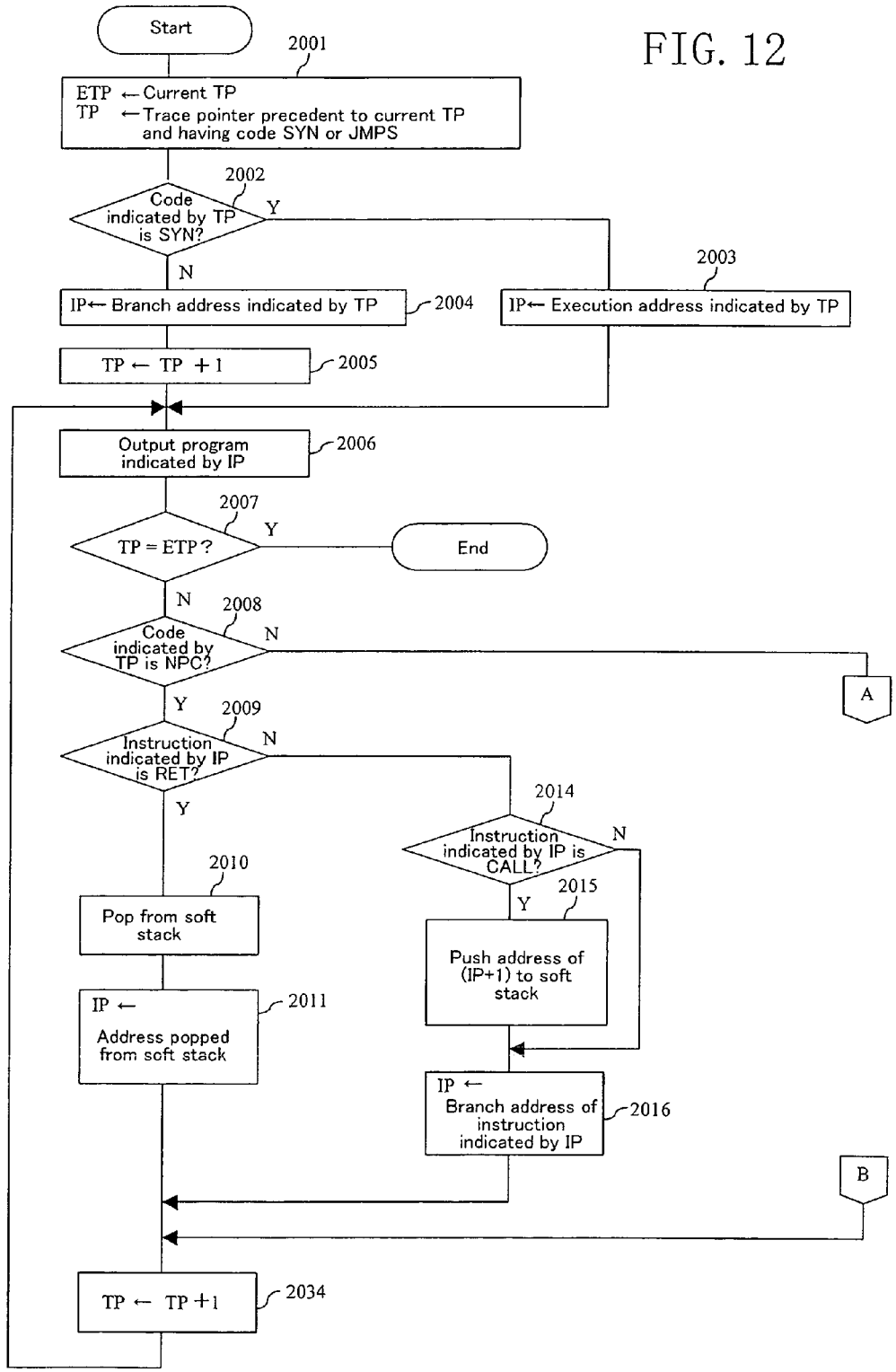
FIG. 12 is a flowchart of an execution history tracing method which is performed by a development support system of embodiment 2 of the present invention.
Figure 13:
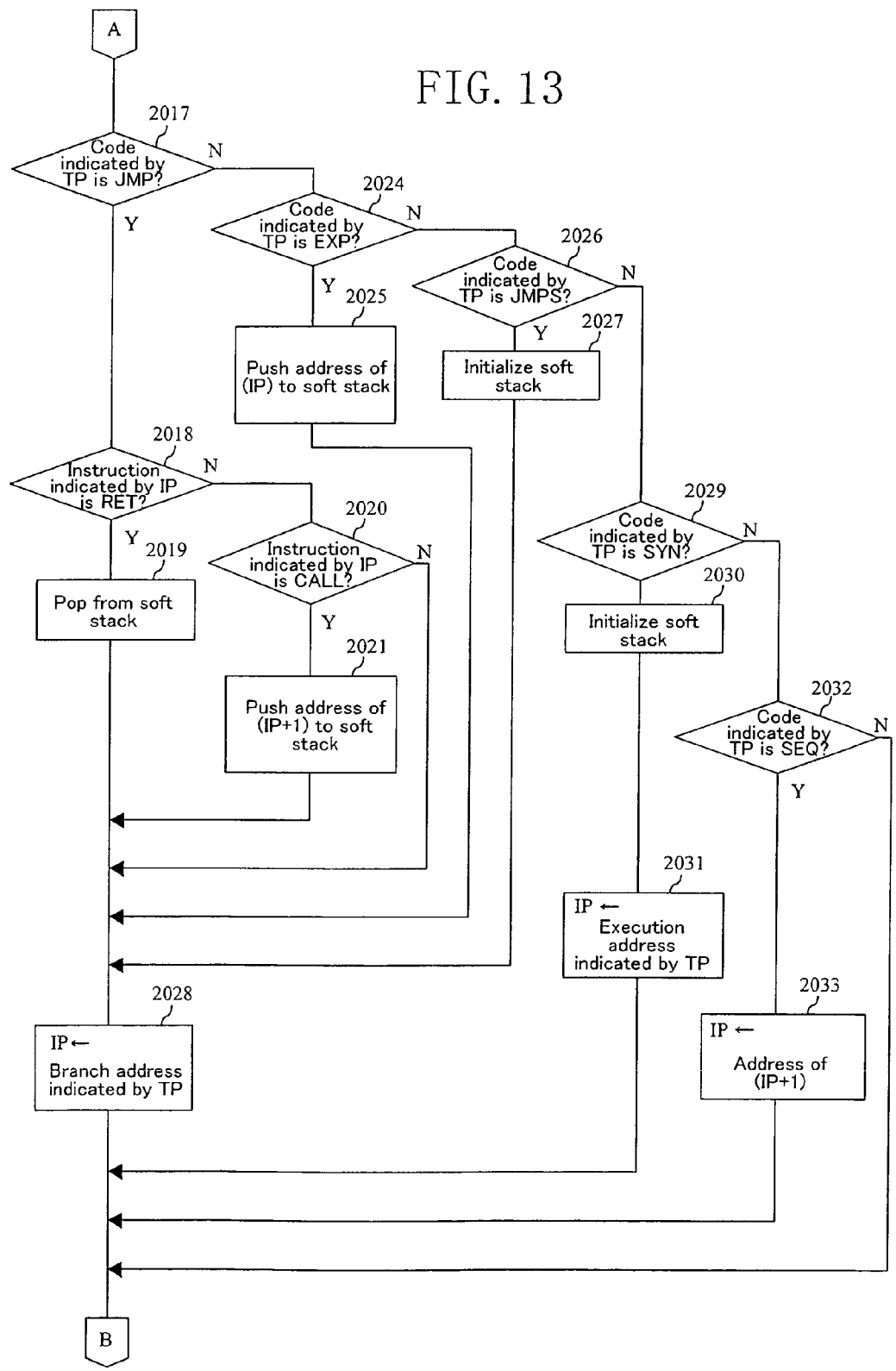
FIG. 13 is a flowchart of the execution history tracing method which is performed by the development support system of embodiment 2 of the present invention.

FIGS. 12 and 13 show a flowchart of an execution history tracing method which is executed by the development support system of the present embodiment. FIG. 14 shows a program execution history traced by the development support system of the present embodiment. The program execution history shown in FIG. 14 is a result of the execution of the execution history tracing method which will be described below. In the descriptions below, the characteristic features of the present embodiment are described.

At step 2001, the current trace pointer (TP=13) is set to the end trace pointer (ETP). The trace pointer is set to a trace pointer which is trace data precedent to the current trace pointer and has code "SYN" or "JMPS" (TP=0). When TP=0, the code is "SYN" (step 2002). Thus, at step 2003, IP is set to execution address "0x50000104" corresponding to "TP=0" which is described in the trace information (IP=0x50000104), and the process proceeds to step 2006. The subsequent part of the process is the same as that described in the present embodiment. Especially when the branch address of the return instruction "ret" corresponding to "TP=10" is traced, the content of the soft stack is vacant and invalid. However, the trace information includes branch address "0x5000000c". At step 2028, IP is set to branch address "0x5000000c" corresponding to "TP=10" which is described in the trace information (IP=0x5000000c), and the trace process is continued.

Through the above process, the program execution history shown in FIG. 14 is traced by the development support system of the present embodiment.

Figure 15:
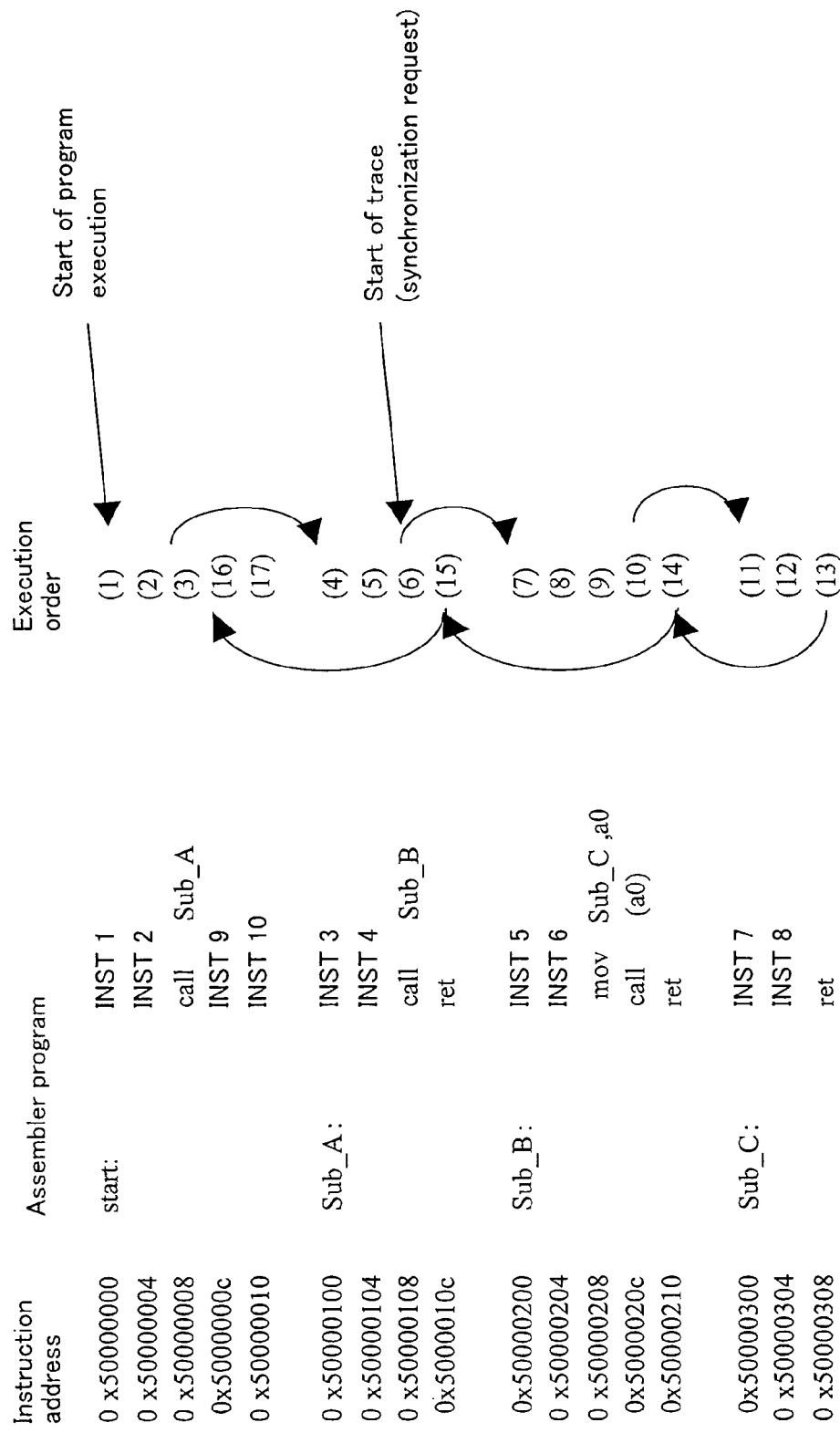
FIG. 15 illustrates an example of a program and an execution order.

Next, another example of trace information output by the semiconductor integrated circuit 1 of the present embodiment and execution history tracing by the development support system of the present embodiment is described with an example of executing a program shown in FIG. 15. In this example, the program itself is the same as that described in the aforementioned example of FIG. 10 except that the trace is started from the instruction of address "0x50000108" (execution order "6") which is next to the first instruction of the aforementioned example.

FIG. 16 shows trace information which is output when the semiconductor integrated circuit 1 executes the program shown in FIG. 15. The trace information shown in FIG. 16 is a result of the operation of the semiconductor integrated circuit 1 which will be described below. In the descriptions below, the characteristic features of the present embodiment are described.

Before the start of the trace, as a result of the execution of the call instruction "call Sub_A" of address "0x50000008" (execution order "3") and the call instruction "call Sub_B" of address "0x50000108" (execution order "6"), the content of the stack memory 300 is:

(0x5000010c, 0x5000000c).

However, at execution order "6", the trace is started, and the synchronization request signal 801 is asserted. As a result, the stack memory 300 is initialized, and the content thereof results in:

( ).

When the CPU 100 executes the instruction "call Sub_B" of address "0x50000108" (execution order "6"), signals CALL and JMPTKN are asserted. At this point in time, according to the status decode table shown in FIG. 9, the trace packet control section 200 asserts signal TPCLDEN, sets the value of signal TPCSEL to "1", and outputs "JMPS" as the code 204. When the value of signal TPCSEL is "1", the selector 750 selects the branch address 110 ("0x50000200") and inputs the selected address to the shift register 700. As a result of the assertion of signal TPCLDEN, the shift register 700 sequentially outputs the address 751 received from the selector 750 ("0x50000200") as data 701 to the port 902. When the CPU 100 executes a branch instruction and the synchronization request signal 801 is asserted, the trace packet control section 200 does not output "NPC" or "JMP" but "JMPS" as the code 204 and sets the values of signals TPCLDEN and TPCSEL such that the branch address 110 is output as the data 701.

The subsequent part of the process is the same as that described in the aforementioned example. Especially, the stack memory 300 is pushed at execution order "10", popped at execution order "13", and is vacant at the time when the instruction of address "0x50000308" (execution order "13") is executed. Thus, when the instructions are performed at execution order "10" and "15", an underflow occurs in the stack memory 300. As a result, the return address match signal 501 is not asserted, "JMP" is output as the code 204, and the branch address 110 is sequentially output as data 701 to the port 902.

Through the above operation, the trace information shown in FIG. 16 is output from the semiconductor integrated circuit 1 of the present embodiment.

FIG. 17 shows a program execution history traced by the development support system of the present embodiment. The program execution history shown in FIG. 17 is obtained according to the flow shown in FIGS. 12 and 13.

When TP=0, the code is "JMPS" (steps 2001 and 2002), which is a difference from the aforementioned example. Therefore, at step 2004, IP is set to the branch address corresponding to "TP=0" which is described in the trace information (IP=0x50000200). At step 2005, TP is incremented (TP=1), and then, the process proceeds to step 2006. The subsequent part of the process is the same as that described in the aforementioned example.

As described above, according to the present embodiment, even when the start of the trace is delayed from the start of a program execution, the execution address or branch address at the start of the trace is output. When a return instruction which corresponds to a call instruction executed before the start of the trace is executed, its branch address is output as the trace information. With such an arrangement, even if the trace is started in the midst of program execution, it is possible to trace a program portion corresponding to the start of the trace and, further, a program portion which has been executed before the start of the trace.

Embodiment 3

Figure 18:
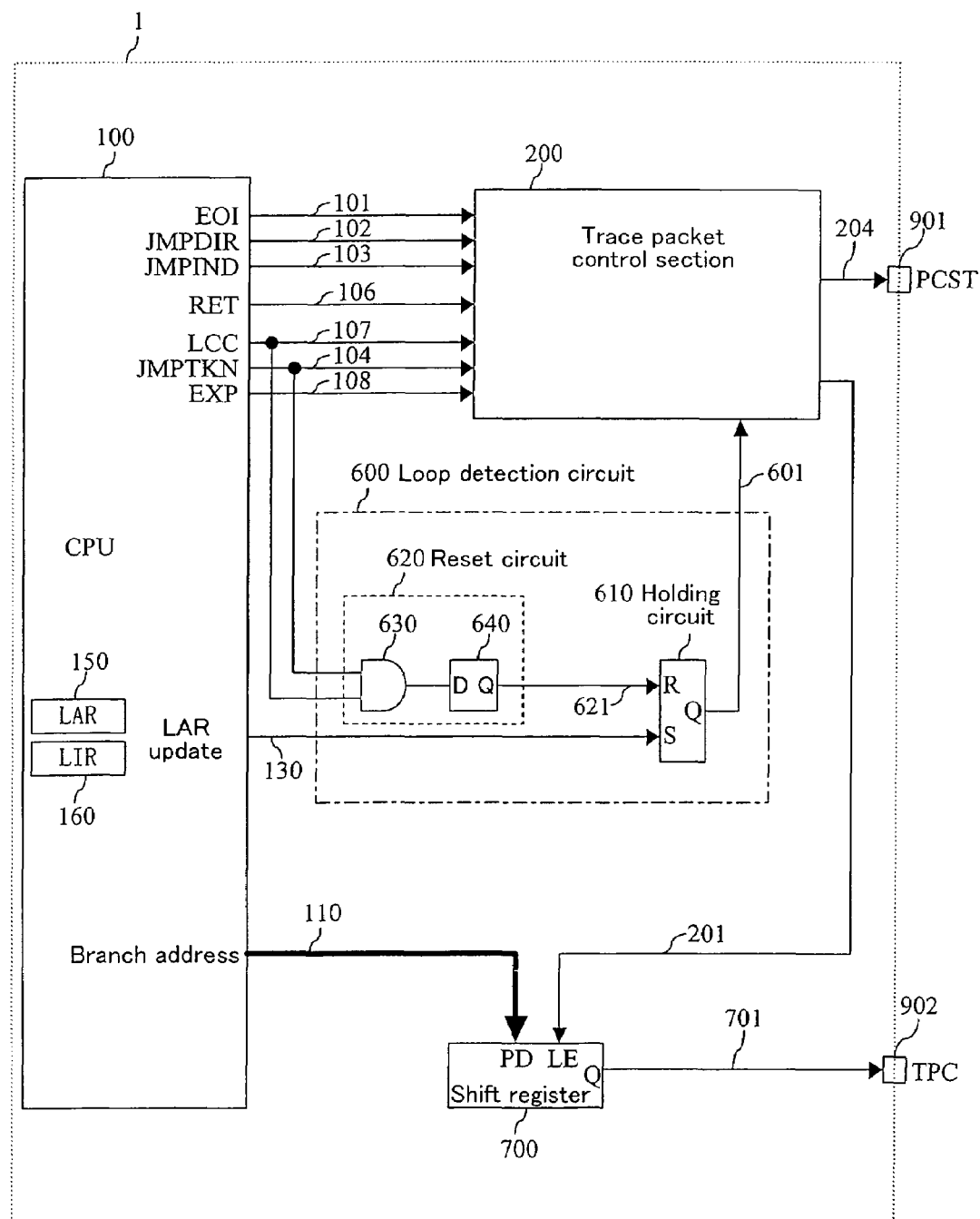
FIG. 18 shows a structure of a semiconductor integrated circuit according to embodiment 3 of the present invention.

FIG. 18 shows a structure of a semiconductor integrated circuit according to embodiment 3 of the present invention. The semiconductor integrated circuit 1 of the present embodiment includes a CPU 100, a trace packet control section 200, a loop detection circuit 600 and a shift register 700. The shift register 700 is the same as that of the present embodiment and therefore is not described herein.

The CPU 100 incorporates a register indirect branch instruction as a fast branch instruction. For example, when a loop portion of a program is executed, an instruction of a branch address and an instruction of a branch destination are stored in a loop address register (LAR) 150 and a loop instruction register (LIR) 160, respectively. The loop portion is executed while referring to these registers, whereby a fast branch is realized. When the register 150 is updated, the CPU 100 asserts a LAR update signal 130. When a branch instruction to a branch address which is stored in the register 150 is executed, the CPU 100 asserts a LAR indirect branch instruction execution signal (LCC). The other aspects of the CPU 100 are the same as those of the CPU 100 of the semiconductor integrated circuit 1 of the present embodiment, and therefore, the descriptions thereof are herein omitted.

Figure 19:
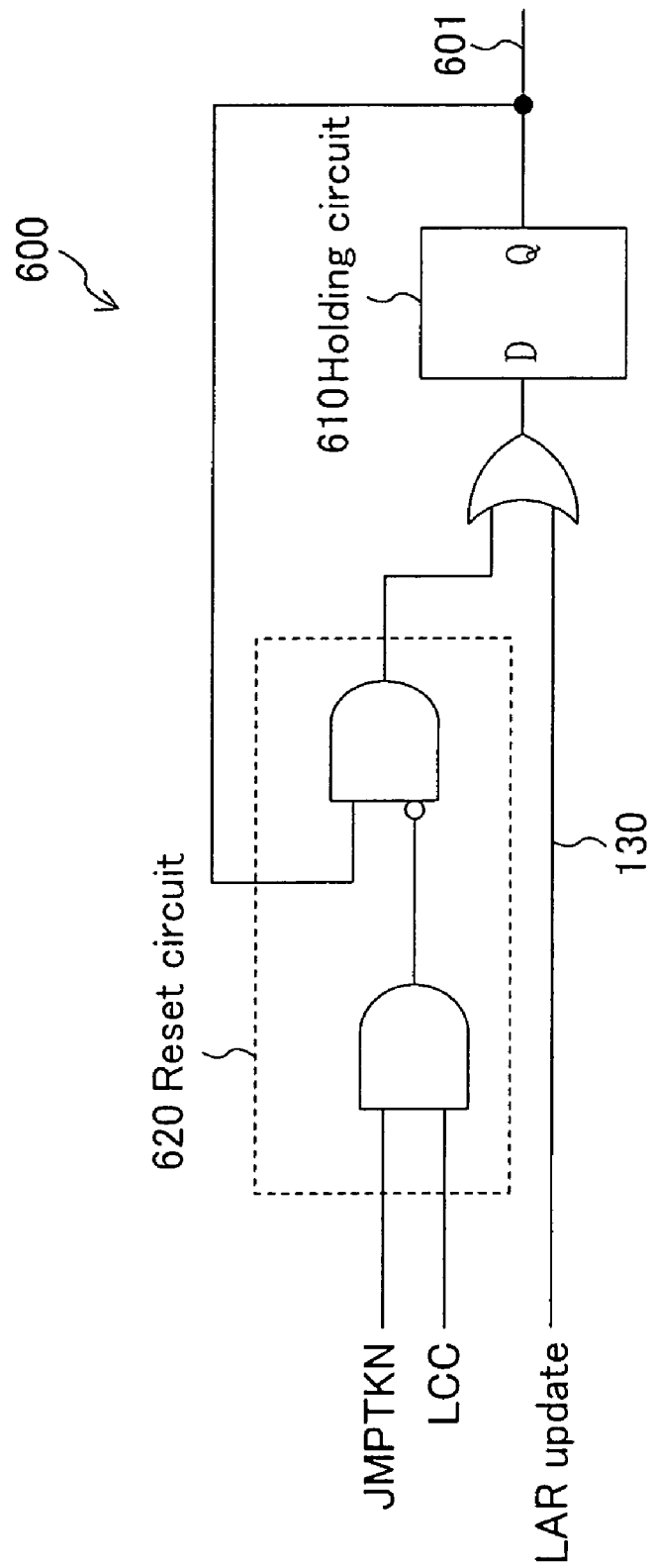
FIG. 19 shows an alternative structure of a loop detection circuit.

The loop detection circuit 600 includes a holding circuit 610 and a reset circuit 620. The holding circuit 610 is formed by an RS flip flop which has a set terminal for receiving the LAR update signal 130 and a reset terminal for receiving a reset signal 621 output from the reset circuit 620 and outputs a LAR update flag signal 601. The reset circuit 620 includes an AND circuit 630 which calculates a logical product of signals LCC and JMPTKN and a D-flip flop 640 which receives the output of the AND circuit 630 and outputs the reset signal 621. The D-flip flop 640 delays the output of the AND circuit 630 to adjust the timing of set/reset of the holding circuit 610. With the above structure, when the register 150 is updated so that the LAR update signal 130 is asserted, the loop detection circuit 600 asserts the LAR update flag signal 601. When signals LCC and JMPTKN are asserted in the first cycle of the loop, the loop detection circuit 600 negates the LAR update flag signal 601. That is, the loop detection circuit 600 asserts the LAR update flag signal 601 only when execution of a loop portion is started and the register indirect branch instruction is executed for the first time, but does not assert the signal 601 at the second and subsequent execution of the register indirect branch instruction. It should be noted that, as shown in FIG. 19, the holding circuit 610 of the loop detection circuit 600 may be formed by a D-flip flop.

FIG. 20 shows a status decode table of the trace packet control section 200. The trace packet control section 200 receives signals EOI, JMPDIR, JMPIND, RET, LCC, JMPTKN and EXP and the LAR update flag signal 601. The trace packet control section 200 determines a branch address load enable signal (TPCLDEN) 201 and a code 204, which is to be output to a trace status port (PCST) 901, according to the status decode table shown in FIG. 20.

The development support system of the present embodiment has the same structure as that of the development support system shown in FIG. 48. However, the operation of the host computer (execution history tracing section) 3 is different from that of the conventional one. The differences will be described later.

Figure 21:
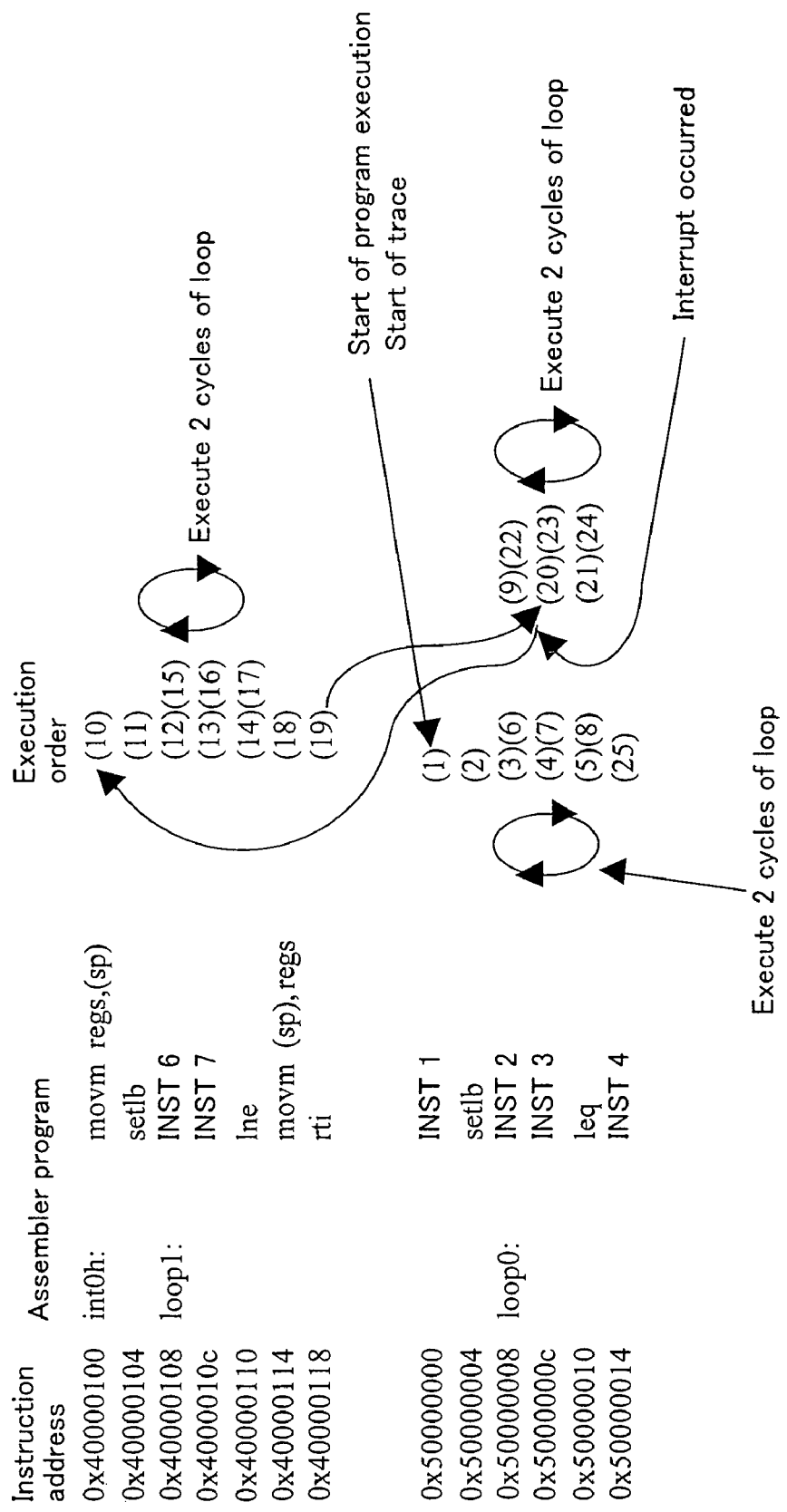
FIG. 21 illustrates an example of a program and an execution order.

Next, trace information output and execution history tracing by the semiconductor integrated circuit 1 and the development support system of the present embodiment are described with an example of executing a program shown in FIG. 21. In this example, the semiconductor integrated circuit 1 starts the program execution and the trace from address "0x50000000" (execution order "1"). According to the instruction "setlb" of address "0x50000004" (execution order "2"), branch address "0x50000008" of loop "loop0" is stored in the register 150, and the leading instruction of the same loop, "INST 2", is stored in the register 160. Then, the loop is executed twice according to the register indirect branch instruction "leq" of address "0x50000010" (execution order "5" and "8"). Thereafter, an interrupt is received during the third execution of the loop, so that the execution of interrupt handler "int 0h" of address "0x40000100" (execution order "10") is started. In interrupt handler "int0h", another loop "loop1" accompanied by register indirect branch instruction "lne" is executed twice, and then, the process returns to the previous loop "loop0" to execute the fourth loop, after which the loop is ended.

FIG. 22 shows trace information which is output when the semiconductor integrated circuit 1 executes the program shown in FIG. 21. The trace information shown in FIG. 22 is a result of the operation of the semiconductor integrated circuit 1 which will be described below. In the descriptions below, the characteristic features of the present embodiment are described.

When the CPU 100 executes the instruction "setlb" of address "0x50000004" (execution order "2"), the LAR update signal 130 is asserted, and the LAR update flag signal 601 is asserted. However, signals LCC and JMPTKN are not yet asserted. Therefore, the trace packet control section 200 outputs "SEQ" as the code 204 according to the status decode table shown in FIG. 20. Thereafter, when the register indirect branch instruction "leq" of address "0x50000010" (execution order "5") is executed, the LAR update flag signal 601 and signals LCC and JMPTKN are asserted. Thus, "JMP" is output as the code 204, and address "0x50000008" is output as the data 701.

One cycle after the execution of the register indirect branch instruction "leq" of address "0x50000010" (execution order "5"), the holding circuit 610 is reset, and the LAR update flag signal 601 is negated. As a result, when the CPU 100 executes the register indirect branch instruction "leq" of address "0x50000010" (execution order "8"), signals LCC and JMPTKN are asserted, whereas the LAR update flag signal 601 is being negated. Thus, according to the status decode table shown in FIG. 20, the trace packet control section 200 only outputs "NPC" as the code 204.

After the CPU 100 receives an interrupt to execute a branch and the process proceeds to interrupt handler "int0h", the CPU 100 executes the instruction "setlb" of address "0x40000104" (execution order "11") as well. As a result, the LAR update signal 130 is asserted so that the LAR update flag signal 601 is asserted, whereas signals LCC and JMPTKN are not yet asserted. Therefore, the trace packet control section 200 outputs "SEQ" as the code 204 according to the status decode table shown in FIG. 20. Thereafter, when the CPU 100 executes the register indirect branch instruction "lne" of address "0x40000110" (execution order "14"), "JMP" is output as the code 204 and address "0x40000108" is output as the data 701 because this instruction is a fast branch instruction executed for the first time in the loop "loop1". On the other hand, even with the same register indirect branch instruction "lne", the branch condition is not met at execution order "17". In this case, signal JMPTKN is not asserted, and "SEQ" is output as the code 204.

When the CPU 100 executes the instruction "movm (sp), regs" of address "0x40000114" (execution order "18"), the LAR update signal 130 is asserted so that the LAR update flag signal 601 is asserted. Then, when the CPU 100 executes the instruction "leq" of address "0x50000010" (execution order "21"), the LAR update flag signal 601 is asserted and signals LCC and JMPTKN are asserted although this instruction is not the first-executed register indirect branch instruction in the loop "loop0". As a result, "JMP" is output as the code 204, and address "0x50000008" is output as the data 701. Thereafter, when the CPU 100 executes the register indirect branch instruction "leq" of execution order "24", the branch condition is not met. Thus, signal JMPTKN is not asserted, and "SEQ" is output as the code 204.

Through the above operation, the trace information shown in FIG. 22 is output from the semiconductor integrated circuit 1 of the present embodiment.

Figure 23:
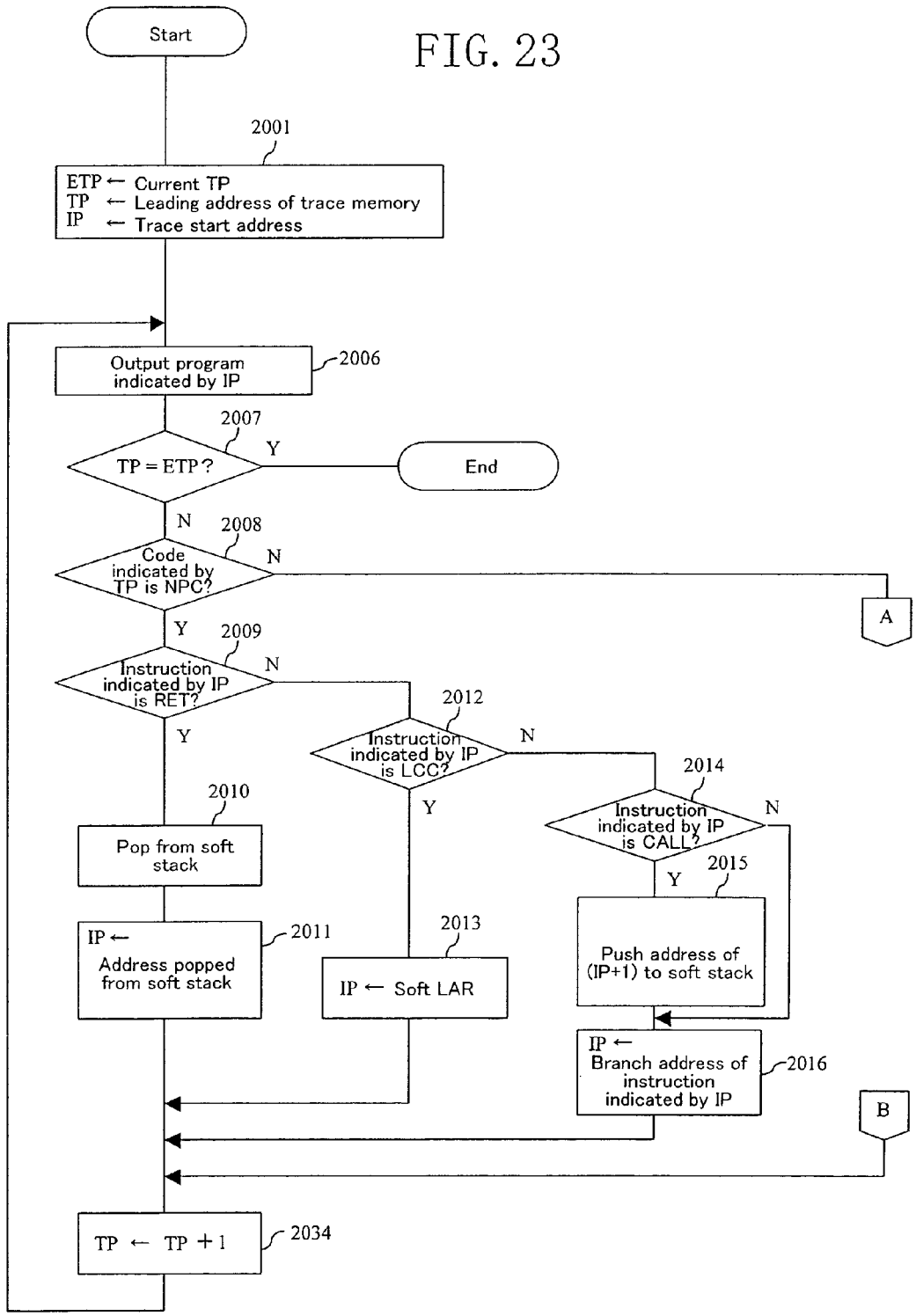
FIG. 23 is a flowchart of an execution history tracing method which is performed by a development support system of embodiment 3 of the present invention.
Figure 24:
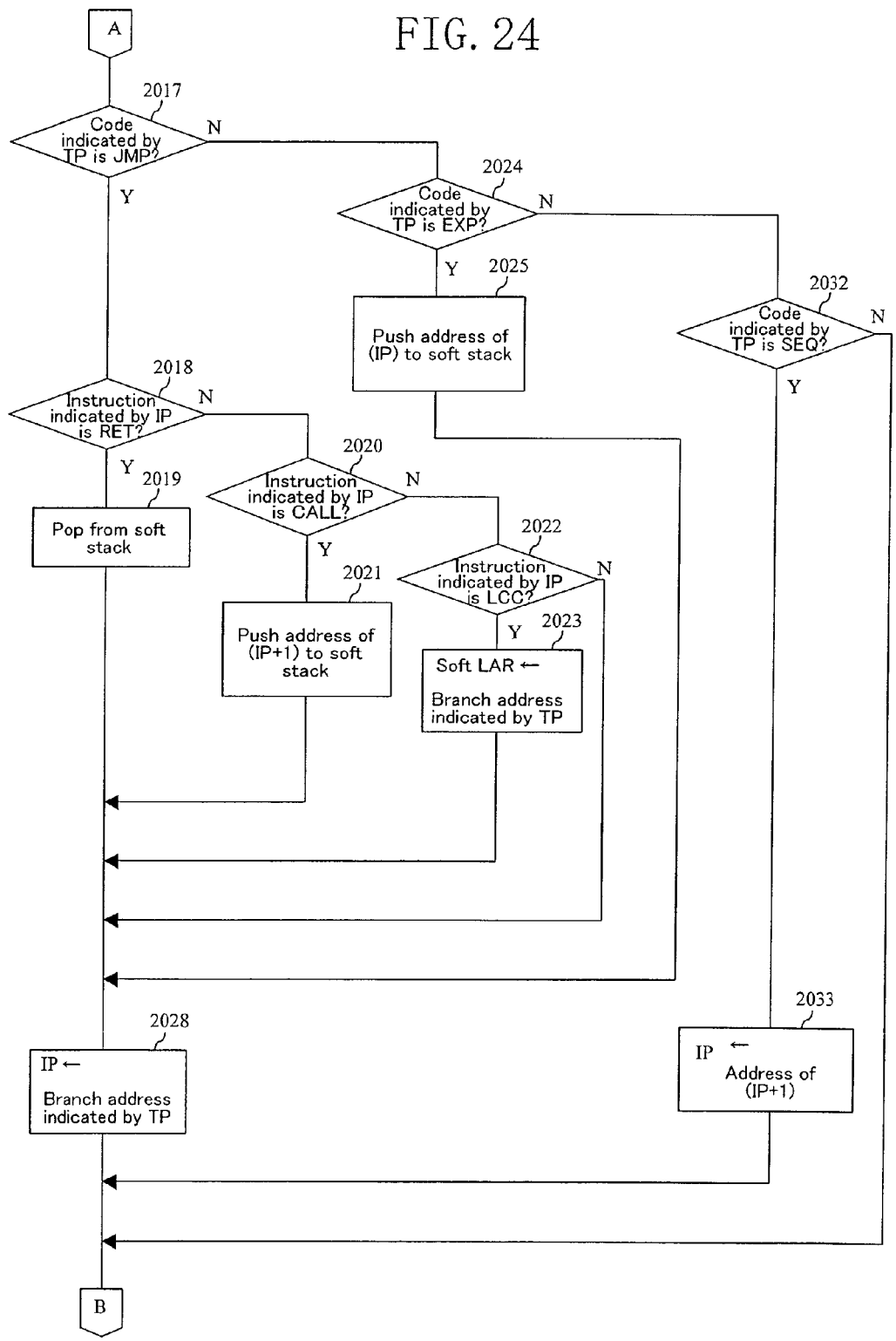
FIG. 24 is a flowchart of the execution history tracing method which is performed by the development support system of embodiment 3 of the present invention.

FIGS. 23 and 24 show a flowchart of an execution history tracing method which is executed by the development support system of the present embodiment. FIG. 25 shows a program execution history traced by the development support system of the present embodiment. The program execution history shown in FIG. 25 is a result of the execution of the execution history tracing method which will be described below. In the descriptions below, the characteristic features of the present embodiment are described.

When TP=4, the code described in the trace information is "JMP" (steps 2007, 2008 and 2017), and the instruction described in the source program is the register indirect branch instruction "leq" (LCC) (steps 2018, 2020 and 2022). Thus, at step 2023, branch address "0x50000008" corresponding to "TP=4" which is described in the trace information is stored in a simulation loop address register which is realized by software (hereinafter, referred to as "soft LAR"). Thereafter, at step 2028, IP is set to the branch address "0x50000008" corresponding to "TP=4" which is described in the trace information (IP=0x50000008). At step 2034, TP is incremented (TP=5), and then, the process proceeds to step 2006. The same process is also performed when TP=14 and 21.

On the other hand, when TP=7, the code described in the trace information is "NPC" (steps 2007 and 2008), and the instruction described in the source program is the register indirect branch instruction "leq" (LCC) as in the case of TP=4 (steps 2009 and 2012). Thus, at step 2013, IP is set to the branch address stored in the soft LAR, "0x50000008" (IP=0x50000008). Then, TP is incremented at step 2034 (TP=8), and thereafter, the process returns to step 2006.

Through the above process, the program execution history shown in FIG. 25 is traced by the development support system of the present embodiment.

As described above, according to the present embodiment, in a loop process including a register indirect branch instruction, at the first execution of the register indirect branch instruction, the branch address of the branch instruction is output as trace information. At the second or subsequent execution of the register indirect branch instruction, a branch address is not output as trace information. Thus, as for the trace information output, the band width is not constrained. That is, the trace information output of a semiconductor integrated circuit which incorporates a register indirect branch instruction is optimized. Even when the semiconductor integrated circuit operates in an actual operation condition to perform the trace, it is possible to trace a correct program execution history.

Embodiment 4

Figure 26:
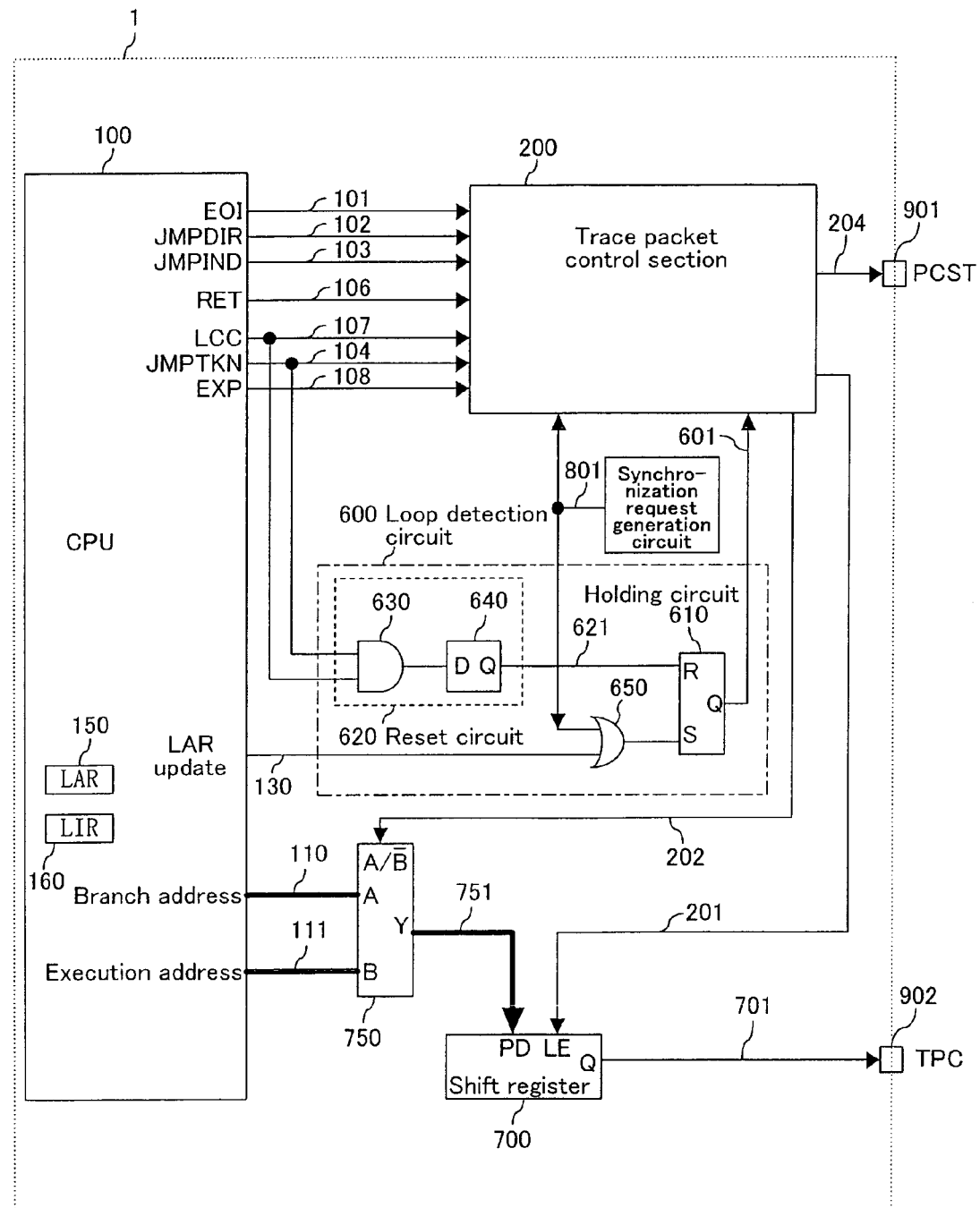
FIG. 26 shows a structure of a semiconductor integrated circuit according to embodiment 4 of the present invention.

FIG. 26 shows a structure of a semiconductor integrated circuit according to embodiment 4 of the present invention. The semiconductor integrated circuit 1 of the present embodiment includes the synchronization request generation circuit 800 and the selector 750 of the present embodiment in addition to the components of the semiconductor integrated circuit of the present embodiment. Hereinafter, the differences from the semiconductor integrated circuits of embodiments 2 and 3 are described.

The loop detection circuit 600 includes an OR circuit 650 which calculates the logical product of the LAR update signal 130 and the synchronization request signal 801. The logical product is used as a set signal of the holding circuit 610. That is, when the synchronization request signal 801 is asserted, the LAR update flag signal 601 is asserted until the next assertion of signals LCC and JMPTKN. It should be noted that the timing of asserting the synchronization request signal 801 is the same as that described in the present embodiment.

FIG. 27 shows a status decode table of the trace packet control section 200. The trace packet control section 200 of the present embodiment receives the synchronization request signal 801 and outputs a selection signal (TPCSEL) 202 in addition to the signals input to/output from the trace packet control section 200 of the present embodiment. The trace packet control section 200 of the present embodiment further outputs codes "SYN" and "JMPS".

The development support system of the present embodiment has the same structure as that of the development support system shown in FIG. 48. However, the operation of the host computer (execution history tracing section) 3 is different from that of the conventional one, and the differences will be described later.

Figure 28:
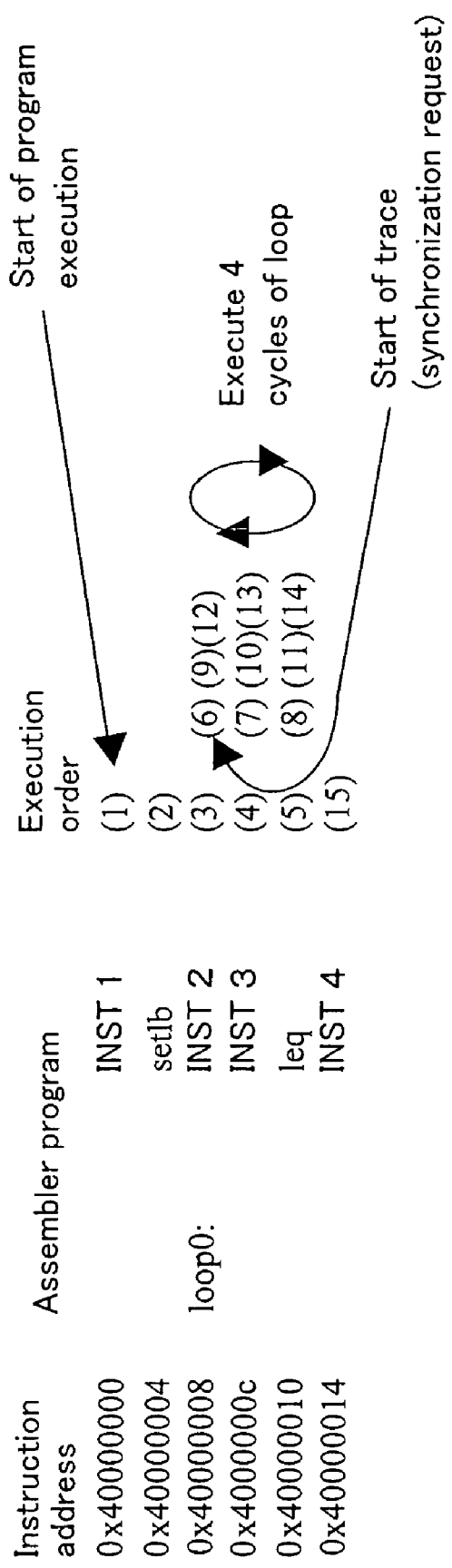
FIG. 28 illustrates an example of a program and an execution order.

Next, trace information output and execution history tracing by the semiconductor integrated circuit 1 and the development support system of the present embodiment are described with an example of executing a program shown in FIG. 28. In this example, the semiconductor integrated circuit 1 starts the trace at execution order "6" in the second execution of the four executions in the loop "loop0".

FIG. 29 shows trace information which is output when the semiconductor integrated circuit 1 executes the program shown in FIG. 28. The trace information shown in FIG. 29 is a result of the operation of the semiconductor integrated circuit 1 which will be described below. In the descriptions below, the characteristic features of the present embodiment are described.

At execution order "6", the trace is started, the synchronization request signal 801 is asserted, and the LAR update flag signal 601 is asserted. When the CPU 100 executes the instruction of address "0x40000008" (execution order "6"), i.e., "INST 2" signal EOI is asserted, and the execution address 111 ("0x40000008") is output. At this point in time, signal LCC is not asserted. According to the status decode table shown in FIG. 27, the trace packet control section 200 asserts signal TPCLDEN, sets the value of signal TPCSEL to "0", and outputs "SYN" as the code 204. In the meanwhile, the shift register 700 outputs corresponding execution address "0x40000008" as the data 701.

Thereafter, when the CPU 100 executes the register indirect branch instruction "leq" of address "0x40000010" (execution order "8"), signals LCC and JMPTKN are asserted. At this point in time, the LAR update flag signal 601 is being asserted. As a result, "JMP" is output as the code 204, and address "0x40000008" is output as the data 701.

Figure 30:
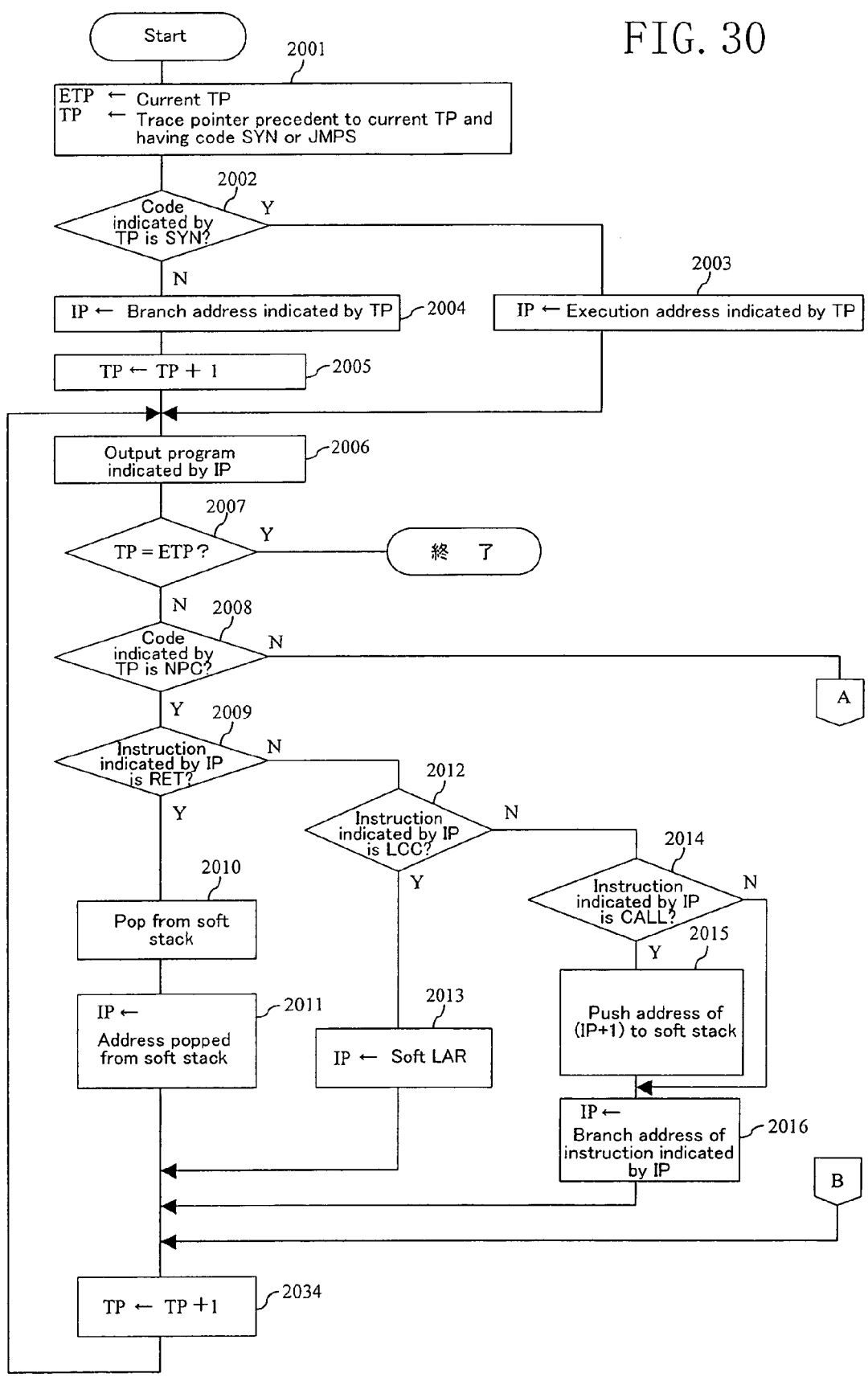
FIG. 30 is a flowchart of an execution history tracing method which is performed by a development support system of embodiment 4 of the present invention.
Figure 31:
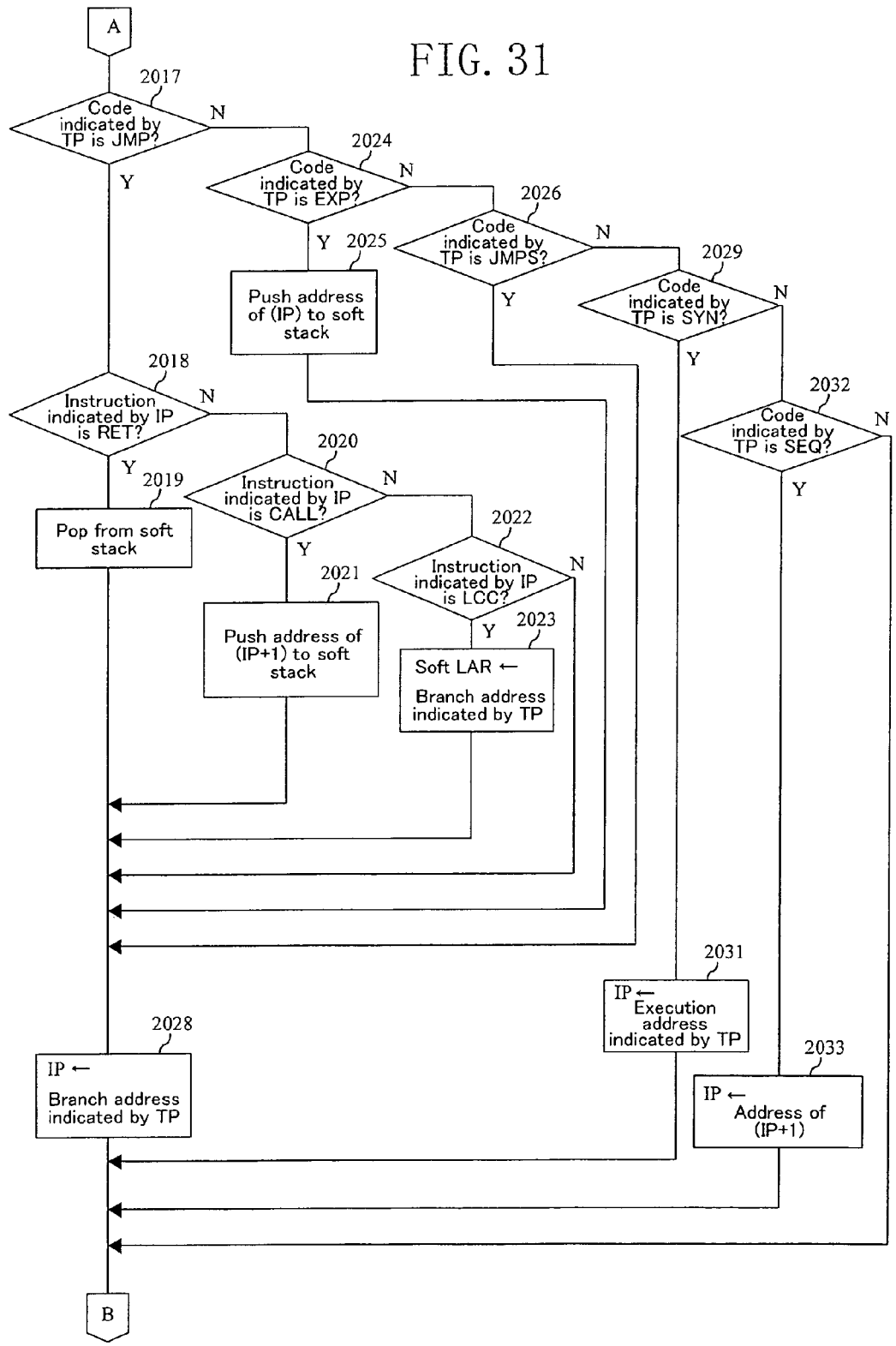
FIG. 31 is a flowchart of the execution history tracing method which is performed by the development support system of embodiment 4 of the present invention.

FIGS. 30 and 31 show a flowchart of an execution history tracing method which is executed by the development support system of the present embodiment. FIG. 32 shows a program execution history traced by the development support system of the present embodiment. The program execution history shown in FIG. 32 is a result of the execution of the execution history tracing method which will be described below. In the descriptions below, the characteristic features of the present embodiment are described.

When TP=0, the code described in the trace information is "SYN" (step 2002). Thus, at step 2003, IP is set to the execution address "0x40000008" corresponding to "TP=0" which is described in the trace information (IP=0x40000008), and the process proceeds to step 2006.

When TP=2, the code described in the trace information is "JMP" (steps 2007, 2008 and 2017), and the instruction described in the source program is the register indirect branch instruction "leq" (LCC) (steps 2018, 2020 and 2022). Thus, at step 2023, the branch address corresponding to "TP=4" which is described in the trace information, i.e., "0x40000008", is stored in the soft LAR. Thereafter, at step 2028, IP is set to the branch address "0x40000008" corresponding to "TP=4" which is described in the trace information (IP=0x40000008). At step 2034, TP is incremented (TP=3), and then, the process returns to step 2006.

On the other hand, when TP=5, the code described in the trace information is "NPC" (steps 2007 and 2008), and the instruction described in the source program is the register indirect branch instruction "leq" (LCC) as in the case of TP=2 (steps 2009 and 2012). Thus, at step 2013, IP is set to the branch address stored in the soft LAR, "0x40000008" (IP=0x40000008). Then, TP is incremented at step 2034 (TP=6), and thereafter, the process returns to step 2006.

Figure 33:
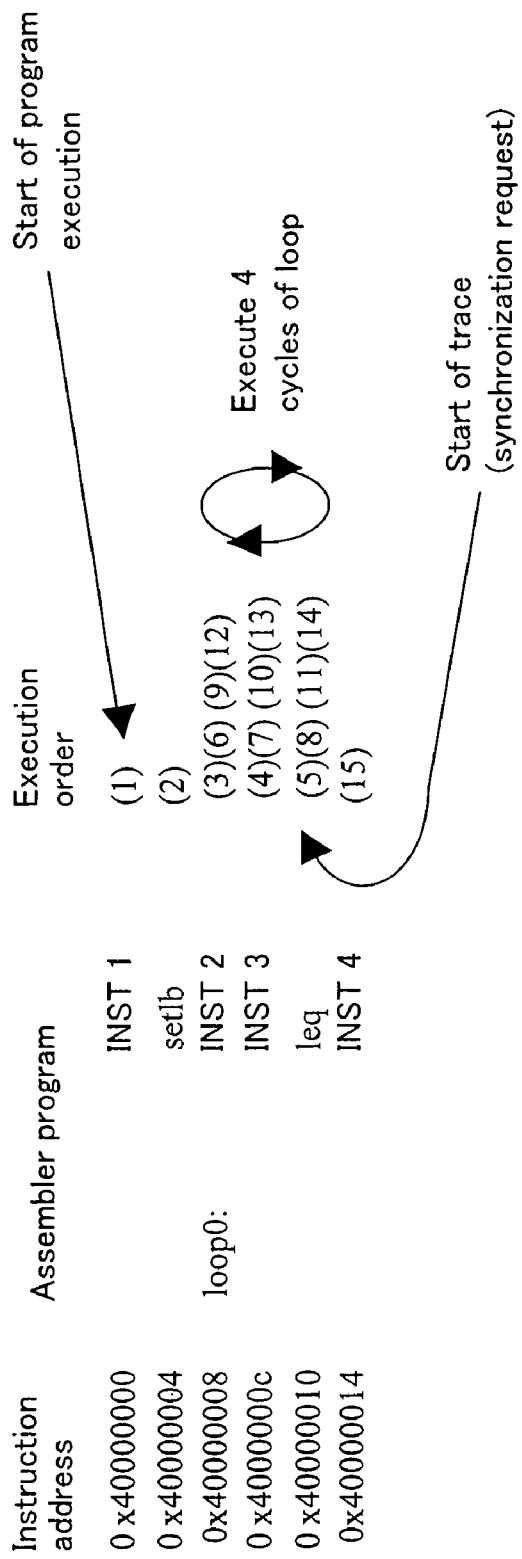
FIG. 33 illustrates an example of a program and an execution order.

Next, another example of trace information output by the semiconductor integrated circuit 1 of the present embodiment and execution history tracing by the development support system of the present embodiment is described with an example of executing a program shown in FIG. 33. In this example, the program itself is the same as that described in the aforementioned example of FIG. 28 except that the trace is started from the instruction of address "0x40000010" (execution order "5") which is immediately previous to the first instruction of the aforementioned example.

FIG. 34 shows trace information which is output when the semiconductor integrated circuit 1 executes the program shown in FIG. 33. The trace information shown in FIG. 34 is a result of the operation of the semiconductor integrated circuit 1 which will be described below. In the descriptions below, the characteristic features of the present embodiment are described.

When TP=0, the code described in the trace information is "JMPS" (steps 2001 and 2002), which is a difference from the aforementioned example. Therefore, at step 2004, IP is set to the branch address "0x40000008" corresponding to "TP=0" which is described in the trace information (IP=0x40000008). At step 2005, TP is incremented (TP=1), and then, the process proceeds to step 2006. The subsequent part of the process is the same as that described in the aforementioned example.

As described above, according to the present embodiment, even when the trace is started after the start of a program execution, the execution address or branch address at the start of the trace is output. In the case where the trace is started in the midst of the loop process, at the time when the indirect branch instruction of branching to the start of the loop is executed for the first time after the start of the trace, the branch address of the branch instruction is output. With such an arrangement, even if the trace is started in the midst of program execution, a program portion corresponding to the start of the trace is traced, and the execution history of a program portion of a loop which includes a fast branch instruction is correctly traced.

Embodiment 5

Figure 36:
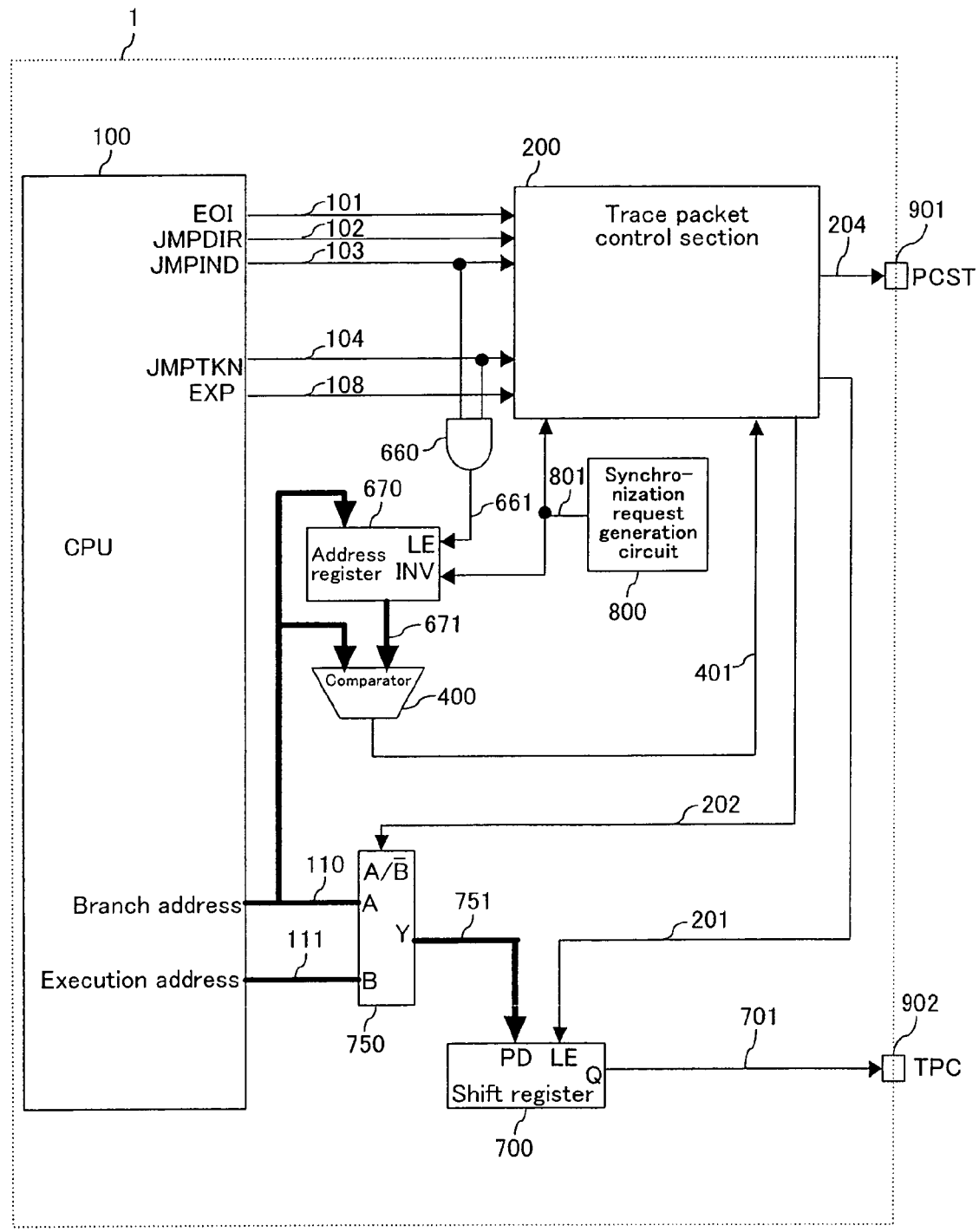
FIG. 36 shows a structure of a semiconductor integrated circuit according to embodiment 5 of the present invention.

FIG. 36 shows a structure of a semiconductor integrated circuit according to embodiment 5 of the present invention. The semiconductor integrated circuit 1 of the present embodiment includes a CPU 100, a trace packet control section 200, a comparator 400, an address register 670, a shift register 700, a selector 750 and a synchronization request generation circuit 800. Among these components, the shift register 700, the selector 750 and the synchronization request generation circuit 800 are the same as those described in the present embodiment. Hereinafter, the CPU 100, the comparator 400 and the address register 670 are described.

The CPU 100 incorporates as a fast branch instruction an indirect branch instruction of branching to a branch address which is stored in a general-purpose register (not shown). When the branch condition is met and an indirect branch instruction is executed, the CPU 100 asserts signals JMPIND and JMPTKN to output the branch address 110 of the indirect branch instruction. When executing an instruction, the CPU 100 outputs the execution address 111 of the instruction. The other aspects of the CPU 100 of the present embodiment are the same as those of the present embodiment except that some of the signals are omitted.

The address register 670 receives the logical product of signals JMPIND and JMPTKN, which is calculated by an AND circuit 660, as a load signal 661. The address register 670 further receives the branch address 110 output from the CPU 100 as data. That is, when the CPU 100 executes an indirect branch instruction, the address register 670 outputs a stored address and stores the branch address 110. When the synchronization request signal 801 is asserted, the stored content of the address register 670 is initialized.

The comparator 400 compares data 671 output from the address register 670 and the branch address 110 output from the CPU 100 to output a comparison result signal 401 which indicates whether the data 671 and the branch address 110 match or not. If they match, the comparison result signal 401 is asserted. If they do not match, the comparison result signal 401 is negated.

FIG. 37 shows a status decode table of the trace packet control section 200. The trace packet control section 200 receives signals EOI, JMPDIR, JMPIND, JMPTKN and EXP and the comparison result signal 401 and the synchronization request signal 801. According to the status decode table shown in FIG. 37, the trace packet control section 200 determines a branch address load enable signal (TPCLDEN) 201, a selection signal (TPCSEL) 202, and a code 204 which is to be output to a trace status port (PCST) 901.

The development support system of the present embodiment has the same structure as that of the development support system shown in FIG. 48. However, the operation of the host computer (execution history tracing section) 3 is different from that of the conventional one, and the differences will be described later.

Figure 38:
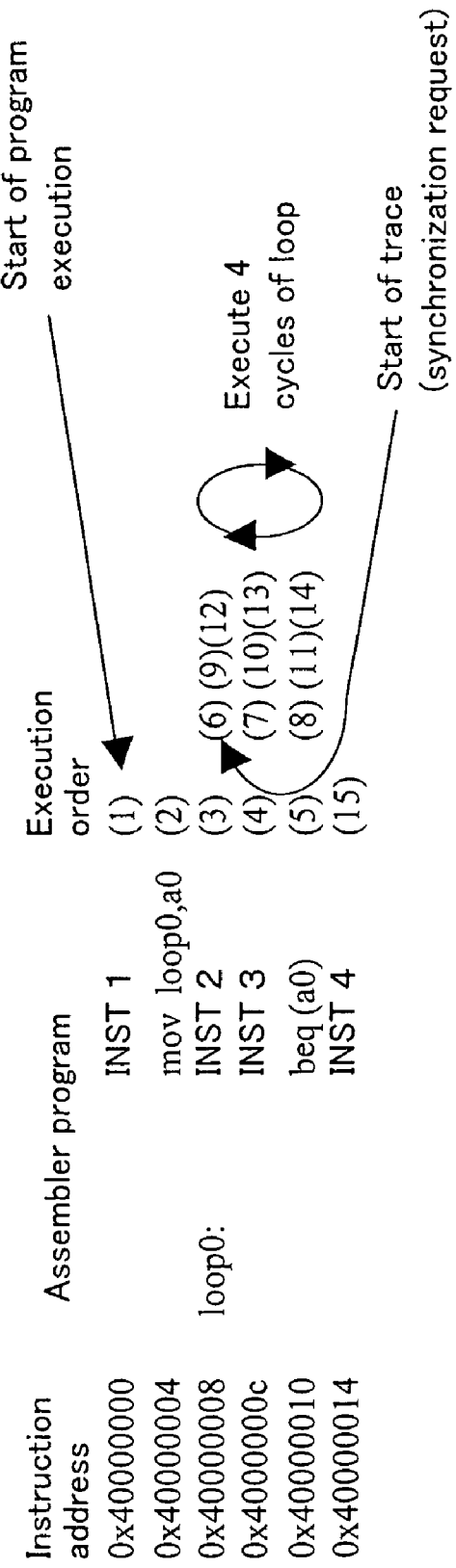
FIG. 38 illustrates an example of a program and an execution order.

Next, trace information output and execution history tracing by the semiconductor integrated circuit 1 and the development support system of the present embodiment are described with an example of executing a program shown in FIG. 38. In this example, the semiconductor integrated circuit 1 starts the trace at execution order "6" in the second execution of the four executions in the loop "loop0".

FIG. 39 shows trace information which is output when the semiconductor integrated circuit 1 executes the program shown in FIG. 38. The trace information shown in FIG. 39 is a result of the operation of the semiconductor integrated circuit 1 which will be described below. In the descriptions below, the characteristic features of the present embodiment are described.

When the CPU 100 executes the indirect branch instruction "beq (a0)" of address "0x40000010" (execution order "5"), signals JMPIND and JMPTKN are asserted, and the branch address 110 ("0x40000008") is stored in the address register 670. The instruction "beq (a0)" is an indirect branch instruction of branching to the branch address stored in register "a0" when the condition is met.

Then, at execution order "6", the trace is started, the synchronization request signal 801 is asserted, and the address register 670 is initialized. When the CPU 100 executes the instruction of address "0x40000008" (execution order "6"), i.e., "INST 2", signal EOI is asserted, and the execution address 111 ("0x40000008") is output. At this point in time, signals JMPIND and JMPTKN are not asserted. According to the status decode table shown in FIG. 37, the trace packet control section 200 asserts signal TPCLDEN, sets the value of signal TPCSEL to "0", and outputs "SYN" as the code 204. In the meanwhile, the shift register 700 outputs execution address "0x40000008" of the instruction of execution order "6", i.e., "INST 2", as the data 701.

Thereafter, when the CPU 100 executes the indirect branch instruction "beq (a0)" of address "0x40000010" (execution order "8"), signals JMPIND and JMPTKN are asserted, and the address stored in the address register 670 and the branch address 110 are compared. Since the address register 670 is initialized at the start of the trace, these addresses do not match, and accordingly, the comparison result signal 401 is not asserted. Thus, according to the status decode table shown in FIG. 37, the trace packet control section 200 asserts signal TPCLDEN, sets the value of signal TPCSEL to "1", and outputs "JMP" as the code 204. In the meanwhile, the shift register 700 outputs execution address "0x40000008" of the instruction of execution order "6", i.e., "INST 2", as the data 701.

When the CPU 100 executes the indirect branch instruction "beq (a0)" of address "0x40000010" (execution order "11"), signals JMPIND and JMPTKN are asserted, and the address stored in the address register 670 and the branch address 110 "0x40000008" are compared. Since address "0x40000008" is stored in the address register 670 as a result of execution of the indirect branch instruction "beq (a0)" of execution order "8", these addresses match, and accordingly, the comparison result signal 401 is asserted. Thus, according to the status decode table shown in FIG. 37, "NPC" is output as the code 204. In the meanwhile, the data 701 is not output from the shift register 700.

Through the above operation, the trace information shown in FIG. 39 is output from the semiconductor integrated circuit 1 of the present embodiment.

Figure 40:
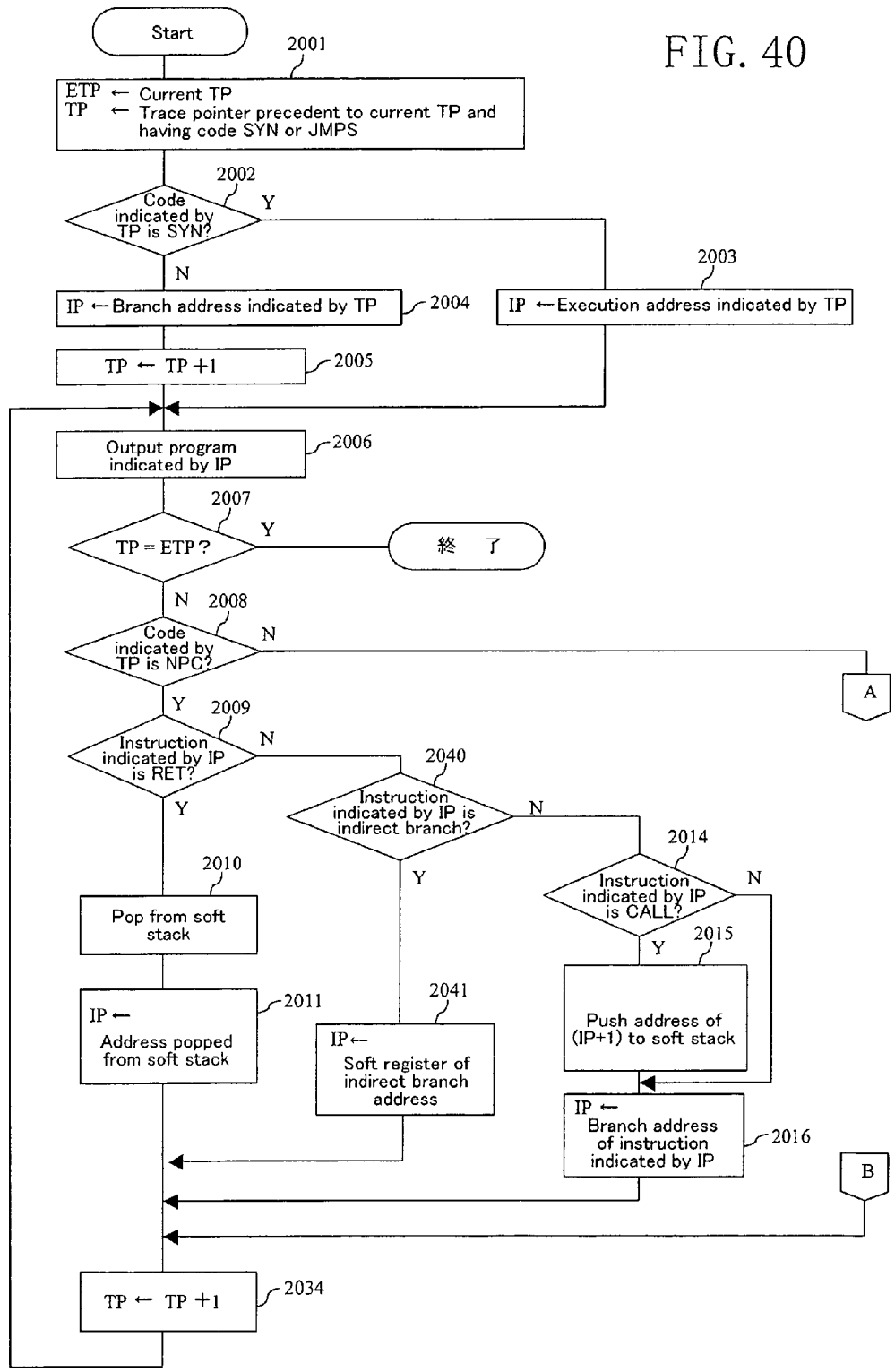
FIG. 40 is a flowchart of an execution history tracing method which is performed by a development support system of embodiment 5 of the present invention.
Figure 41:
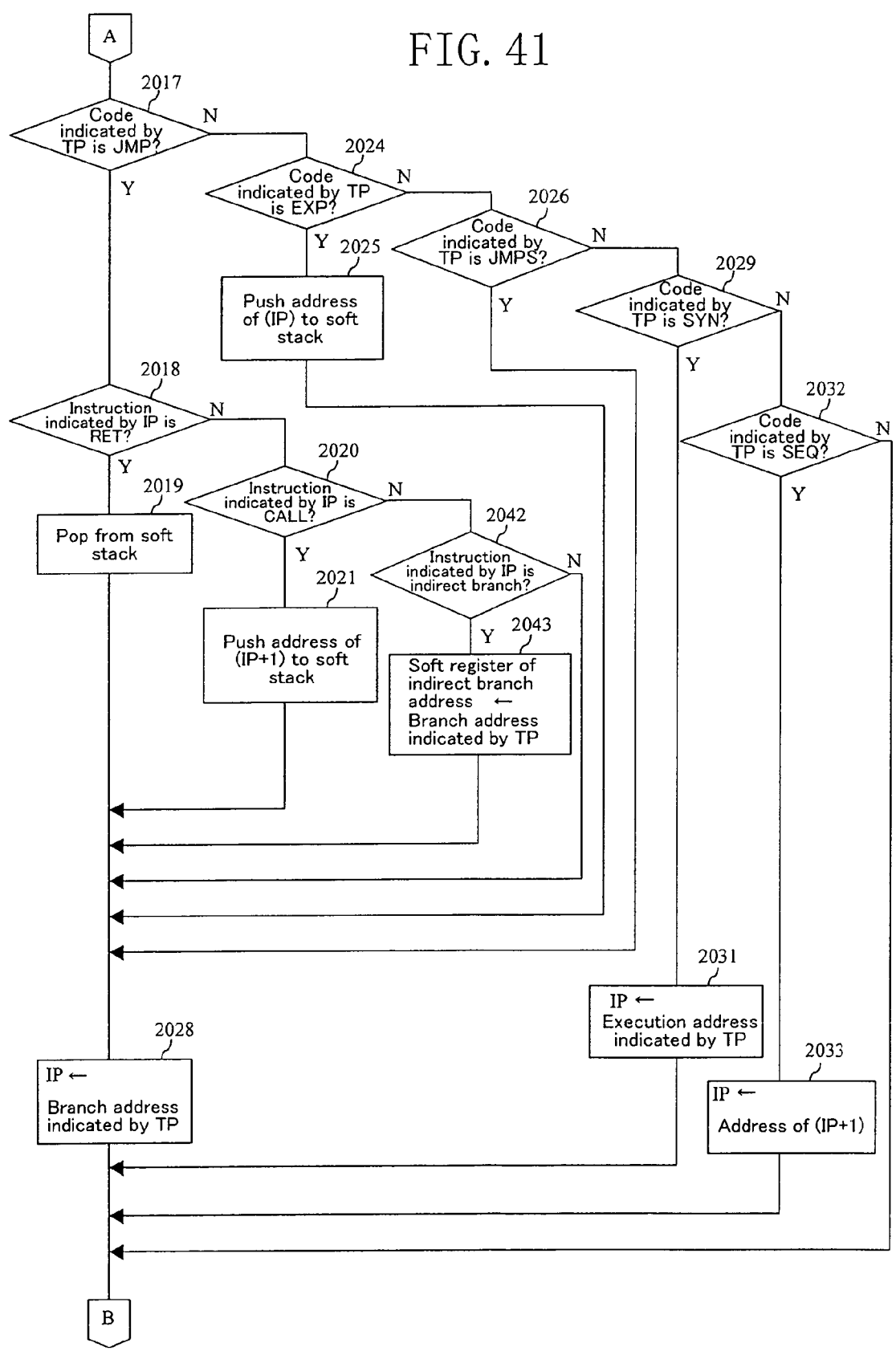
FIG. 41 is a flowchart of the execution history tracing method which is performed by the development support system of embodiment 5 of the present invention.

FIGS. 40 and 41 show a flowchart of an execution history tracing method which is executed by the development support system of the present embodiment. FIG. 42 shows a program execution history traced by the development support system of the present embodiment. The program execution history shown in FIG. 42 is a result of the execution of the execution history tracing method which will be described below. In the descriptions below, the characteristic features of the present embodiment are described.

When TP=0, the code described in the trace information is "SYN" (step 2002). Thus, at step 2003, IP is set to the execution address "0x40000008" corresponding to "TP=0" which is described in the trace information (IP=0x40000008), and the process proceeds to step 2006.

When TP=2, the code described in the trace information is "JMP" (steps 2007, 2008 and 2017), and the instruction described in the source program is the indirect branch instruction "beq (a0)" (steps 2018, 2020 and 2042). Thus, at step 2043, the branch address corresponding to "TP=4" which is described in the trace information, i.e., "0x40000008", is stored in a simulation register which is realized by software (hereinafter, referred to as "soft register"). Thereafter, at step 2028, IP is set to the branch address "0x40000008" corresponding to "TP=4" which is described in the trace information (IP=0x40000008). At step 2034, TP is incremented (TP=3), and then, the process returns to step 2006.

On the other hand, when TP=5, the code described in the trace information is "NPC" (steps 2007 and 2008), and the instruction described in the source program is the indirect branch instruction "beq (a0)" as in the case of TP=2 (steps 2009 and 2040). Thus, at step 2041, IP is set to the branch address stored in the soft register, "0x40000008" (IP=0x40000008). Then, TP is incremented at step 2034 (TP=6), and thereafter, the process returns to step 2006.

Figure 43:
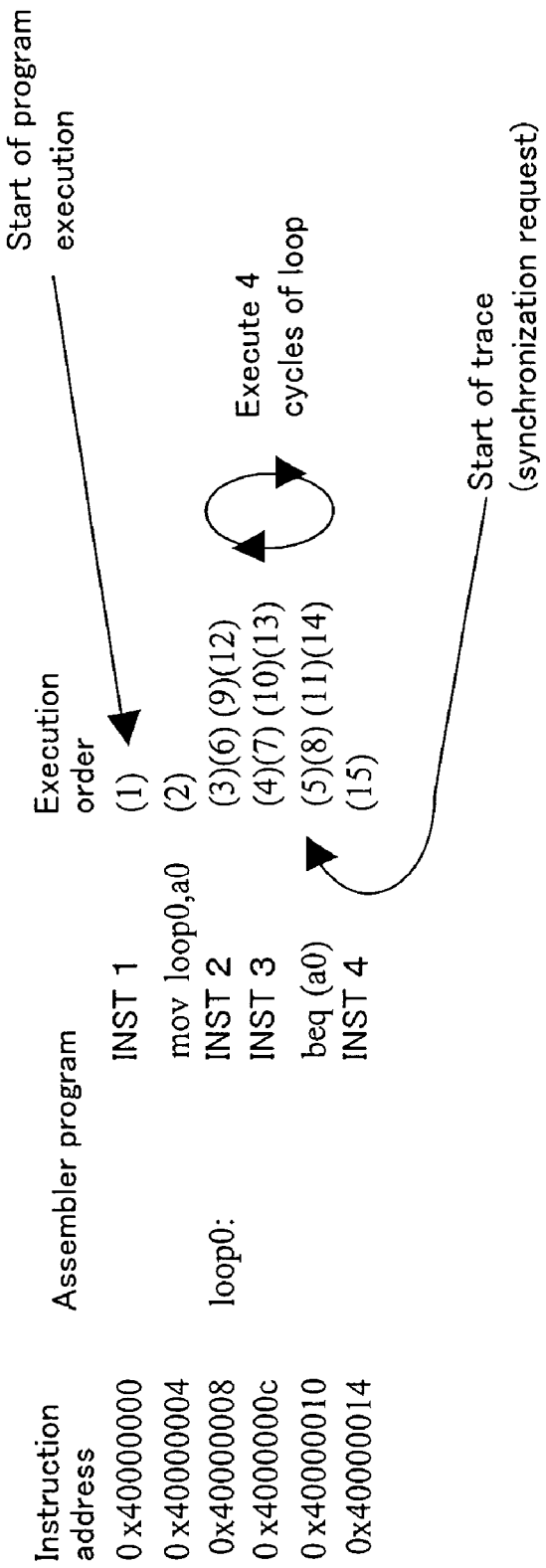
FIG. 43 illustrates an example of a program and an execution order.
Figure 46:
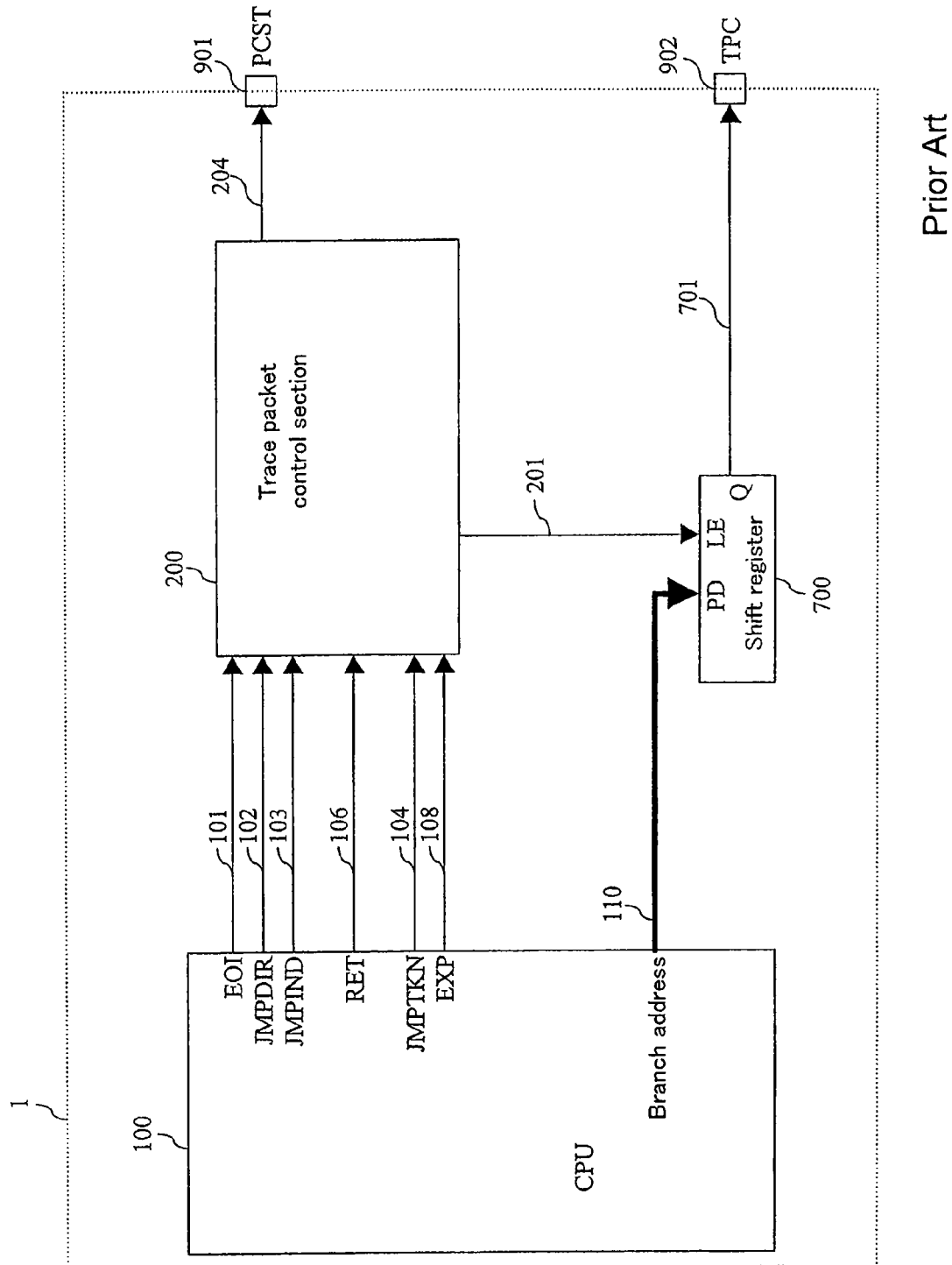
FIG. 46 shows a structure of a semiconductor integrated circuit which has a conventional trace information output function.

Next, another example of trace information output by the semiconductor integrated circuit 1 of the present embodiment and execution history tracing by the development support system of the present embodiment is described with an example of executing a program shown in FIG. 43. In this example, the program itself is the same as that described in the aforementioned example of FIG. 38 except that the trace is started from the instruction of address "0x40000010" (execution order "5") which is immediately previous to the first instruction of the aforementioned example.

FIG. 44 shows trace information which is output when the semiconductor integrated circuit 1 executes the program shown in FIG. 43. The trace information shown in FIG. 44 is a result of the operation of the semiconductor integrated circuit 1 which will be described below. In the descriptions below, the characteristic features of the present embodiment are described.

When TP=0, the code described in the trace information is "JMPS" (steps 2001 and 2002), which is a difference from the aforementioned example. Therefore, at step 2004, IP is set to the branch address "0x40000008" corresponding to "TP=0" which is described in the trace information (IP=0x40000008). At step 2005, TP is incremented (TP=1), and then, the process proceeds to step 2006. The subsequent part of the process is the same as that described in the aforementioned example.

As described above, according to the present embodiment, in a loop process including an indirect branch instruction, at the first execution of the indirect branch instruction, the branch address of the branch instruction is output as trace information. At the second or subsequent execution of the register indirect branch instruction, a branch address is not output as trace information. Thus, as for the trace information output, the band width is not constrained. That is, the trace information output of a semiconductor integrated circuit which incorporates an indirect branch instruction is optimized. Even when the semiconductor integrated circuit operates in an actual operation condition to perform the trace, it is possible to trace a correct program execution history.

Even when the trace is started after the start of a program execution, the execution address or branch address at the start of the trace is output. In the case where the trace is started in the midst of the loop process, at the time when the indirect branch instruction of branching to the start of the loop is executed for the first time after the start of the trace, the leading address of the loop is output. With such an arrangement, even if the trace is started in the midst of program execution, a program portion corresponding to the start of the trace is traced, and the execution history of a program portion of a loop which includes a fast branch instruction is correctly traced.

It should be noted that, even with a structure which does not include the synchronization request generation circuit 800 and the selector 750 as in embodiments 1 and 3, the effect of optimizing the trace information output, which is produced by the present invention, is not marred at all.

The semiconductor integrated circuits of the above embodiments may include an address register for outputting a held data in a parallel manner in place of the shift register 700. Even when a branch address is output in a parallel manner, the effects produced by the present invention are not marred at all.

For convenience of illustration, the development support system of the above embodiments traces a program execution history based on trace information output from a semiconductor integrated circuit of the embodiments. However, it is possible to trace a program execution history based on the trace information output from a semiconductor integrated circuit other than the above.

A semiconductor integrated circuit and development support system according to the present invention are useful in externally analyzing and evaluating the operation of the processor.

What is claimed is:

1. A semiconductor integrated circuit, comprising:
   a CPU which operates such that
      when executing a call instruction, the CPU asserts a first signal and outputs a branch address and a return address relating to the call instruction,
      when executing an interrupt branch, the CPU asserts a second signal and outputs a branch address and a return address relating to the interrupt branch, and
      when executing a return instruction, the CPU asserts a third signal and outputs a branch address relating to the return instruction;
   a stack memory to which the return address output from the CPU is pushed when any one of the first and second signals is asserted and from which the pushed return address is popped when the third signal is asserted;
   a comparator for comparing the return address popped from the stack memory and the branch address output from the CPU;
   a trace packet control section for receiving a plurality of signals from the CPU to output a trace status code based on the plurality of signals, the plurality of signals including the first through third signals; and
   an address register for receiving the branch address output from the CPU and outputting the branch address under control of the trace packet control section,
   wherein when the third signal is asserted and the trace packet control section receives from the comparator a comparison result which indicates no match, the trace packet control section orders the address register to output the branch address,
   wherein the semiconductor integrated circuit further comprises a synchronization request generation circuit for asserting a fourth signal when a trace is started,
   wherein when the fourth signal is asserted, the memory content of the stack memory is initialized, and
   wherein:
      when executing an instruction, the CPU outputs an execution address of the executed instruction;
      the semiconductor integrated circuit includes a selector for selectively outputting any one of the branch address and the execution address output from the CPU;
      the address register receives the address output from the selector instead of the branch address output from the CPU and outputs the address under control of the trace packet control section; and
      the trace packet control section operates such that,
         when the fourth signal is asserted, the trace packet control section outputs a code which indicates start of a trace as a trace status code, and
         in such a case, if the first and second signals are negated, the trace packet control section orders the selector to select the execution address, and if otherwise, the trace packet control section orders the selector to select the branch address.

2. A semiconductor integrated circuit, comprising:
   a CPU which incorporates an indirect branch instruction of branching to a branch address stored in a register, the CPU operating such that
      when updating the register, the CPU asserts a first signal, and
      when executing the indirect branch instruction, the CPU asserts a second signal and outputs a branch address relating to the indirect branch instruction;
   a loop detection circuit for asserting a third signal during an interval from the assertion of the first signal to the assertion of the second signal;
   a trace packet control section for receiving a plurality of signals from the CPU to output a trace status code based on the plurality of signals, the plurality of signals including the second signal; and
   an address register for receiving the branch address output from the CPU and outputting the address under control of the trace packet control section,
   wherein when the second and third signals are asserted, the trace packet control section orders the address register to output the address,
   wherein the semiconductor integrated circuit further comprises a synchronization request generation circuit for asserting a fourth signal when a trace is started,
   wherein the loop detection circuit asserts the third signal during an interval from the assertion of the fourth signal to the assertion of the second signal, and
   wherein:
      when executing an instruction, the CPU outputs an execution address of the executed instruction;

the semiconductor integrated circuit includes a selector for selectively outputting any one of the branch address and the execution address output from the CPU;

the address register receives the address output from the selector instead of the branch address output from the CPU and outputs the address under control of the trace packet control section; and the trace packet control section operates such that,
when the fourth signal is asserted, the trace packet control section outputs a code which indicates start of a trace as a trace status code, and
in such a case, if the second signal is negated, the trace packet control section orders the selector to select the execution address, and if otherwise, the trace packet control section orders the selector to select the branch address.

3. A semiconductor integrated circuit, comprising:

a CPU which incorporates an indirect branch instruction of branching to a branch address stored in a register, the CPU operating such that when executing the indirect branch instruction, the CPU asserts a first signal and outputs a branch address relating to the indirect branch instruction;

a first address register for outputting a stored address when the first signal is asserted to store the branch address output from the CPU, a comparator for comparing the branch address output from the first address register and the branch address output from the CPU;

a trace packet control section for receiving a plurality of signals from the CPU to output a trace status code based on the plurality of signals, the plurality of signals including the first signal; and a second address register for receiving the branch address output from the CPU and outputting the address under control of the trace packet control section, wherein when the first signal is asserted and the trace packet control section receives from the comparator a comparison result which indicates no match, the trace packet control section orders the second address register to output the address, wherein the semiconductor integrated circuit further comprises a synchronization request generation circuit for asserting a second signal when a trace is started, wherein when the second signal is asserted, the memory content of the first address register is initialized, and wherein:
when executing an instruction, the CPU outputs an execution address of the executed instruction;
the semiconductor integrated circuit includes a selector for selectively outputting any one of the branch address and the execution address output from the CPU;
the second address register receives the address output from the selector instead of the branch address output from the CPU and outputs the address under control of the trace packet control section; and
the trace packet control section operates such that,
when the second signal is asserted, the trace packet control section outputs a code which indicates start of a trace as a trace status code, and
in such a case, if the first signal is negated, the trace packet control section orders the selector to select the execution address, and if otherwise, the trace packet control section orders the selector to select the branch address.

4. A development support system, comprising:

a trace memory for storing a trace status code and an address output from a semiconductor integrated circuit as trace information, the semiconductor integrated circuit comprising:
a CPU which operates such that
when executing a call instruction, the CPU asserts a first signal and outputs a branch address and a return address relating to the call instruction,
when executing an interrupt branch, the CPU asserts a second signal and outputs a branch address and a return address relating to the interrupt branch, and
when executing a return instruction, the CPU asserts a third signal and outputs a branch address relating to the return instruction;
a stack memory to which the return address output from the CPU is pushed when any one of the first and second signals is asserted and from which the pushed return address is popped when the third signal is asserted;
a comparator for comparing the return address popped from the stack memory and the branch address output from the CPU;
a trace packet control section for receiving a plurality of signals from the CPU to output a trace status code based on the plurality of signals, the plurality of signals including the first through third signals; and
an address register for receiving the branch address output from the CPU and outputting the branch address under control of the trace packet control section,
wherein when the third signal is asserted and the trace packet control section receives from the comparator a comparison result which indicates no match, the trace packet control section orders the address register to output the branch address; and
an execution history tracing section for tracing an execution history of a source program executed by the CPU of the semiconductor integrated circuit by sequentially collating the source program and the trace information stored in the trace memory,
wherein the execution history tracing section operates such that
in any one of a case where a call instruction is detected in the source program and a case where a code which indicates execution of an interrupt branch is detected in the trace information, the execution history tracing section acquires a return address from the source program to push the acquired return address and acquires a branch address from the trace information to trace the acquired branch address, and
when a return instruction is detected in the source program, the execution history tracing section pops the pushed return address to trace the popped return address.

5. A development support system, comprising:

a trace memory for storing a trace status code and an address output from a semiconductor integrated circuit as trace information, the semiconductor integrated circuit comprising:
a CPU which operates such that
when executing a call instruction, the CPU asserts a first signal and outputs a branch address and a return address relating to the call instruction,
when executing an interrupt branch, the CPU asserts a second signal and outputs a branch address and a return address relating to the interrupt branch, and when executing a return instruction, the CPU asserts a third signal and outputs a branch address relating to the return instruction;

a stack memory to which the return address output from the CPU is pushed when any one of the first and second signals is asserted and from which the pushed return address is popped when the third signal is asserted;

a comparator for comparing the return address popped from the stack memory and the branch address output from the CPU;

a trace packet control section for receiving a plurality of signals from the CPU to output a trace status code based on the plurality of signals, the plurality of signals including the first through third signals; and an address register for receiving the branch address output from the CPU and outputting the branch address under control of the trace packet control section, wherein when the third signal is asserted and the trace packet control section receives from the comparator a comparison result which indicates no match, the trace packet control section orders the address register to output the branch address, wherein the semiconductor integrated circuit further comprises a synchronization request generation circuit for asserting a fourth signal when a trace is started, wherein when the fourth signal is asserted, the memory content of the stack memory is initialized, and wherein:

when executing an instruction, the CPU outputs an execution address of the executed instruction;

the semiconductor integrated circuit includes a selector for selectively outputting any one of the branch address and the execution address output from the CPU;

the address register receives the address output from the selector instead of the branch address output from the CPU and outputs the address under control of the trace packet control section; and the trace packet control section operates such that, when the fourth signal is asserted, the trace packet control section outputs a code which indicates start of a trace as a trace status code, and in such a case, if the first and second signals are negated, the trace packet control section orders the selector to select the execution address, and if otherwise, the trace packet control section orders the selector to select the branch address; and an execution history tracing section for tracing an execution history of a source program executed by the CPU of the semiconductor integrated circuit by sequentially collating the source program and the trace information stored in the trace memory, wherein the execution history tracing section operates such that in any one of a case where a call instruction is detected in the source program and a case where a code which indicates execution of an interrupt branch is detected in the trace information, the execution history tracing section acquires a return address from the source program to push the acquired return address and acquires a branch address from the trace information to trace the acquired branch address, when a return instruction is detected in the source program, the execution history tracing section pops the pushed return address to trace the popped return address, and when a code which indicates start of a trace is detected in the trace information, the execution history tracing section initializes the pushed return address and acquires any one of an execution address and a branch address corresponding to the code from the trace information to trace the acquired address.

6. A development support system, comprising:

a trace memory for storing a trace status code and an address output from a semiconductor integrated circuit as trace information, the semiconductor integrated circuit comprising:

a CPU which incorporates an indirect branch instruction of branching to a branch address stored in a register, the CPU operating such that when updating the register, the CPU asserts a first signal, and when executing the indirect branch instruction, the CPU asserts a second signal and outputs a branch address relating to the indirect branch instruction:

a loop detection circuit for asserting a third signal during an interval from the assertion of the first signal to the assertion of the second signal;

a trace packet control section for receiving a plurality of signals from the CPU to output a trace status code based on the plurality of signals, the plurality of signals including the second signal: and an address register for receiving the branch address output from the CPU and outputting the address under control of the trace packet control section, wherein when the second and third signals are asserted, the trace packet control section orders the address register to output the address; and an execution history tracing section for tracing an execution history of a source program executed by the CPU of the semiconductor integrated circuit by sequentially collating the source program and the trace information stored in the trace memory, wherein the execution history tracing section operates such that when an indirect branch instruction is detected in the source program and a code which indicates execution of an indirect branch instruction accompanied by a branch address is detected in the trace information, the execution history tracing section stores the branch address and traces the branch address, and when an indirect branch instruction is detected in the source program and a code which indicates execution of an indirect branch instruction not accompanied by a branch address is detected in the trace information, the execution history tracing section traces the stored branch address.

7. A development support system, comprising:

a trace memory for storing a trace status code and an address output from a semiconductor integrated circuit as trace information, the semiconductor integrated circuit comprising:

a CPU which incorporates an indirect branch instruction of branching to a branch address stored in a register, the CPU operating such that when updating the register, the CPU asserts a first signal, and when executing the indirect branch instruction, the CPU asserts a second signal and outputs a branch address relating to the indirect branch instruction;

a loop detection circuit for asserting a third signal during an interval from the assertion of the first signal to the assertion of the second signal;

a trace packet control section for receiving a plurality of signals from the CPU to output a trace status code based on the plurality of signals, the plurality of signals including the second signal; and an address register for receiving the branch address output from the CPU and outputting the address under control of the trace packet control section, wherein when the second and third signals are asserted, the trace packet control section orders the address register to output the address, wherein the semiconductor integrated circuit further comprises a synchronization request generation circuit for asserting a fourth signal when a trace is started, wherein the loop detection circuit asserts the third signal during an interval from the assertion of the fourth signal to the assertion of the second signal, and wherein:

when executing an instruction, the CPU outputs an execution address of the executed instruction;

the semiconductor integrated circuit includes a selector for selectively outputting any one of the branch address and the execution address output from the CPU;

the address register receives the address output from the selector instead of the branch address output from the CPU and outputs the address under control of the trace packet control section; and the trace packet control section operates such that, when the fourth signal is asserted, the trace packet control section outputs a code which indicates start of a trace as a trace status code, and in such a case, if the second signal is negated, the trace packet control section orders the selector to select the execution address, and if otherwise, the trace packet control section orders the selector to select the branch address; and an execution history tracing section for tracing an execution history of a source program executed by the CPU of the semiconductor integrated circuit by sequentially collating the source program and the trace information stored in the trace memory, wherein the execution history tracing section operates such that when an indirect branch instruction is detected in the source program and a code which indicates execution of an indirect branch instruction accompanied by a branch address is detected in the trace information, the execution history tracing section stores the branch address and traces the branch address, when an indirect branch instruction is detected in the source program and a code which indicates execution of an indirect branch instruction not accompanied by a branch address is detected in the trace information, the execution history tracing section traces the stored branch address, and when a code which indicates start of a trace is detected in the trace information, the execution history tracing section acquires any one of an execution address and a branch address corresponding to the code from the trace information to trace the acquired address.

8. A development support system, comprising:

a trace memory for storing a trace status code and an address output from a semiconductor integrated circuit as trace information, the semiconductor integrated circuit comprising:

a CPU which incorporates an indirect branch instruction of branching to a branch address stored in a register, the CPU operating such that when executing the indirect branch instruction, the CPU asserts a first signal and outputs a branch address relating to the indirect branch instruction;

a first address register for outputting a stored address when the first signal is asserted to store the branch address output from the CPU, a comparator for comparing the branch address output from the first address register and the branch address output from the CPU;

a trace packet control section for receiving a plurality of signals from the CPU to output a trace status code based on the plurality of signals, the plurality of signals including the first signal; and a second address register for receiving the branch address output from the CPU and outputting the address under control of the trace packet control section, wherein when the first signal is asserted and the trace packet control section receives from the comparator a comparison result which indicates no match, the trace packet control section orders the second address register to output the address; and an execution history tracing section for tracing an execution history of a source program executed by the CPU of the semiconductor integrated circuit by sequentially collating the source program and the trace information stored in the trace memory, wherein the execution history tracing section operates such that when an indirect branch instruction is detected in the source program and a code which indicates execution of an indirect branch instruction accompanied by a branch address is detected in the trace information, the execution history tracing section stores the branch address and traces the branch address, and when an indirect branch instruction is detected in the source program and a code which indicates execution of an indirect branch instruction not accompanied by a branch address is detected in the trace information, the execution history tracing section traces the stored branch address.

9. A development support system, comprising:

a trace memory for storing a trace status code and an address output from a semiconductor integrated circuit as trace information, the semiconductor integrated circuit comprising:

a CPU which incorporates an indirect branch instruction of branching to a branch address stored in a register, the CPU operating such that when executing the indirect branch instruction, the CPU asserts a first signal and outputs a branch address relating to the indirect branch instruction;

a first address register for outputting a stored address when the first signal is asserted to store the branch address output from the CPU, a comparator for comparing the branch address output from the first address register and the branch address output from the CPU;

a trace packet control section for receiving a plurality of signals from the CPU to output a trace status code based on the plurality of signals, the plurality of signals including the first signal; and a second address register for receiving the branch address output from the CPU and outputting the address under control of the trace packet control section, wherein when the first signal is asserted and the trace packet control section receives from the comparator a comparison result which indicates no match, the trace packet control section orders the second address register to output the address, wherein the semiconductor integrated circuit further comprises a synchronization request generation circuit for asserting a second signal when a trace is started, wherein when the second signal is asserted, the memory content of the first address register is initialized, and wherein:

when executing an instruction, the CPU outputs an execution address of the executed instruction;

the semiconductor integrated circuit includes a selector for selectively outputting any one of the branch address and the execution address output from the CPU;

the second address register receives the address output from the selector instead of the branch address output from the CPU and outputs the address under control of the trace packet control section; and the trace packet control section operates such that, when the second signal is asserted, the trace packet control section outputs a code which indicates start of a trace as a trace status code, and in such a case, if the first signal is negated, the trace packet control section orders the selector to select the execution address, and if otherwise, the trace packet control section orders the selector to select the branch address; and an execution history tracing section for tracing an execution history of a source program executed by the CPU of the semiconductor integrated circuit by sequentially collating the source program and the trace information stored in the trace memory, wherein the execution history tracing section operates such that when an indirect branch instruction is detected in the source program and a code which indicates execution of an indirect branch instruction accompanied by a branch address is detected in the trace information, the execution history tracing section stores the branch address and traces the branch address, when an indirect branch instruction is detected in the source program and a code which indicates execution of an indirect branch instruction not accompanied by a branch address is detected in the trace information, the execution history tracing section traces the stored branch address, and when a code which indicates start of a trace is detected in the trace information, the execution history tracing section acquires any one of an execution address and a branch address corresponding to the code from the trace information to trace the acquired address.

10. A method for tracing an execution history of a source program executed by a CPU of a semiconductor integrated circuit by acquiring from the semiconductor integrated circuit a trace status code and an address as trace information and sequentially collating the source program and the trace information, the semiconductor integrated circuit comprising:

a CPU which operates such that when executing a call instruction, the CPU asserts a first signal and outputs a branch address and a return address relating to the call instruction, when executing an interrupt branch, the CPU asserts a second signal and outputs a branch address and a return address relating to the interrupt branch, and when executing a return instruction, the CPU asserts a third signal and outputs a branch address relating to the return instruction;

a stack memory to which the return address output from the CPU is pushed when any one of the first and second signals is asserted and from which the pushed return address is popped when the third signal is asserted;

a comparator for comparing the return address popped from the stack memory and the branch address output from the CPU;

a trace packet control section for receiving a plurality of signals from the CPU to output a trace status code based on the plurality of signals, the plurality of signals including the first through third signals; and an address register for receiving the branch address output from the CPU and outputting the branch address under control of the trace packet control section, wherein when the third signal is asserted and the trace packet control section receives from the comparator a comparison result which indicates no match, the trace packet control section orders the address register to output the branch address, the method comprising the steps of:

detecting a call instruction in the source program;

detecting a code which indicates execution of an interrupt branch in the trace information;

detecting a return instruction in the source program;

when any one of the call instruction and the code is detected, acquiring a return address from the source program to push the acquired return address;

when any one of the call instruction and the code is detected, acquiring a branch address from the trace information to trace the branch address; and when the return instruction is detected, popping the pushed return address to trace the return address.

11. A method for tracing an execution history of a source program executed by a CPU of a semiconductor integrated circuit by acquiring from the semiconductor integrated circuit a trace status code and an address as trace information and sequentially collating the source program and the trace information, the semiconductor integrated circuit comprising:

a CPU which operates such that when executing a call instruction, the CPU asserts a first signal and outputs a branch address and a return address relating to the call instruction, when executing an interrupt branch, the CPU asserts a second signal and outputs a branch address and a return address relating to the interrupt branch, and when executing a return instruction, the CPU asserts a third signal and outputs a branch address relating to the return instruction;

a stack memory to which the return address output from the CPU is pushed when any one of the first and second signals is asserted and from which the pushed return address is popped when the third signal is asserted;

a comparator for comparing the return address popped from the stack memory and the branch address output from the CPU;

a trace packet control section for receiving a plurality of signals from the CPU to output a trace status code based on the plurality of signals, the plurality of signals including the first through third signals; and an address register for receiving the branch address output from the CPU and outputting the branch address under control of the trace packet control section, wherein when the third signal is asserted and the trace packet control section receives from the comparator a comparison result which indicates no match, the trace packet control section orders the address register to output the branch address, wherein the semiconductor integrated circuit further comprises a synchronization request generation circuit for asserting a fourth signal when a trace is started, wherein when the fourth signal is asserted, the memory content of the stack memory is initialized, and wherein:
when executing an instruction, the CPU outputs an execution address of the executed instruction;
the semiconductor integrated circuit includes a selector for selectively outputting any one of the branch address and the execution address output from the CPU;
the address register receives the address output from the selector instead of the branch address output from the CPU and outputs the address under control of the trace packet control section; and
the trace packet control section operates such that,
when the fourth signal is asserted, the trace packet control section outputs a code which indicates start of a trace as a trace status code, and
in such a case, if the first and second signals are negated, the trace packet control section orders the selector to select the execution address, and if otherwise, the trace packet control section orders the selector to select the branch address, the method comprising the steps of:
detecting a call instruction in the source program;
detecting a return instruction in the source program;
detecting a first code which indicates execution of an interrupt branch in the trace information;
detecting a second code which indicates start of a trace in the trace information;
when any one of the call instruction and the first code is detected, acquiring a return address from the source program to push the acquired return address;
when any one of the call instruction and the first code is detected, acquiring a branch address from the trace information to trace the branch address;
when the return instruction is detected, popping the pushed return address to trace the return address;
when the second code is detected, initializing the pushed return address; and
when the second code is detected, acquiring from the trace information any one of an execution address and a branch address which correspond to the second code to trace the acquired address.

12. A method for tracing an execution history of a source program executed by a CPU of a semiconductor integrated circuit by acquiring from the semiconductor integrated circuit a trace status code and an address as trace information and sequentially collating the source program and the trace information, the semiconductor integrated circuit comprising:
a CPU which incorporates an indirect branch instruction of branching to a branch address stored in a register, the CPU operating such that
when updating the register, the CPU asserts a first signal, and
when executing the indirect branch instruction, the CPU asserts a second signal and outputs a branch address relating to the indirect branch instruction;
a loop detection circuit for asserting a third signal during an interval from the assertion of the first signal to the assertion of the second signal;
a trace packet control section for receiving a plurality of signals from the CPU to output a trace status code based on the plurality of signals, the plurality of signals including the second signal; and
an address register for receiving the branch address output from the CPU and outputting the address under control of the trace packet control section,
wherein when the second and third signals are asserted, the trace packet control section orders the address register to output the address, the method comprising the steps of:
detecting an indirect branch instruction in the source program;
detecting a first code which indicates execution of an indirect branch instruction accompanied by a branch address in the trace information;
detecting a second code which indicates execution of an indirect branch instruction not accompanied by a branch address in the trace information;
when the indirect branch instruction and the first code are detected, storing the branch address which accompanies the first code;
when the indirect branch instruction and the first code are detected, tracing the branch address which accompanies the first code; and
when the indirect branch instruction and the second code are detected, tracing the stored branch address.

13. A method for tracing an execution history of a source program executed by a CPU of a semiconductor integrated circuit by acquiring from the semiconductor integrated circuit a trace status code and an address as trace information and sequentially collating the source program and the trace information, the semiconductor integrated circuit comprising:
a CPU which incorporates an indirect branch instruction of branching to a branch address stored in a register, the CPU operating such that
when updating the register, the CPU asserts a first signal, and
when executing the indirect branch instruction, the CPU asserts a second signal and outputs a branch address relating to the indirect branch instruction;
a loop detection circuit for asserting a third signal during an interval from the assertion of the first signal to the assertion of the second signal;
a trace packet control section for receiving a plurality of signals from the CPU to output a trace status code based on the plurality of signals, the plurality of signals including the second signal; and
an address register for receiving the branch address output from the CPU and outputting the address under control of the trace packet control section,
wherein when the second and third signals are asserted, the trace packet control section orders the address register to output the address,
wherein the semiconductor integrated circuit further comprises a synchronization request generation circuit for asserting a fourth signal when a trace is started,
wherein the loop detection circuit asserts the third signal during an interval from the assertion of the fourth signal to the assertion of the second signal, and
wherein:
when executing an instruction, the CPU outputs an execution address of the executed instruction;
the semiconductor integrated circuit includes a selector for selectively outputting any one of the branch address and the execution address output from the CPU;

the address register receives the address output from the selector instead of the branch address output from the CPU and outputs the address under control of the trace packet control section; and the trace packet control section operates such that,
when the fourth signal is asserted, the trace packet control section outputs a code which indicates start of a trace as a trace status code, and
in such a case, if the second signal is negated, the trace packet control section orders the selector to select the execution address, and if otherwise, the trace packet control section orders the selector to select the branch address, the method comprising the steps of:
detecting an indirect branch instruction in the source program;
detecting a first code which indicates execution of an indirect branch instruction accompanied by a branch address in the trace information;
detecting a second code which indicates execution of an indirect branch instruction not accompanied by a branch address in the trace information;
detecting a third code which indicates start of a trace in the trace information;
when the indirect branch instruction and the first code are detected, storing the branch address which accompanies the first code;
when the indirect branch instruction and the first code are detected, tracing the branch address which accompanies the first code;
when the indirect branch instruction and the second code are detected, tracing the stored branch address; and
when the third code is detected, acquiring any one of an execution address and a branch address which correspond to the third code from the trace information to trace the acquired address.

14. A method for tracing an execution history of a source program executed by a CPU of a semiconductor integrated circuit by acquiring from the semiconductor integrated circuit a trace status code and an address as trace information and sequentially collating the source program and the trace information, the semiconductor integrated circuit comprising:
a CPU which incorporates an indirect branch instruction of branching to a branch address stored in a register, the CPU operating such that when executing the indirect branch instruction, the CPU asserts a first signal and outputs a branch address relating to the indirect branch instruction;
a first address register for outputting a stored address when the first signal is asserted to store the branch address output from the CPU,
a comparator for comparing the branch address output from the first address register and the branch address output from the CPU;
a trace packet control section for receiving a plurality of signals from the CPU to output a trace status code based on the plurality of signals, the plurality of signals including the first signal; and
a second address register for receiving the branch address output from the CPU and outputting the address under control of the trace packet control section,
wherein when the first signal is asserted and the trace packet control section receives from the comparator a comparison result which indicates no match, the trace packet control section orders the second address register to output the address, the method comprising the steps of:
detecting an indirect branch instruction in the source program;
detecting a first code which indicates execution of an indirect branch instruction accompanied by a branch address in the trace information;
detecting a second code which indicates execution of an indirect branch instruction not accompanied by a branch address in the trace information;
when the indirect branch instruction and the first code are detected, storing the branch address which accompanies the first code;
when the indirect branch instruction and the first code are detected, tracing the branch address which accompanies the first code; and
when the indirect branch instruction and the second code are detected, tracing the stored branch address.

15. A method for tracing an execution history of a source program executed by a CPU of a semiconductor integrated circuit by acquiring from the semiconductor integrated circuit a trace status code and an address as trace information and sequentially collating the source program and the trace information, the semiconductor integrated circuit comprising:
a CPU which incorporates an indirect branch instruction of branching to a branch address stored in a register, the CPU operating such that when executing the indirect branch instruction, the CPU asserts a first signal and outputs a branch address relating to the indirect branch instruction;
a first address register for outputting a stored address when the first signal is asserted to store the branch address output from the CPU,
a comparator for comparing the branch address output from the first address register and the branch address output from the CPU;
a trace packet control section for receiving a plurality of signals from the CPU to output a trace status code based on the plurality of signals, the plurality of signals including the first signal; and
a second address register for receiving the branch address output from the CPU and outputting the address under control of the trace packet control section,
wherein when the first signal is asserted and the trace packet control section receives from the comparator a comparison result which indicates no match, the trace packet control section orders the second address register to output the address,
wherein the semiconductor integrated circuit further comprises a synchronization request generation circuit for asserting a second signal when a trace is started,
wherein when the second signal is asserted, the memory content of the first address register is initialized, and
wherein:
when executing an instruction, the CPU outputs an execution address of the executed instruction;
the semiconductor integrated circuit includes a selector for selectively outputting any one of the branch address and the execution address output from the CPU;
the second address register receives the address output from the selector instead of the branch address output from the CPU and outputs the address under control of the trace packet control section; and
the trace packet control section operates such that,
when the second signal is asserted, the trace packet control section outputs a code which indicates start of a trace as a trace status code, and
in such a case, if the first signal is negated, the trace packet control section orders the selector to select the execution address, and if otherwise, the trace packet control section orders the selector to select the branch address, the method comprising the steps of:
- detecting an indirect branch instruction in the source program;
- detecting a first code which indicates execution of an indirect branch instruction accompanied by a branch address in the trace information;
- detecting a second code which indicates execution of an indirect branch instruction not accompanied by a branch address in the trace information;
- detecting a third code which indicates start of a trace in the trace information;
- when the indirect branch instruction and the first code are detected, storing the branch address which accompanies the first code;
- when the indirect branch instruction and the first code are detected, tracing the branch address which accompanies the first code;
- when the indirect branch instruction and the second code are detected, tracing the stored branch address; and
- when the third code is detected, acquiring any one of an execution address and a branch address which correspond to the third code from the trace information to trace the acquired address.

* * * * *